United States Patent
Powell et al.

(10) Patent No.: US 10,304,057 B1
(45) Date of Patent: May 28, 2019

(54) VENDING EQUIPMENT FOR REMOTE SELECTION OF ITEMS VIA A MOBILE DEVICE

(71) Applicant: Vagabond Vending, LLC, Washington, DC (US)

(72) Inventors: John H. Powell, St. Louis, MO (US); Ryan A. Ostendorf, Crofton, MD (US); Jameel A. Ahed, Cape Coral, FL (US); Siddhartha E. Srivatsan, Cape Coral, FL (US); Michael Lovett, Arlington, VA (US)

(73) Assignee: Vagabond Vending, LLC, Washington, DC ( * ) Notice: Subject to any disclaimer, the term of this patent is extended or adjusted under 35 U.S.C. 154(b) by 0 days.

(21) Appl. No.: 15/890,497

(22) Filed: Feb. 7, 2018

Related U.S. Application Data

(60) Provisional application No. 62/455,969, filed on Feb. 7, 2017.

(51) Int. Cl.
*G06Q 20/40* (2012.01)
*G06Q 20/18* (2012.01)

(52) U.S. Cl.
CPC ........... *G06Q 20/401* (2013.01); *G06Q 20/18* (2013.01)

(58) Field of Classification Search
CPC .............................. G06Q 20/18; G07F 11/002
USPC .................................................. 700/231–244
See application file for complete search history.

(56) References Cited

U.S. PATENT DOCUMENTS

| | | | |
|---|---|---|---|
| 7,865,430 B1* | 1/2011 | Kolls | G06Q 20/10 235/381 |
| 8,373,558 B2* | 2/2013 | Sagady | G07F 9/026 340/539.22 |
| 8,396,589 B2* | 3/2013 | Katzenstein Garibaldi | G07F 17/0014 700/232 |
| 8,433,440 B2* | 4/2013 | Felique | G07F 9/02 700/231 |
| 8,781,622 B2* | 7/2014 | Mockus | G06Q 20/18 700/232 |
| 8,856,045 B1* | 10/2014 | Patel | G06Q 20/3823 705/71 |
| 9,153,089 B1* | 10/2015 | Hewett | G06Q 10/087 |
| 2015/0100152 A1* | 4/2015 | Barragan Trevino | G06Q 20/322 700/232 |

* cited by examiner

*Primary Examiner* — Timothy R Waggoner
(74) *Attorney, Agent, or Firm* — Cooley LLP

(57) ABSTRACT

A touchless vend system includes a first processor and a second processor, each within a vending machine and communicably coupled to one another. The first processor can receive a signal representing a product selection, associated with a product in the vending machine, from a mobile device. The first processor can transmit a payment authorization to a controller of the vending machine, and transmit the signal representing the product selection to the second processor. The second processor receives the signal representing the product selection from the first processor, converts the signal representing the product selection into an electronic signal based on a make, a model, and version information of the vend machine, and sends the electronic signal to the controller to cause vending of the product.

15 Claims, 45 Drawing Sheets

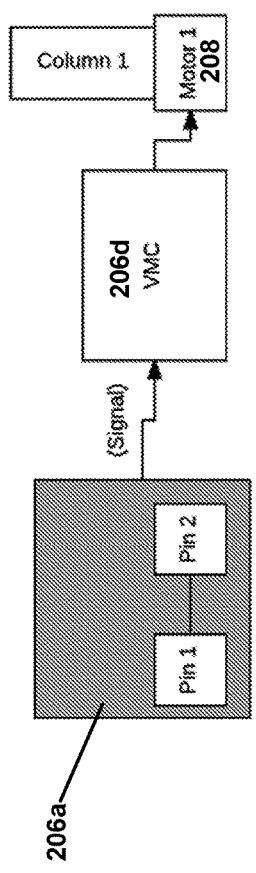
FIG. 2
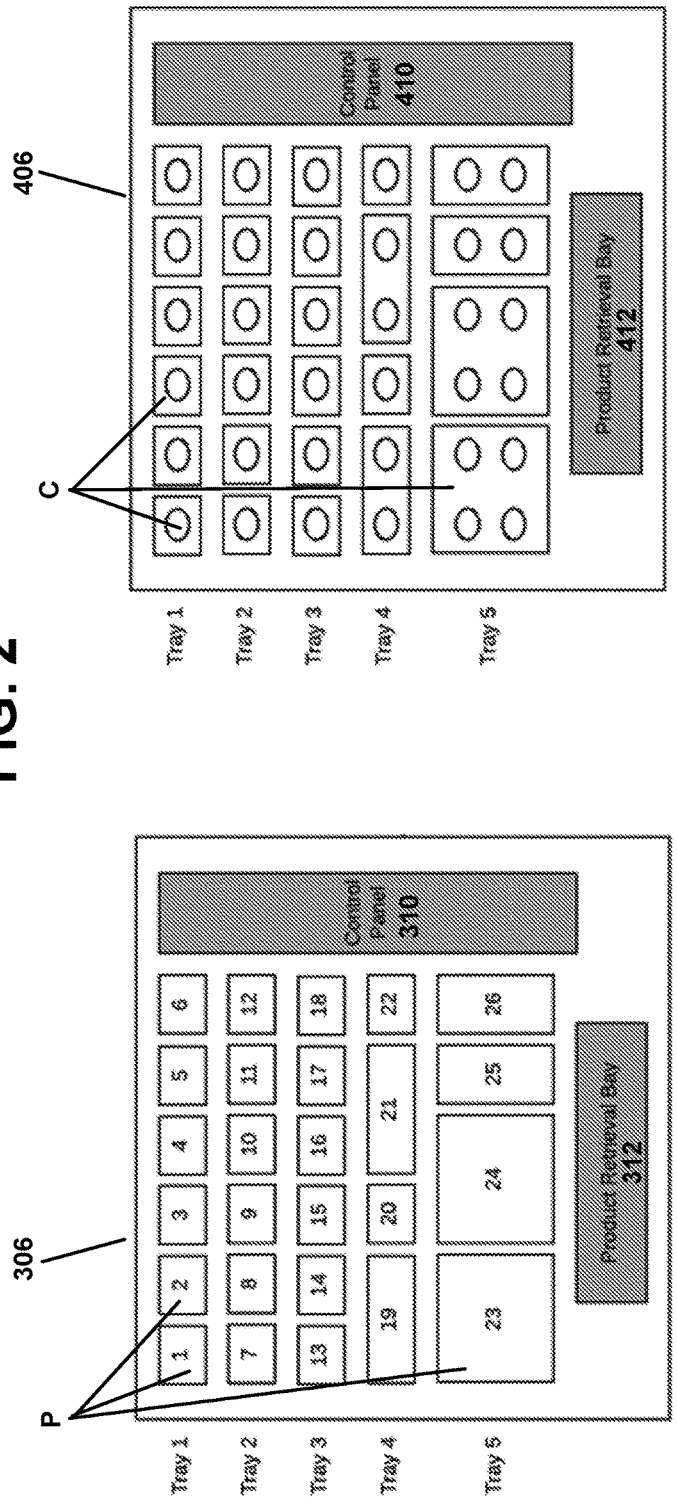
FIG. 4
FIG. 3

VENDING EQUIPMENT FOR REMOTE SELECTION OF ITEMS VIA A MOBILE DEVICE

CROSS-REFERENCE TO RELATED APPLICATIONS

This application claims priority to and the benefit of U.S. Provisional Patent Application No. 62/455,969, filed Feb. 7, 2017 and titled "Methods and Apparatus for Remote Selection and Payment of Items in a Vending Machine via a Mobile Communication Device," which is incorporated herein by reference in its entirety.

BACKGROUND

Vending machines are typically automated machines that dispense products to a consumer at the vending machine itself. A common vending machine configuration uses a metal coil that rotates to release the product.

SUMMARY

In some embodiments, a touchless vend system includes a first processor and a second processor, each within a vending machine and communicably coupled to one another. The first processor can receive a signal representing a product selection, associated with a product in the vending machine, from a mobile device. The first processor can transmit a payment authorization to a controller of the vending machine, and transmit the signal representing the product selection to the second processor. The second processor receives the signal representing the product selection from the first processor, converts the signal representing the product selection into an electronic signal based on a make, a model, and version information of the vend machine, and sends the electronic signal to the controller to cause vending of the product.

In some embodiments, a touchless user-operated service machine system includes a first processor disposed within a user-operated service machine, and a second processor disposed within the user-operated service machine and communicably coupled with the first processor. The first processor is configured to receive a signal representing a user selection from a mobile device, the user selection associated with a service of the user-operated service machine. The first processor is configured to transmit a payment authorization to a controller of the user-operated service machine, and to transmit an action instruction, based on the user selection, to the second processor. The second processor is configured to: (1) receive the action instruction from the first processor; (2) convert the action instruction into an electronic signal based on a make, a model, a firmware version, and version information of the user-operated service machine; and (3) send the electronic signal to the controller of the user-operated service machine to cause the service to be performed.

In some embodiments, a method for touchless vending includes receiving a signal from a mobile device, the signal representing a geolocation of the mobile device and identifying a plurality of vend machines that are within a predetermined radius of the geolocation of the mobile device based on the received geolocation and/or on-file site information. The on-file site information can be used, for example, in combination with the geolocation information to refine it (e.g., the geolocation may specify a location within a certain radius or area, and the on-file site information can include a map, layout, or listing of multiple vend machines within that certain radius or area, together with their locations more precisely defined). A set of available product data is generated based on: (1) the identified plurality of vend machines, and (2) a plurality of product identifiers for a plurality of products and associated with the plurality of vend machines. A signal, representing the available product data, is sent to the mobile device to cause a software application of the mobile device to display a listing of available products in the plurality of vend machines. A signal representing a selection of a vend machine of the plurality of vend machines and a signal representing a selection of a product from the listing of available products are received from the mobile device. The signal representing the selection of the product from the listing of available products is converted into an electronic signal based on: a make, a model, and version information of the selected vend machine of the plurality of vend machines, in response to receiving the signal representing the selection of the vend machine of the plurality of vend machines and the signal representing the selection of the product. A payment authorization is sent to a controller of the selected vend machine of the plurality of vend machines to activate the selected vend machine, and a vend signal is sent to the controller of the selected vend machine of the plurality of vend machines to cause vending of the selected product.

In some embodiments, a touchless vending method includes storing, in a machine library of a non-transitory processor-readable data storage of a first processor, and for each vend machine of a plurality of vend machines, a set of machine data including a vend machine configuration for that vend machine. A map of signal data for each button of a plurality of buttons of that vend machine is generated via the first processor, for each vend machine of the plurality of vend machines. Data is received, from a remote tracking device (or "payment server") in communication with each vend machine of the plurality of vend machines, representing a plurality of vend processors that are within a predetermined radius of a geolocation of a mobile device, each vend processor of the plurality of vend processors being disposed within an associated vend machine of the plurality of vend machines. A set of available product data is generated based on: (1) the received data representing the plurality of vend processors, (2) a plurality of product identifiers for a plurality of products and associated with the plurality of vend processors, and (3) product data for each product of the plurality of products and including a product name, an image, nutritional information, and a description. A signal is sent to the mobile device, the signal representing the available product data, to cause a software application of the mobile device to display a duplicate-free listing of available products of the plurality of products, the listing not including products that are out-of-stock in the plurality of vend machines. A signal representing a selection of a vend machine of the plurality of vend machines, and a signal representing a selection of a product of the plurality of products, are received from the mobile device. The first processor then sends a signal to cause the selected product to vend from the selected vend machine.

In some embodiments, a vending system includes a first processor and a second processor, each disposed within a vend machine, the first processor communicably coupled to the second processor. The second processor is configured to receive a signal representing a product selection from a button of a plurality of buttons of the vend machine, transmit the signal representing the product selection to a controller of the vend machine to cause vending of a product associated with the product selection, convert the signal representing the product selection into a product selection message, and send the product selection message to the first processor. The first processor is configured to: receive a first vend complete message from the controller, receive the product selection message from the second processor, generate a second vend complete message based on the first vend complete message and the product selection message, and send the second vend complete message to a remote tracking device in real-time or substantially real-time. The first vend complete message and/or the second vend complete message can include at least one of a date and a time of the vending of the product. In some embodiments, the second processor is configured to transmit the signal representing the product selection to the controller of the vend machine to cause vending of the product associated with the product selection after the controller receives an indication that a cash payment has been received at the vend machine.

Depending upon the application, a touchless vending system can be implemented by one or more of the following methods (in any combination), described in greater detail below: A method for the creation, application and/or management of an electronic button signal map; a method for creating a master product table and relating it to individual operator product tables; a method for identifying machines that takes into account the relative limitations of GPS, near-field communication ("NFC"), and Wi-Fi within the context of vend banks, multi-room structures, multi-floor structures, and other subdivided areas; a method for presenting an intuitive interactive product menu for vended products on a mobile device; a method for applying this electronic selection button mapping and machine locations to create touchless vending transactions using the consumer's mobile device and a consumer's cellular connection for real time communication; a method for using tokenization taking the machine resident device and machine-to-processor communication pathway out of scope for PCI compliance for traditional debit and credit payment transactions; a method for registering users; a method for the retrieval and management of individual cash and electronic payment transactions for use in VMS reporting and processor reconciliation; a method for translating MDB data into data exchange ("DEX") data, for example to support third-party legacy DEX-based VMS systems; a method for combining the above with a Merchant of Record or related processor relationship to collateralize the electronic payment revenue stream as financing collateral; or a method for using the VMS as a tool for underwriting the initial and ongoing risk of the financing

BRIEF DESCRIPTIONS OF THE DRAWINGS

FIG. 2 is a diagram illustrating the signal flow between selection buttons and a vend motor of a vending machine, according to an embodiment.

FIG. 3 shows an arrangement of products in a vending machine, according to an embodiment.

FIG. 4 shows an example placement of coil sockets behind the products of FIG. 3.

FIGS. 27A-E show an example sequence of user interface screens, viewable to a user via a mobile app, according to an embodiment.

Figure 28A:
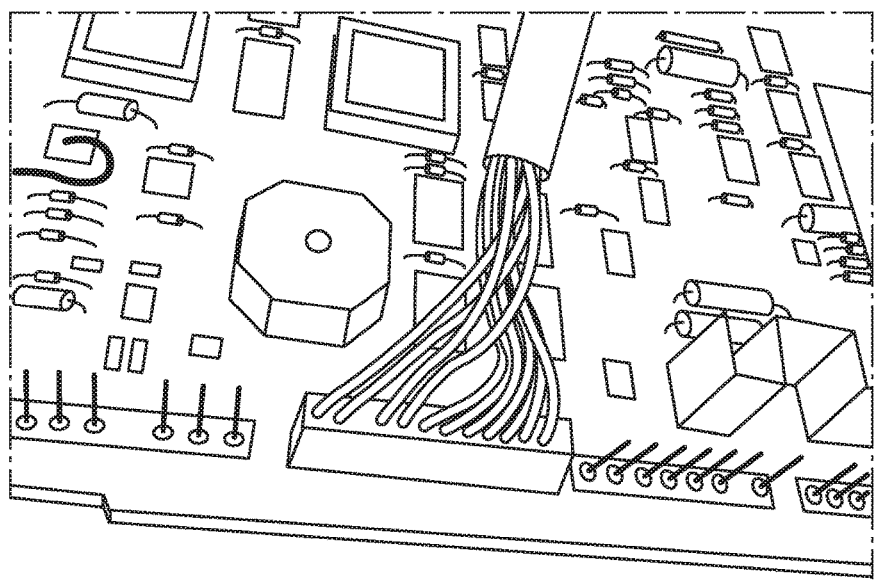

FIG. 28A is a photograph of a portion of a VMC before modification, according to an example implementation.

Figure 28B:
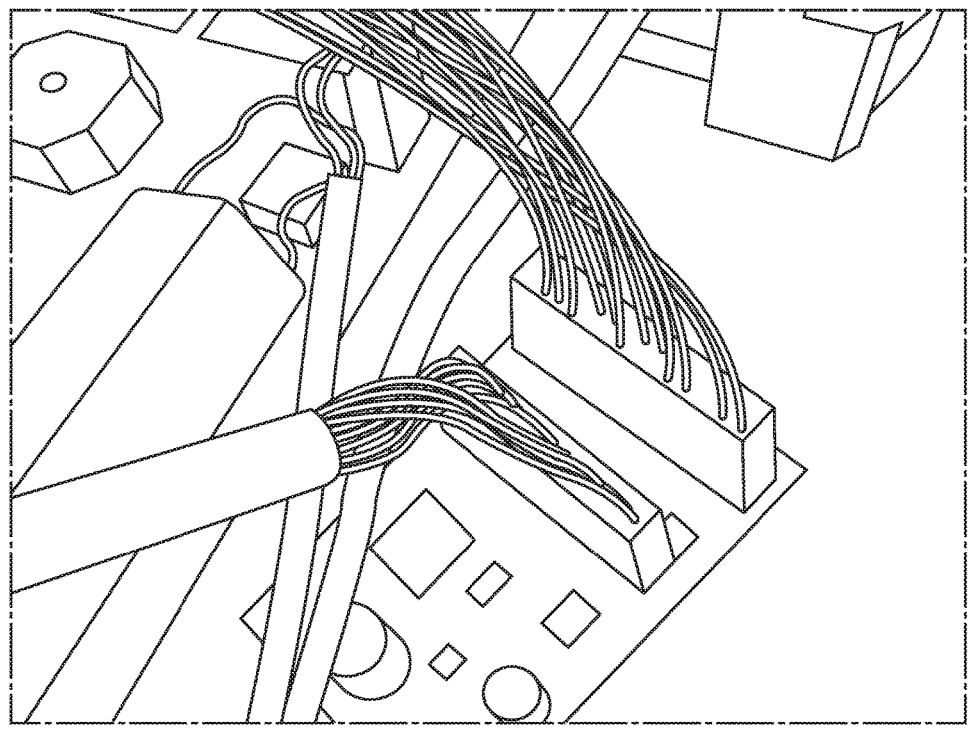

FIG. 28B is a photograph of an interceptor circuit board, including the relocated connector from the VMC of FIG. 28A, according to an example implementation.

Figure 28C:
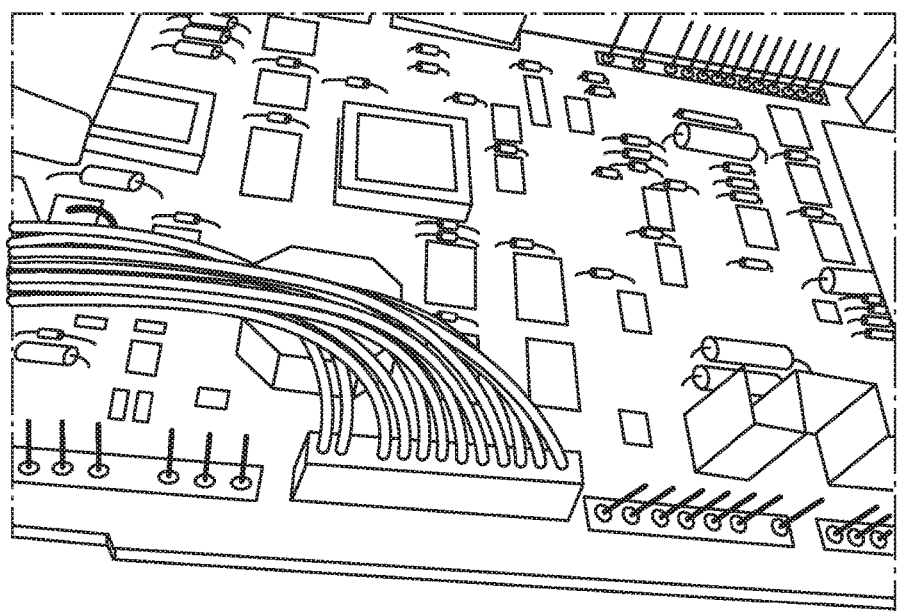

FIG. 28C is a photograph of a portion of the VMC of FIG. 28A after modification, according to an example implementation.

Figure 28D:
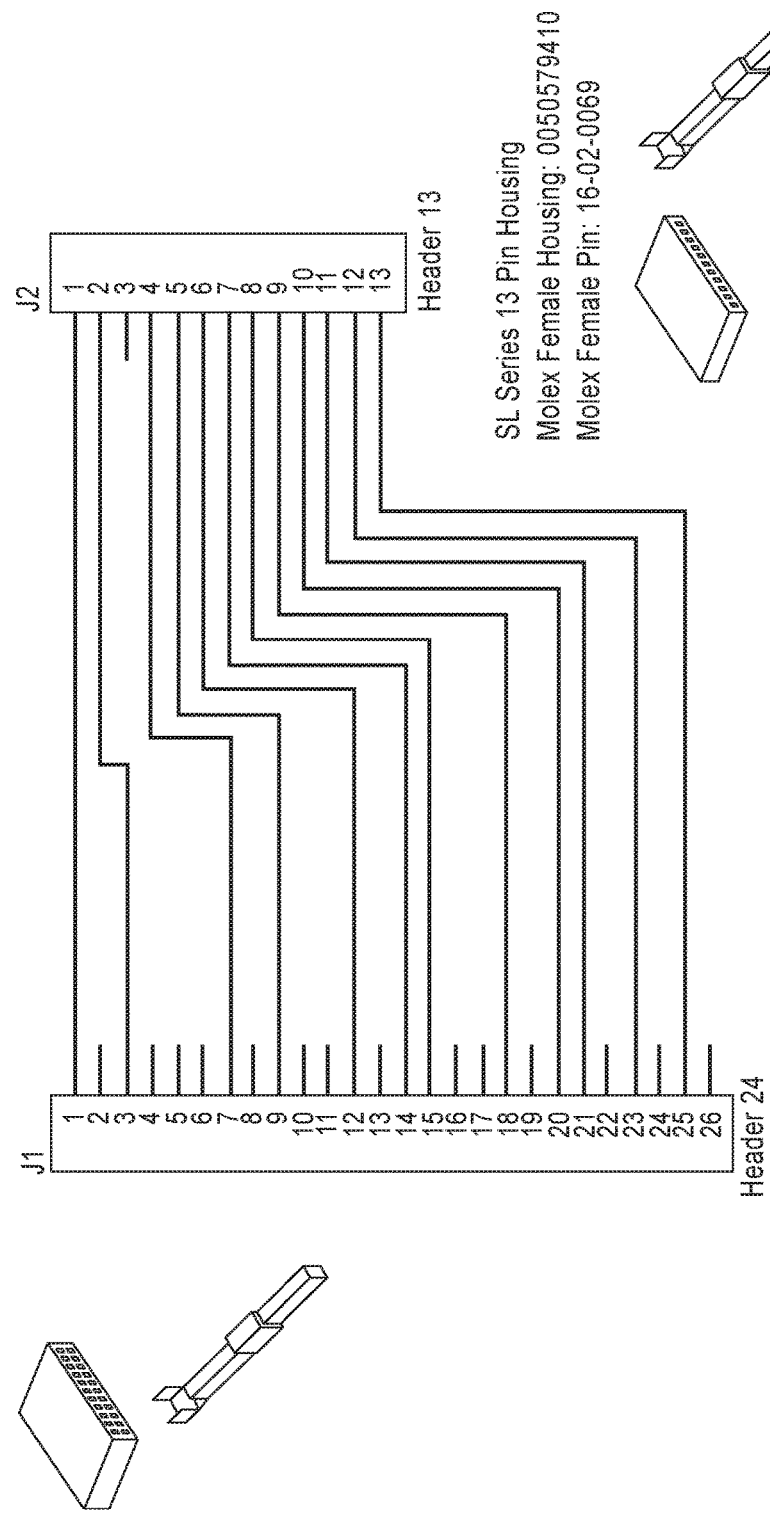

FIG. 28D is a cable diagram showing connector pin outs, hardware and mapping for an interceptor-to-VMC connection, according to an example implementation.

Figure 29A:
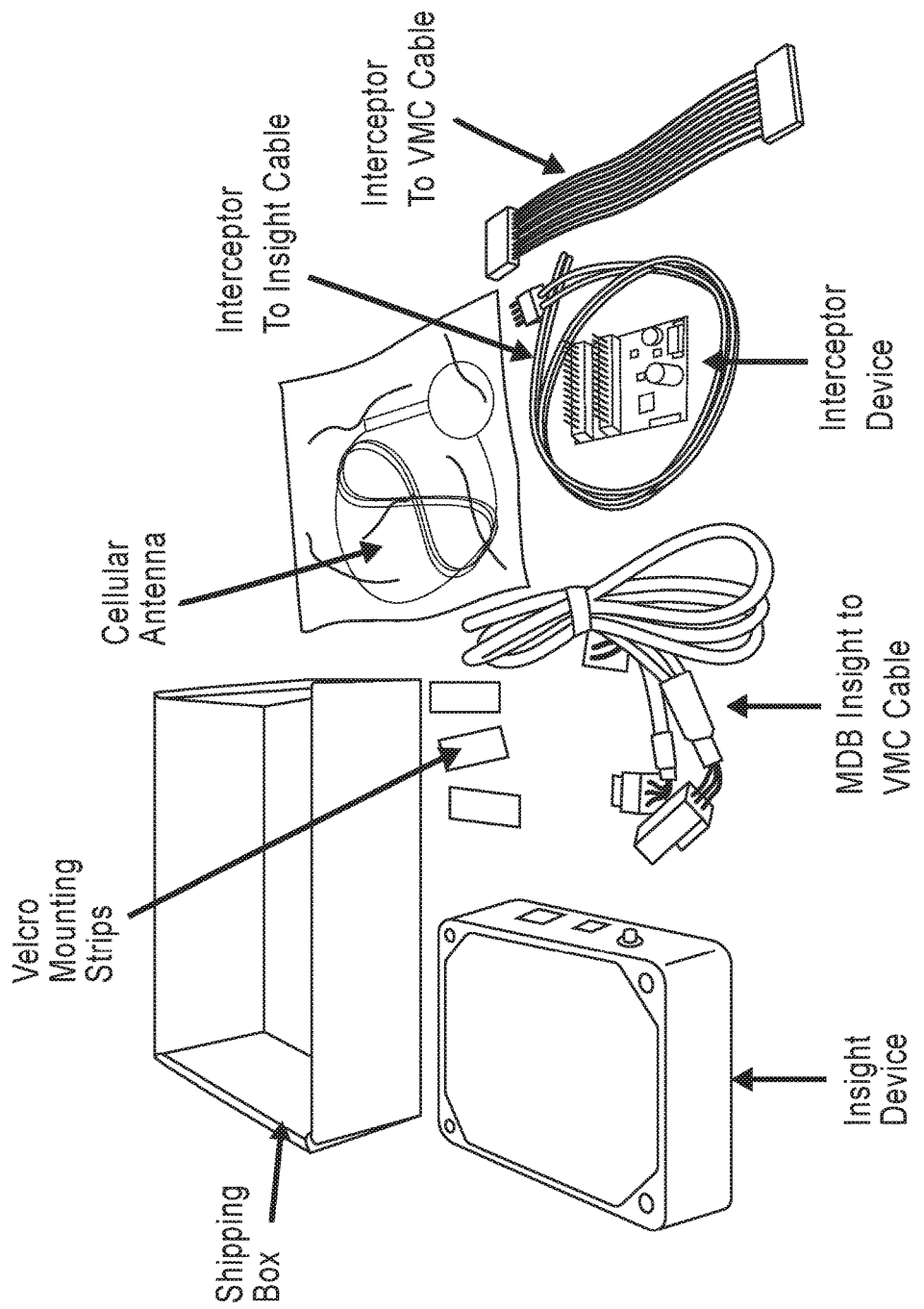

FIG. 29A is a photograph showing components of an installation kit, including an interceptor, cabling and antennas, according to an example implementation.

Figure 29B:
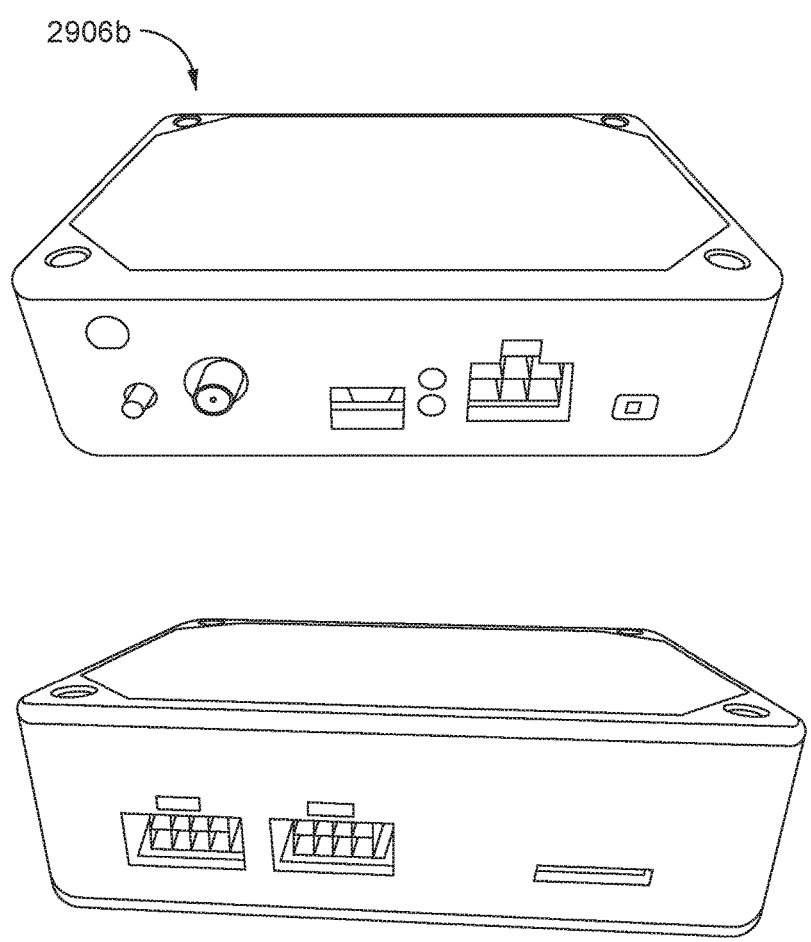

FIG. 29B is a photograph of an interceptor, according to an example implementation.

FIGS. 30A-30G illustrate an example mapping and modification of a vend machine, according to an implementation of an example embodiment.

DETAILED DESCRIPTION

Known vending systems do not manage or maintain a mapping of the complex relationship between selection buttons and the associated coils and columns (hereinafter referred to as "coils"). Without such a mapping, a mobile application-based touchless vending system cannot be implemented, for example since there is a multitude of combinations of machine makes, models, software versions, key pads and manually set button-to-coil configurations in the 6+ million vending machines in the field today.

According to embodiments of the present disclosure, systems and methods using a mobile application for touchless vending are described, which are able to accommodate the numerous features and configurations of the many different vending systems.

Listing of Terms

A card reader, as defined herein, is any device or combination of devices that includes a payment application and a physical payment credential reading mechanism, for example by near-field communication or magnetic stripe.

A coil, as defined herein, is a mechanism for holding and dispensing product (e.g., by mechanical actuation) from a vending machine. A coil can include a wire spiral, a mechanical column, a rotating tray and door combination, a vacuum arm, and/or any other dispensing mechanism.

A Consumer Mobile Payment Application ("CMPA"), as defined herein, is software that resides on a consumer's mobile device and provides functionality for communication with at least one processor and/or with other components of the system infrastructure.

A Data Exchange ("DEX") Vending Cable ("DEX Cable"), as defined herein, is a type of cable that is configured to connect the vending machine controller ("VMC") to one or more peripheral devices.

A DEX Vending File ("DEX File"), as defined herein, is a file that can be retrieved via a DEX Port on some vending management software ("VMS") systems.

A DEX Vending Port ("DEX Port"), as defined herein, is a physical connector on the VMC and/or on a peripheral that is configured to connect with the DEX Cable.

A DEX Vending Protocol ("DEX Protocol" or "DEX"), as defined herein, is the data formatting standard adopted and administered by the National Automatic Merchandising Association ("NAMA") that governs the way external devices such as handheld readers or DEX-based Telemeters connect to the VMC (defined below) to configure the VMC or to pull files of historical data for use in some VMS systems.

An Insight Device (also referred to herein as a "first processor"), as defined herein, is a device that resides within the vending machine and is configured to communicate with the VMC and/or to the CMPA.

An Interceptor (also referred to herein as a "second processor" or "interceptor device"), as defined herein, is a device that connects the first processor (Insight device) to the VMC, and connects the VMC to the selection mechanism (e.g., selection buttons).

A Mobile Device, as defined herein, is any device having a display screen, a processor, a component for data entry, and a component to connect either directly or indirectly to a network.

A Multi Drop Bus ("MDB") Vending Cable (MDB Cable), as defined herein, is a type of cable that is configured to connect the VMC to one or more peripheral devices.

A Multi Drop Bus for Vending Protocol (MDB Protocol or MDB) is the communication standard adopted and administered by NAMA that governs the way external devices such as a telemeter, a bill acceptor, a coin changer, a card reader or other devices, interact with the VMC using an MDB Cable.

A Merchant of Record, as defined herein, is a third party standing between the vending route operator and the merchant processor. The Merchant of Record receives funds for electronic payment transactions from the merchant processor and distributes them to the vending route operator.

A Merchant Processor, as defined herein, is the entity or combination of entities that receive, authorize, and settle electronic payment transactions as an authorized member of a payment network. Note that, in some cases, the Merchant Processor could also be the payment network.

An MDB Vending Port (MDB Port) is a physical connector on the VMC or peripheral device that is configured to receive/connect with the MDB Cable.

NAMA refers to the National Automated Merchandising Association—the trade association representing operators and vendors in the industry.

A Payment Credential, as defined herein, is any credential for authenticating a payment transaction, including, for example, an identifier stored in a magnetic stripe, an identifier stored on a smart card, an identifier sent via near-field communication ("NFC"), and/or a combination of a user name and password that is communicated in any other manner (e.g., via a pinpad, a fob, etc.).

Selection Buttons, as defined herein, refer to the electrical selection buttons on a vending machine (typically on the front of the vending machine). Selection buttons can include, for example, a set of individual buttons and/or an electronic key pad.

Space-to-Sales, as defined herein, is the practice of associating one or more coils with one or more selection buttons, for example in machines having multiple coils of the same product so, that they sell down evenly regardless of button press.

A Telemeter is, for example, a device that captures data from the VMC and delivers it to a VMS, for example wirelessly over a network.

A Vending Machine Controller ("VMC") refers to a motherboard (and/or a processor and related control software) that controls a vending machine's core operations and can incorporate one or more peripheral devices into the vending machine.

Vending Management Software ("VMS") refers to Enterprise Resource Planning ("ERP") software often used by vending route operator companies.

Touchless Vending System Overview

Figure 1A:
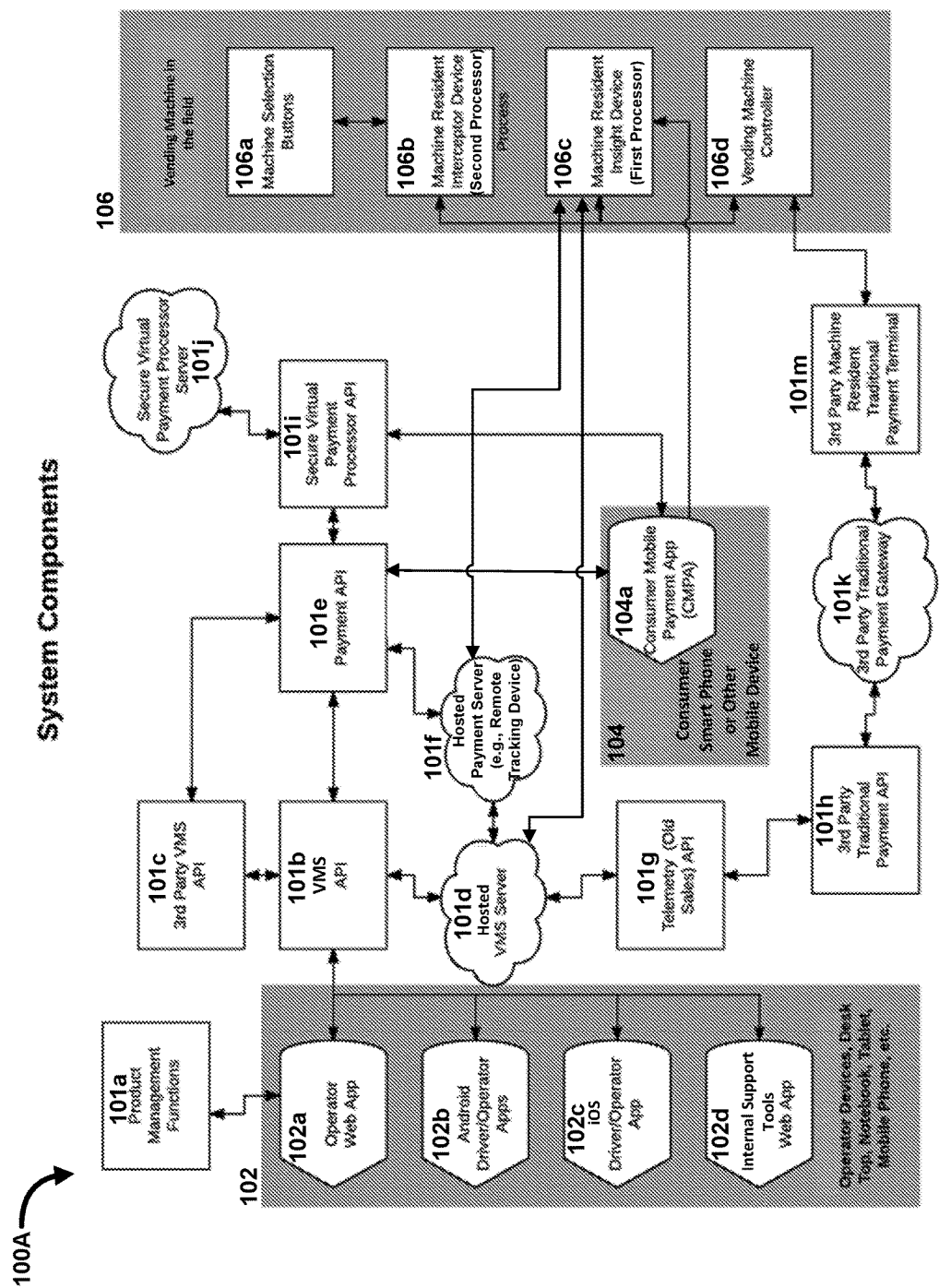
FIG. 1A is a diagram showing components of a touchless vending system, according to an embodiment.

FIG. 1A is a diagram showing components of a touchless vending system 100A, according to an embodiment. As shown in FIG. 1A, the system 100A can facilitate various communications between a hosted VMS server 101d, a hosted payment server (also referred to herein as a "remote tracking device") 101f, one or more operator devices 102 (e.g., a desktop, notebook, tablet, mobile phone, etc.), one or more consumer devices 104 (e.g., a consumer smart phone or other mobile device), and one or more vending machines 106 in the field. Depending upon the implementation, the remote tracking device can track one or more of: vend machine maintenance data, vend machine status data, historical transaction data, real-time (or substantially real-time) transaction data, user history, and/or the like. The operator device 102 can include an operator web app 102a, one or more Android driver/operator apps 102b, one or more iOS driver/operator apps 102c, and/or an internal support tools web app 102d. The operator web app 102a can communicate with, for example, one or more remote compute devices (e.g., a host server), to access one or more product management functions 101a. The one or more consumer devices 104 can include a consumer mobile payment app (CMPA) 104A stored thereon, the CMPA configured to interact with a payment application programming interface ("API") 101e, a secure virtual payment processor API 101i, and/or one or more machine-resident first processors (Insight devices) of the one or more vending machines 106. The secure virtual payment processor API 101i is communicably coupled to a secure virtual payment processor server 101j. Each vending machine of the one or more vending machines 106 can include multiple machine selection buttons 106a, a machine-resident second processor (interceptor device) 106b, the machine-resident first processor 106c, and a vending machine controller (VMC) 106d. Each VMC 106d is communicably coupled to a traditional (e.g., third party) payment terminal 101m that communicates, via a traditional payment gateway 101k, with a traditional payment API 101h. API 101h is communicably coupled to the hosted VMS server 101d via a telemetry API 101g. Likewise, the payment API 101e is communicably coupled to the hosted VMS server 101d, via a VMS API 101b and, optionally, via a third party VMS API 101c. First processor 106c is also communicably coupled to hosted payment server 101f and/or to hosted VMS server 101d, such that depending upon the embodiment, the first processor 106c can send communications to the payment server 101f, the hosted VMS server 101d, or both, which, in turn, can relay sales information to the VMS 101b. In some embodiments, the first processor 106c includes a cellular modem that can be used, for example, as a fall-back to capture information about cash sales that occur between cashless sales, so as to increase/ensure accuracy of sales data in the VMS 101b, e.g., for scheduling and just-in-time inventory purposes, and/or so as to supply the sales data to third-party VMS 101c. Note that, for embodiments that are fully cashless or predominately cashless, the cellular modem capability may not be included.

Depending upon the implementation, the first processor 106c and the second processor 106b can be separate devices, combined within a single integrated device, or incorporated into the VMC 106d (i.e., one or both of the first processor 106c and the second processor 106b can be physically and/or electrically incorporated into the VMC 106d).

Figure 1B:
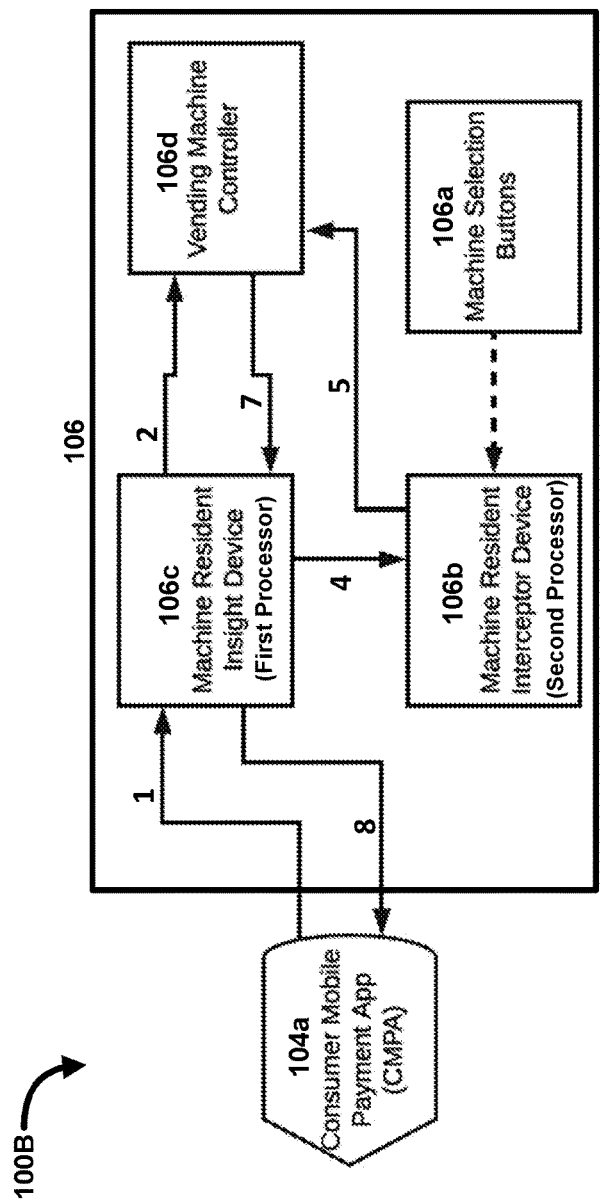
FIG. 1B is a flow diagram showing a touchless payment vend system, according to an embodiment.

FIG. 1B is a flow diagram showing a touchless payment vend system 100B, using components of FIG. 1A, according to an embodiment. As shown in FIG. 1B, a vending machine 106 (also referred to herein as a "vend machine") is configured to receive payments and product selections both locally (i.e., via machine selection buttons 106a disposed on the vend machine itself) and via the CMPA 104a. In a touchless vending process, the CMPA 104 sends a product selection message (or "signal") and a payment grant (along arrow "1") to the first processor (Insight device) 106c, which is disposed within the vend machine. In response to receiving the product selection message and payment grant, the first processor 106c initiates an MDB session with the vending machine controller ("VMC") 106d and sends a payment grant message (arrow "2"). During an MDB session, funds are requested from a payment device (e.g., the first processor 106c or a third-party reader), the payment device grants funds to the VMC, and the VMC, in turn, confirms that the transaction was successful. The VMC and the payment device communicate to initiate a payment session. Upon power-up and before a credential is presented, the VMC may provide the payment device basic information, such as machine make/model. The payment device alerts the VMC when it has a payment credential, and the payment device can then grant payment.

Upon receipt of the payment grant, the VMC 106d begins "listening" for a product selection. In other words, once payment has been received, the VMC 106d transitions into a mode in which it will act upon a vend instruction (e.g., if the vend instruction is received within a predetermined period of time from when the payment grant message was received). Concurrently with or subsequent to the sending of the payment grant message from the first processor 106c to the VMC 106d, the first processor 106c sends the product selection message (arrow "4") to the second processor (interceptor device) 106b, which is also disposed within the vend machine. In response to receiving the product selection message, the second processor 106b sends a "spoofed" signal to the VMC 106d (arrow "5") that emulates the selection button associated with the product identified by the product selection message. The VMC 106d, in turn, activates the vend motors based on the received spoofed signal and verifies that the requested product has been dispensed (i.e., in a "vend event"). Once the vend event has been verified, the VMC 106d sends a "vend complete" message (arrow "7") to the first processor 106c as part of the MDB session. The first processor 106c then sends a "vend successful" message to the CMPA 104a (arrow "8"). In some embodiments, when the CMPA 104a is communicating with the system 100B, the second processor 106b prevents a manual selection button 106a press signal from reaching the VMC 106d. Although shown and described herein in the context of vending machines, systems and methods of the present disclosure can facilitate the spoofing of any type of button press or other manually-triggered signal in a remote dispensing machine.

As shown in FIG. 1B, the second processor 106b can be configured to send an electronic signal to a vending machine controller 106d of the vend machine 106 to cause vending of a product in response to receiving a signal representing the product selection from the first processor 106c (e.g., as received from the CMPA 104a), and without receiving a signal representing a user selection from a button of the machine selection buttons 106a of the vend machine 106. In other words, the vending transaction is "touchless."

In some embodiments, multiple product selections can be made by a user/consumer via the CMPA 104a and sent to the first processor 106c. In such instances, the product selection signals corresponding to the multiple product selections can be "queued" such that they are serially processed. For example, a second product selection message will not be processed, and the corresponding second product will not be vended, until a "vend complete" message associated with the first product selection is sent to the first processor 106c and/or until a "vend successful" message associated with the first product selection is sent to the CMPA 104a.

In some embodiments, the system is configured such that a requested product will not vend until a user confirms, via the CMPA 104a, an identifier of a particular vending machine that the user is standing in front of. The user may confirm the particular vending machine, for example from multiple vend machines within a vending machine bank, a building, a room, etc., by entering or selecting a vend machine ID tag number.

Cash Payments with Transaction Tracking

Figure 1C:
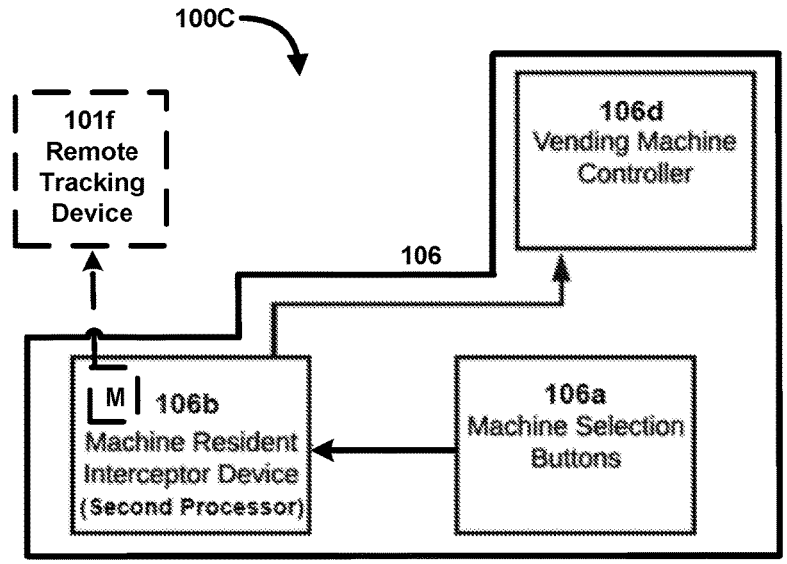
FIG. 1C is a flow diagram showing a first modified vend system, according to an embodiment.

In some embodiments, a vending system includes a modified version of a known vending machine, the modified vend machine having a capability for tracking local cash-based vending transactions. In some such embodiments, the system is also configured to receive touchless vending selections and payments, while in other such embodiments the system is not configured for mobile app-based purchases. FIG. 1C is a flow diagram showing a first modified vend system, according to an embodiment. As shown in FIG. 1C, a vend machine 106 includes machine selection buttons 106a, a VMC 106d and a machine-resident second processor (Interceptor device) 106b, but not first processor (Insight device). When a product selection is manually made by a user using the machine selection buttons 106a, a product selection signal is transmitted to the second processor 106b and relayed to the VMC 106d (e.g., by closing a connection on a motherboard of the vend machine 106). Unlike in known vending machines, where product selection signals are sent directly from the machine selection buttons 106a to the VMC 106d, the embodiment of FIG. 1C facilitates data gathering and/or the tracking of transactions at the second processor 106b, which may store the gathered/transaction data in a local memory ("M") thereof. The gathered data may be retrieved by an operator (e.g., by removal of a USB drive when servicing the vend machine 106) or, in an optional implementation, by wireless transmission to a remote tracking device 101f (e.g., a cloud storage or a remotely-located server). The gathered data can include information that is useful in marketing applications, for example a listing of "second choices" made by consumers when a first product selection was out of stock, or a listing of "complementary products" that consumers purchase along with other products (e.g., a frequency at which cola "X" and chips "Y" are purchased together). The remote tracking device 101f may be in network communication with one or more other servers as described herein. In some such implementations, the second processor 106b can be configured to modify a product selection signal (either autonomously or based on a communication with the remote tracking device 101f) before relaying the product selection signal to the VMC 106d. For example, if the product selection signal corresponds to a "cola" product at location "A1" of the vend machine, the second processor 106b and/or the remote tracking device 101f may detect that a coil or tray corresponding to position A1 in the vend machine is empty, and that the same "cola" product is in-stock at position B1 of the vend machine. Based on the determination, the second processor (optionally based on a modify message received from the remote tracking device 101f) can change the product selection signal (representing A1) to a modified product selection signal (representing B1) and send the modified product selection signal to the VMC 106d.

Figure 1D:
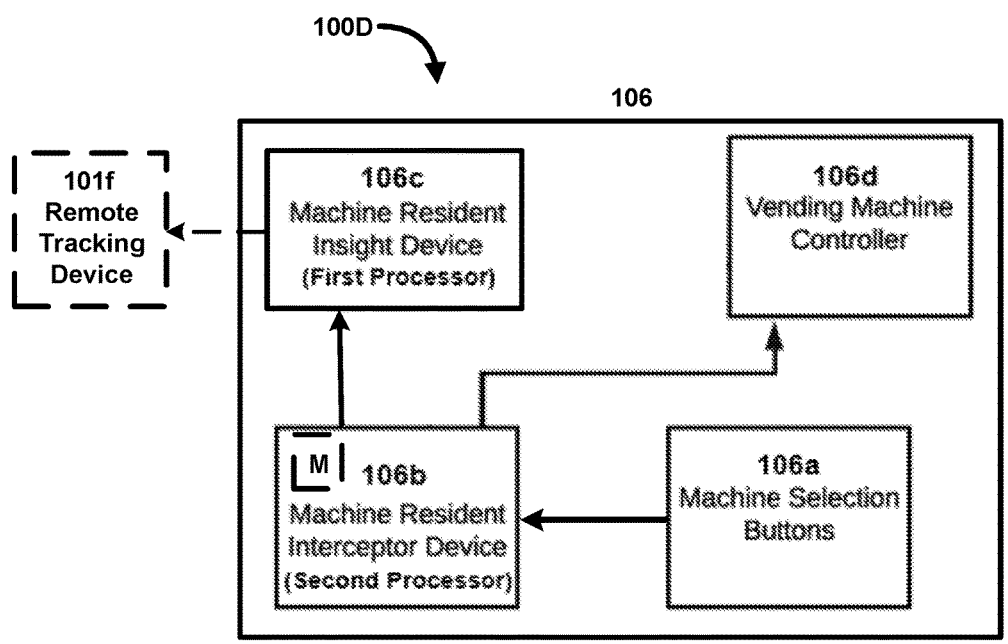
FIG. 1D is a flow diagram showing a second modified vend system, according to an embodiment.

FIG. 1D is a flow diagram showing a second modified vend system, according to an embodiment. As shown in FIG. 1D, a vend machine 106 includes machine selection buttons 106a, a VMC 106d, a machine-resident second processor (Interceptor device) 106b with optional internal memory "M," and a first processor (Insight device). When a product selection is manually made by a user using the machine selection buttons 106a, a product selection message is transmitted to the second processor 106b and relayed to the VMC 106d (e.g., by closing a connection on a motherboard of the vend machine 106). As was the case in FIG. 1C, and unlike in known vending machines (where product selection signals are sent directly from machine selection buttons to the VMC), the embodiment of FIG. 1D facilitates data gathering and/or the tracking of transactions at the second processor 106b, which may store the gathered/transaction data in a local memory ("M") thereof. The gathered data may be retrieved by an operator (e.g., by removal of a USB drive when servicing the vend machine 106) or can be transmitted to the first processor 106c (either in real-time or in a delayed manner) for wireless transmission to a remote tracking device 101f (e.g., a cloud storage or a remotely-located server). The remote tracking device 101f may be in network communication with one or more other servers as described herein. Similar to the system 100C of FIG. 1C, in some such implementations, the second processor 106b can be configured to send a modified product selection signal to the VMC 106d. The modified product selection signal can be generated autonomously at the second processor 106b and sent to the VMC 106d, generated at the first processor 106c and sent to the second processor 106b for relaying to the VMC 106d, or generated at one of the first processor 106c and the second processor 106b based on a communication (via the first processor 106c) with the remote tracking device 101f, and then sent, by the second processor 106b, to the VMC 106d.

For example, if the product selection signal corresponds to a "cola" product at location "A1" of the vend machine, the second processor 106b and/or the remote tracking device 101f may detect that a coil or tray corresponding to position A1 in the vend machine is empty, and that the same "cola" product is in-stock at position B1 of the vend machine. Based on the determination, the second processor (optionally based on a modify message received from the remote tracking device 101f) can change the product selection signal (representing A1) to a modified product selection signal (representing B1) and send the modified product selection signal to the VMC 106d.

Electronic Selection Button Mapping

Touchless vending systems of the present disclosure can include a first processor (Insight device) in combination with a second processor (interceptor device), a CMPA (also referred to herein as a "mobile app"), a remote tracking device (or payment server), one or more route driver applications ("driver apps"), one or more internal customer support tools, one or more electronic button map libraries, and one or more user procedures. As described further below, the touchless vending system can use a method for mapping and managing the selection button signal-to-product-to-coil relationship. There are generally two types of vending machines: individual selection button machines, and key pad selection machines.

Individual Selection Button Machine Mapping

Individual selection button machines generally have between 6 and 10 internal columns. Each column typically holds only one type of product, and can be actuated by a single vend motor that receives a signal from a VMC. The machine also has a set of individual buttons. Pressing one of these buttons closes an electrical connection, which sends a unique electrical signal to the VMC. The VMC, in turn, translates that signal into an instruction to activate a specific vend motor. This process is represented by the diagram of FIG. 2. As shown in FIG. 2, pins 1 and 2 are activated in response to machine selection buttons 206a being pressed, and a signal is correspondingly sent to the vend machine's VMC 206d, which, in turn, activates motor 208 to actuate, and cause vending of a product from column 1.

Mapping a set of individual buttons is an achievable task, provided a one-to-one correlation exists between selection buttons and coils. Unfortunately, this is often not the case. Many individual selection machines have more selection buttons than coils. In such cases, multiple buttons can be tied to a single coil. In addition, most machines allow the operator to configure a space-to-sales relationship. In such cases, a set of buttons can be configured to vend evenly across multiple coils. This is done to prevent a machine with multiple coils of the same product from having an individual selection button show "sold out" when the same product is in another column.

Key Pad Selection Machine Mapping

Mapping a vending machine with a selection key pad is a much more difficult endeavor. In most instances, key pad selection machines are glass front vendors with coil drives. A coil drive is a spiral wire that sits on top of a tray. The spiral wire is plugged into a socket on the back of the tray. A vend motor is connected to each socket. The motor spins the wire spiral, which pushes the product forward until it falls off the end of the tray into the product retrieval bay. FIG. 3 shows positions for products ("P") 1-26, organized within Trays 1-5, for a typical glass front vending machine 306 having a control panel 310 and product retrieval tray 312. FIG. 4 shows the placement of the coil sockets ("C") behind the product positions. Note that for trays 1-3, only one socket is present for each product position. Tray 4 positions 19 and 21 are doubled up to accommodate wider products, for example by using a single large spiral or two spirals with larger spacing. The VMC "knows" (i.e., stores configuration information indicating) that these sockets have been doubled, e.g., by the absence of a spiral or though user configuration. The VMC can accept a vend command relating to the relative position of the product and not the socket number. For purchases, selection-to-coil mapping does not need to take trays into account. Vending Management Software ("VMS") systems, which do merchandizing, scheduling and machine inventory control, can track trays as well as coils. It should be noted that the example given uses a numeric key pad with available selections from 1-26. This machine could also use an alpha numeric key pad which would tie the selection to the tray. For example, products in tray 1 could be identified as A1-A6, products in tray 2 as B1-B6, etc.

Figure 5:
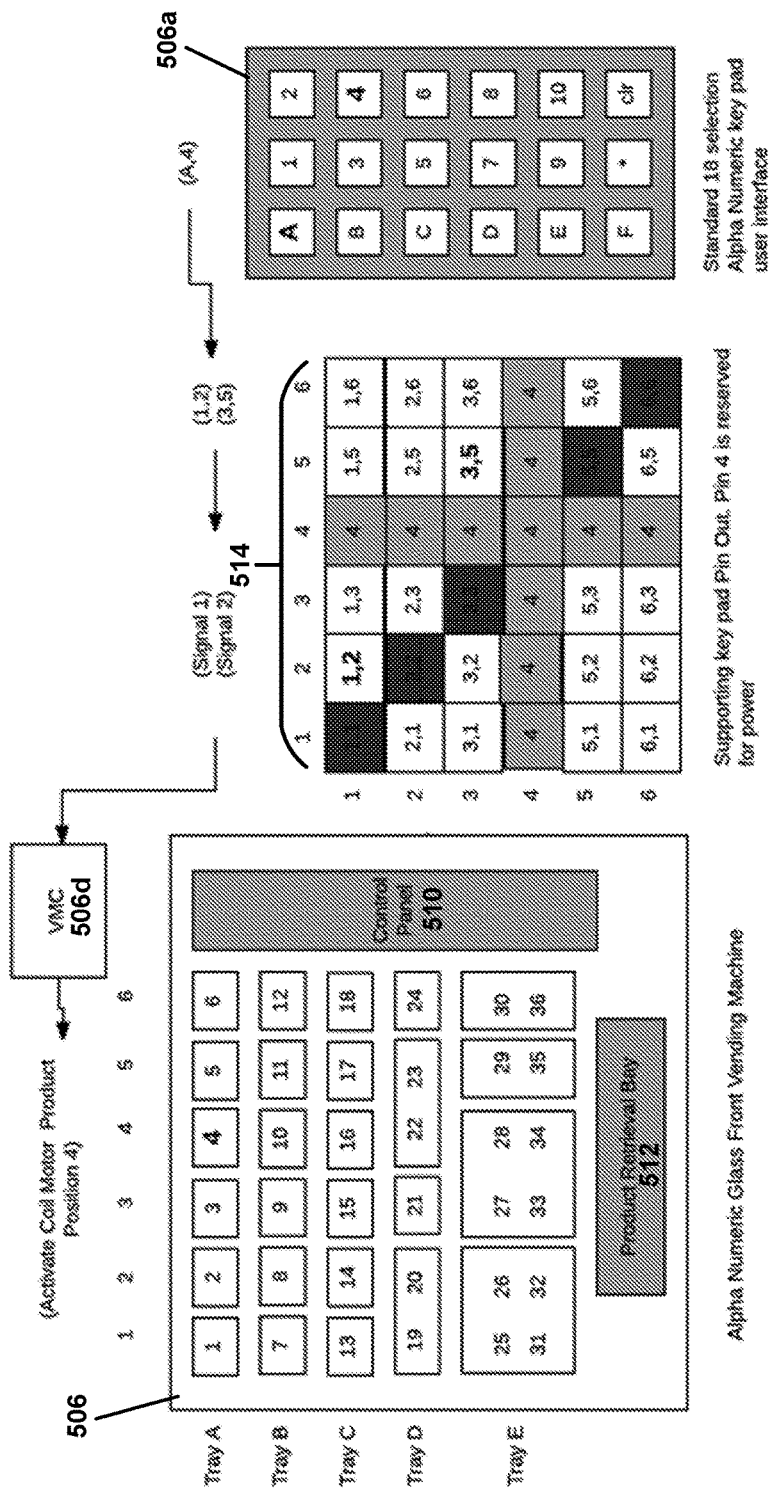
FIG. 5 shows a vending machine key pad (right), corresponding pin-out matrix (center), and product arrangement (left), when used in a vending operation, according to an embodiment.

Selection key pads present their own unique challenges when used in vending machines. FIG. 5 represents a typical key pad schema for a vending machine. The diagram on the far right shows the key pad 560a (e.g., of a control panel 510) as it would appear to a consumer, with alpha numeric buttons. The diagram in the middle represents the supporting pin-out matrix 514.

In this example the consumer manually presses the first button, in this case A. That button closes the connections between pins 1 and 2, which sends signal 1 to the VMC 506d. The consumer then manually presses button 4, which closes the connection between pins 3 and 5, which sends signal 2 to the VMC 506d. The VMC 506d then translates these signals as a command to turn the vend motor at position 4 in the vending machine 506, which corresponds to the product in tray A, column 4. The product in tray A at column 4 would then be dispensed into the product retrieval tray 512.

It should be noted that not all pin pairs are available for the selection process. The paring of one pin against itself is indicated in dark grey. Connecting a pin to itself provides no benefit. The text for pin 4 has a light gray background. This is to indicate that this pin is used to provide a constant supply of power and therefore would never be connected to any other pin. Therefore, there are 20 pairs available for making selections. In this example, the 18 pairs not in use have white squares with regular font; the two pairs in use have white squares with larger bold font.

Figure 6:
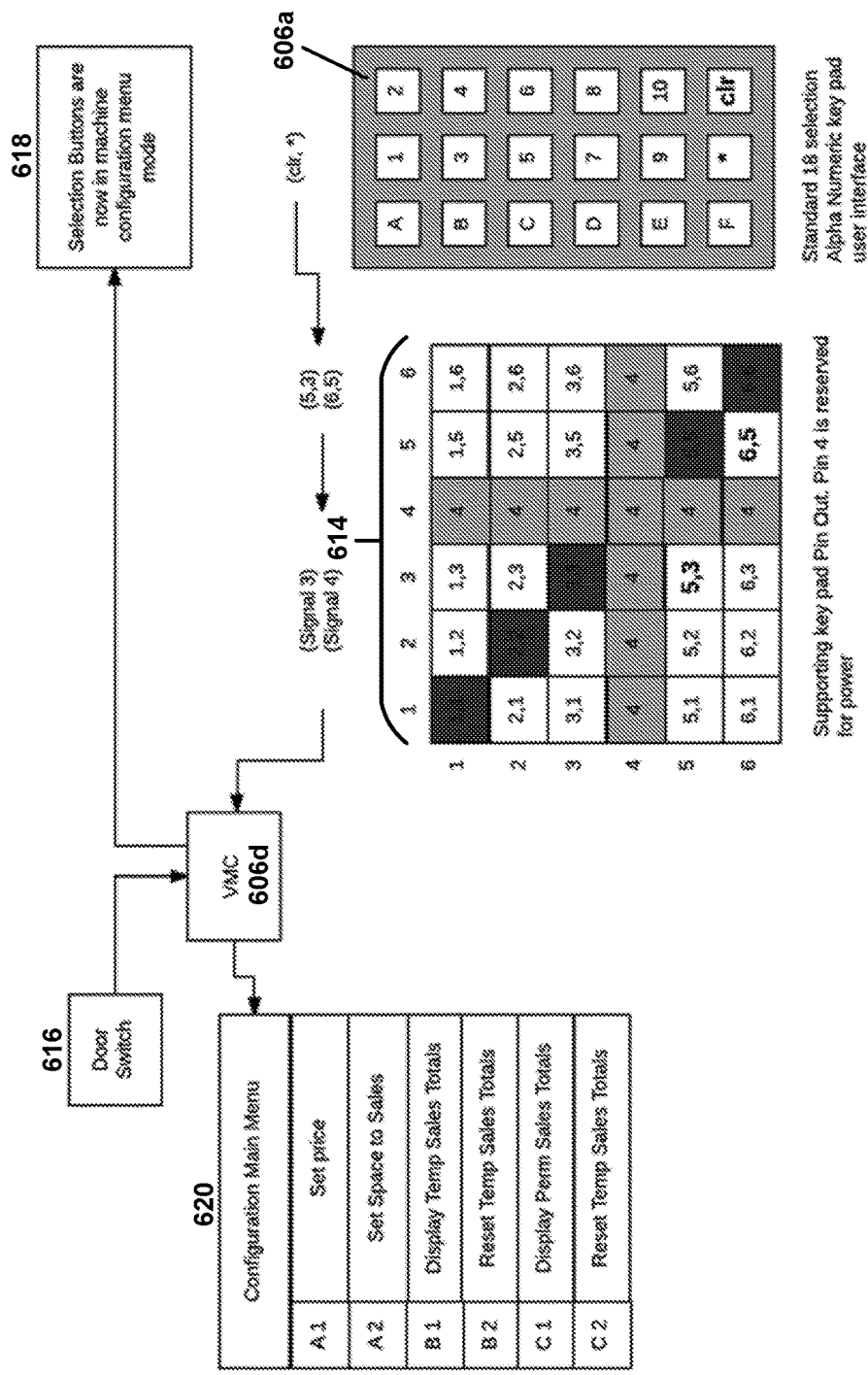
FIG. 6 shows a vending machine key pad (right), corresponding pin-out matrix (center), and product arrangement (left), when the vending machine is placed in configuration mode, according to an embodiment.

Another challenge is that the selection buttons are often used for purposes other than selecting products. FIG. 6 illustrates how this can happen. In FIG. 6, the opening of the door (detected by a door switch 616) enables the VMC 606d to accept a command to go into configuration mode 618. In this example, it is the manual pressing of the clear ("clr") and the asterisk (*) buttons of the keypad 606a. In other cases, configuration mode 618 can be triggered by a separate configuration button on the controller board.

The machine door is opened. The machine door switch 616 sends a signal to the VMC 606d that the door is open (e.g., to "unlock" or enable the vending machine to be placed into service mode, whereby the selection buttons can be used to re-configure the vending machine). The vending route driver manually presses the clear clr and the asterisk * buttons. This is translated into 5,3 and 6,5, and Signal 3 and Signal 4 are sent to the VMC 606d. The VMC 606d reads this signal as a command to put the machine into service mode, and the selection buttons are now in machine configuration menu mode 618, and can be used with instructions in the user's manual to send configuration commands to the machine. Configuration commands can be entered, for example, via a configuration menu 620, and can include set price A1, set space-to-sales A2, display temp sales totals B1, reset temp sales totals B2, display perm sales totals C1, and/or reset temp sales totals C2. Making a selection via the configuration main menu 620 can trigger one or more sub-menus and/or sub-routines, for example initiated by a further set of selection button presses. In some such embodiments, a paper configuration menu is also posted on the inside of the vend machine.

In some embodiments, a second processor (Interceptor) is disposed within the vending machine and configured to send a signal to the VMC 606d to spoof the signal that the door switch provides, resulting in a virtual "opening of the door" while the physical door to the vending machine remains closed. The vending machine could then be remotely be placed in service mode, and remotely configured (e.g., setting space-to-sales, changing price(s) for cash or cashless vends, and/or making any other configuration setting).

Figure 7:
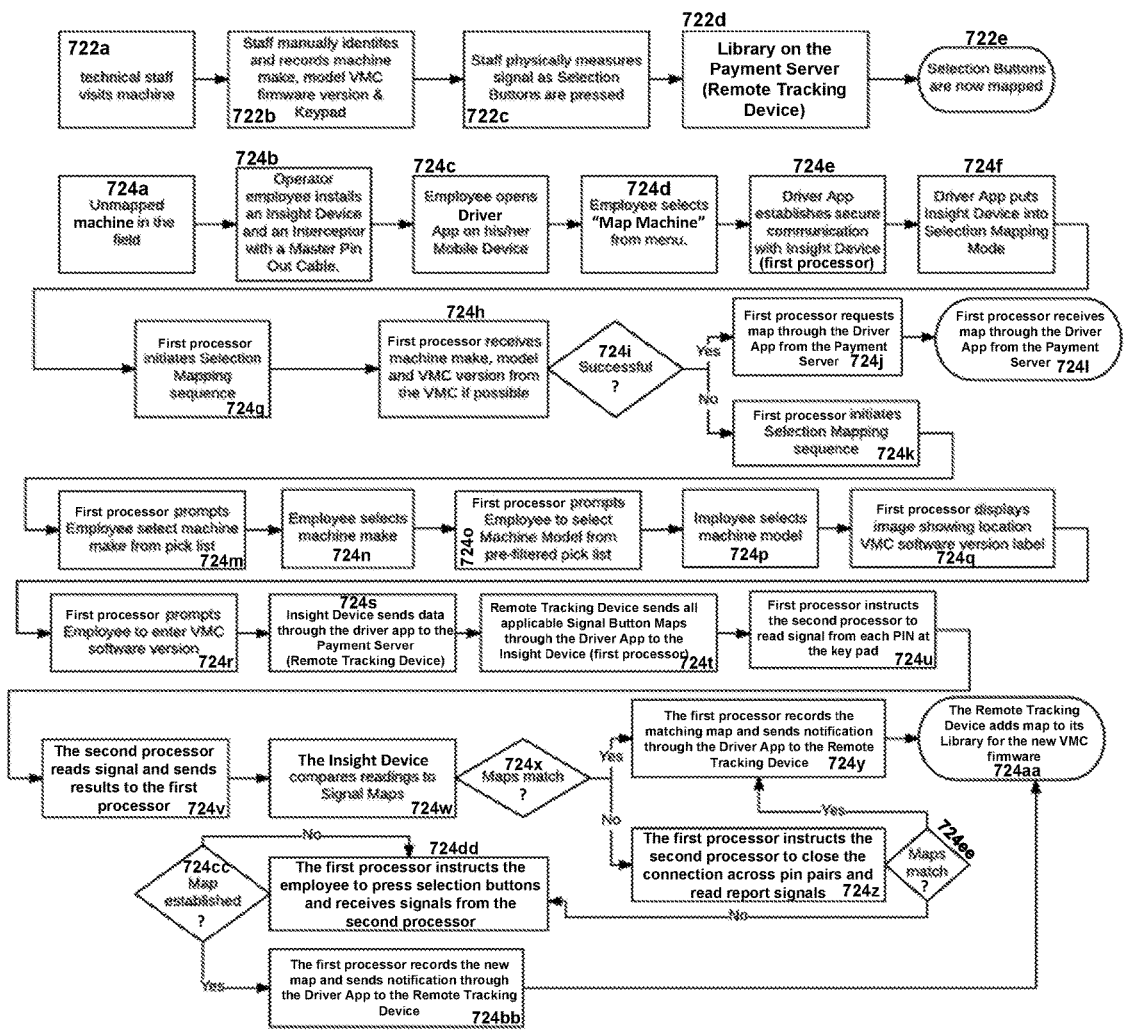
FIG. 7 is a flow diagram showing the creation of an electronic button map library, according to an embodiment.

With embodiments of the touchless vending system, selection buttons can be mapped to configuration instructions using the second processor (interceptor device). For vend machines in which a pin connection to the VMC board exists to initiate configuration mode, full remote configuration to the machine can be permitted through the CMPA.

Where the second processor (interceptor device) is unable to stand between the configuration command and the VMC, as would be the case with a hard-wired configuration mode button on the board, configurations can be transmitted to a driver app for automatic delivery by the first processor and the second processor, and an operator employee can manually initiate the configuration mode, as shown in FIG. 7.

As shown in FIG. 7, the creation of an electronic button map library can begin at 722*a*, when technical staff (also referred to herein as an employee) visits the vend machine. The staff manually identifies and records a make, model, VMC firmware version, and/or keypad type of the vend machine (722*b*). The staff then physically measures signals as each of the plurality of selection buttons are pressed (722*c*). Once the staff records all signal information in an electronic button map library on a remote tracking device (payment server) at 722*d*, the selection buttons are all mapped 722*e*.

Alternatively, for an unmapped vend machine in the field 724*a*, the creation of an electronic button map library can include installation, by an operator employee, of a first processor (Insight device) and a second processor (interceptor device) with a master pin-out cable 724*b*. The employee opens a driver app on his/her mobile device 724*c*, and selects "map machine" from a menu of the driver app (724*d*). The driver app establishes secure communication with the first processor 724*e*, and then puts the first processor into selection mapping mode 724*f*. The first processor initiates a selection mapping sequence 724*g*, in which the first processor receives a make, model, and/or VMC version of the vend machine (vend machine data) from the VMC at 724*h*, if possible. The vend machine data can be stored, for example, in a machine library of the first processor, the second processor, and/or a remote tracking device. If the retrieval of the vend machine data is successful at 724*i*, the first processor then requests a map through the driver app from the remote tracking device (payment server) 724*j*, and in response, receives the map through the driver app from the remote tracking device (payment server) 724*l*. If the retrieval of the vend machine data is not successful at 724*i*, the first processor initiates a selection mapping sequence 724*k*, in which the first processor prompts the employee to select a machine make from a pick list 724*m*. Once the employee selects the machine make at 724*n*, the first processor prompts the employee to select a machine model from a pre-filtered pick list 724*o*. Once the employee selects the machine model at 724*p*, the first processor displays an image showing a location of a VMC software version label 724*q* and prompts the employee, at 724*r*, to enter the VMC software version. The first processor sends the data entered by the employee through the driver app to the remote tracking device (payment server) 724*s*, and in response, the remote tracking device sends all signal button maps ("signal maps") applicable to the data, through the driver app, to the first processor 724*t*. The first processor instructs the second processor to read each signal from each pin at the key pad of the vend machine 724*u*. The second processor reads the signals and sends the results to the first processor 724*v*. The first processor compares the signal readings received from the second processor to the signal maps 724*w* to determine, at 724*x*, whether the maps match the readings. If the signal readings match one or more of the signal maps, then the first processor records the matching map and sends notification through the driver app to the remote tracking device 724*y*, and the remote tracking device adds the map to its library for the new VMC firmware 724*aa*. If the signal readings do not match one or more of the signal maps, then the first processor instructs the second processor to close the connection across the pin pairs and read report signals 724*z*. Again, a determination is made as to whether the read report signals match one or more of the maps 724*ee*. If there is a match to one or more maps, then the first processor records the matching map and sends notification through the driver app to the remote tracking device 724*y*, and the remote tracking device adds the map to its library for the new VMC firmware 724*aa*. If there is not a match to one or more maps, then the first processor instructs the employee, at 724*dd*, to press the selection buttons and receive signals from the second processor. Again, a determination is made as to whether the received signals match one or more of the maps 724*cc*. If there is a match to one or more maps, then the first processor records the new map and sends notification through the driver app to the remote tracking device 724*bb*, and the remote tracking device adds the map to its library for the new VMC firmware 724*aa*. If there is not a match to one or more maps, then the first processor again instructs the employee, at 724*dd*, to press the selection buttons and receive signals from the second processor, and the process proceeds as outlined above.

Vend machines can vary dramatically across a variety of parameters, and anomalies among vend machines having a common, make, model, etc., can also exist. Examples of such variations and anomalies include:

- Number of button presses for making a selection can vary, e.g., on a numeric or alphanumeric key pad. Examples include one button press, two button presses (e.g., A-1=two signals), three button presses (e.g., 101=3 signals).
- Some machines close two connections to the common for a single signal (e.g., pin 4 to 13 and pin 5 to 13 for button "A").
- Machines can have operational voltages that differ by significantly different amounts from a "common" voltage value (e.g., ground or reference). For example, one vend machine may have an operational voltage of 3V, while another vend machine may have an operational voltage of 24V, and correspondingly, the vend machines may use different electronic components.
- Some machines have VMC controller boards that use "normally closed" switches (inverting the signals), while different controller boards in the exact same make and model of machine use normally open. This can be determined, for example, by the type of pin pad used.
- Some machines include diodes in their selection buttons and multiplex signals.
- The physical placement of the common voltage (or ground) terminal(s) on the pin outs and how this impacts then need for cables and/or Interceptor connections can vary dramatically for different single button machines that use the same VMC controller board and VMC firmware (e.g., Royal 660 machines use the same VMC for 3, 6, 8, 9, 10, 12 and 13 button machines).
- There can be large variation in the way funds are granted to the VMC under the MDB protocol. For example, the MDB may not always be followed completely, or the MDB protocol may be interpreted differently across machine manufacturers.

In view of the foregoing anomalies and variations among vend machines, the generation of a signal map during retrofitting of a vend machine to include a first processor (Insight device) and a second processor (Interceptor) can be a complex task. An example set of vend machine data that was generated for a single vend machine for the purposes of signal mapping is provided in Table 1 below.

| Vend Machine: AP 12X | |
|---|---|
| Model: | 12X |
| Interceptor to Insight Cable: | CBIN-STD-1.0 |
| Interceptor to Selection | None |
| Interceptor to VMC | CBIV-AP12X-1.0 |
| Kit Order Name | AP12X |
| Firmware Version | 6.5r5 or greater |
| Requires retrofit board? | No |

MDB and DEX-Based Vending Management Software and Selection Button Mapping

Some embodiments described herein can manage and translate the different values that are reported out of the VMC DEX Port under the NAMA DEX Protocol and the values reported across the MDB cable under the NAMA MDB protocol. These values can be translated so that a touchless purchase transaction can be reported in a way that can be used by either an MDB-based VMS, or by a DEX-based VMS. DEX Files differ from MDB data in two key ways.

DEX Aggregates Transactions:

DEX Files are static reports that aggregate all transactions for a single coil across the report period. MDB provides live data on a transaction-by-transaction basis. This lack of granularity in the DEX File can create significant timing issues when trying to reconcile touchless payment transactions with a $3^{rd}$ party payment processor's system and DEX reports that are pulled only when the machine is filled and the cash is reconciled.

The lack of real time data from DEX also can create serious problems with out-of-date and hence inaccurate route schedules and pre-kitted machine inventory. MDB's real time data eliminates these issues. The lack of granularity in the DEX File can also greatly diminish its value for product merchandizing and other operational reports. The granularity of MDB data allows for far more robust merchandizing and other operational reporting. These inherent benefits can be used as part of its overall touchless vending system.

DEX and MDB Name Coils Differently:

DEX Files use a different designation for a coil than MDB. DEX essentially reports aggregate values for coils based on the field in the DEX file. For example, the value in a first field of the DEX file ("PA 1") would be the total sales for the first product positioned in the machine, a second field of the DEX file ("PA 2") would be the total sales for the second product positioned in the machine, etc. Each individual MDB transaction contains a value for the source Coil from which it comes. An example of this might be 01001 for the first coil in the machine. There is currently no source naming coil convention across manufacturers. And source Coil mapping to actual product position can vary by VMC firmware version. Currently, there are no publicly available conversion tables for all makes, models and VMC firmware versions. Within embodiments disclosed herein, a comprehensive table can be maintained and reporting can be based off MDB transactions. All other known VMS providers make use of the translation that happens within the VMC alone.

As described herein, the MDB data used to make touchless vending and MDB-based VMS work are translated into DEX-based aggregated totals so that third-party legacy DEX-based VMS systems can be supported.

Creating and Managing the Electronic Selection Button Map Library

The process described in FIG. 7 can be used to create an electronic selection button map library that is used to create and manage a touchless vending purchase transaction.

Creating and Managing a Master Product Table

Figure 8:
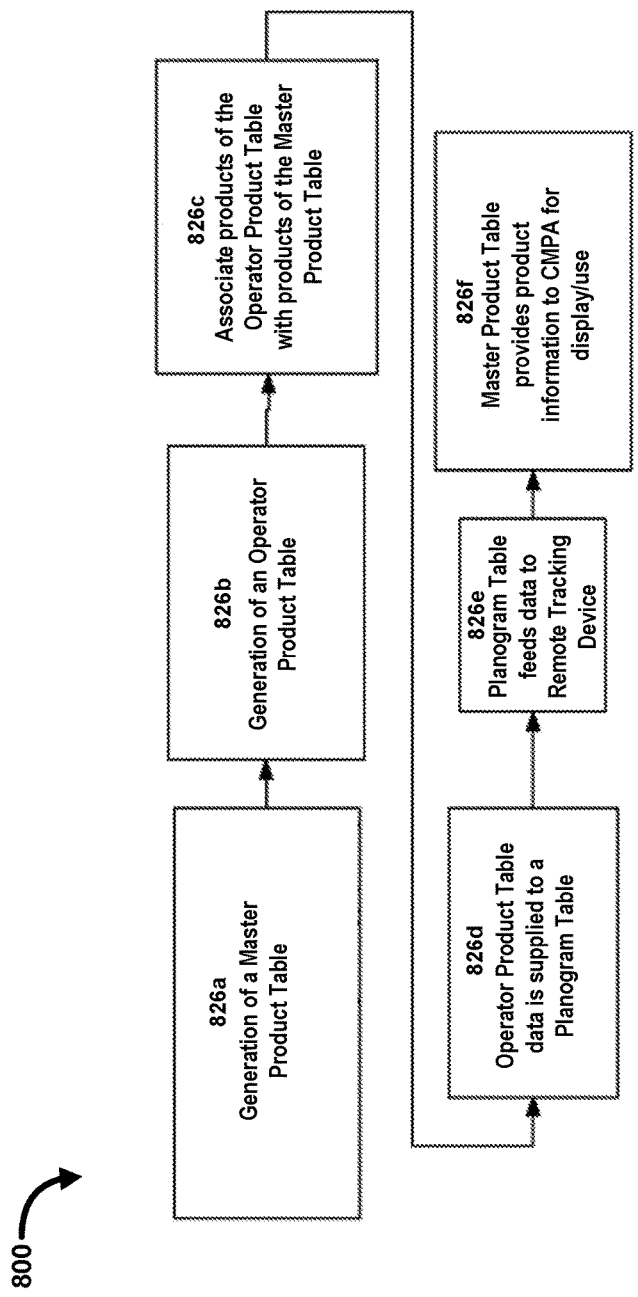
FIG. 8 is a flow diagram showing the creation of a master product table, according to an embodiment.

Some embodiments described herein include the ability to present a consistent user experience across all machines at all locations. Accordingly, a consistent set of product data can be created and managed. This is especially challenging since locations and/or individual machines can be managed by different operator companies using different product naming conventions and different product ID numbers within their VMS. FIG. 8 shows a process 800 by which a master product table can be created that associates a uniform set of product data to individual operator product tables, which use different naming conventions and other different fields for product data. This process also serves as the template for developing an API to allow integration to product and planogram tables in $3^{rd}$ party VMS. As shown in FIG. 8, A master product table is generated, at 826a, on the remote tracking device. The master product table associates a master product ID to a saved product image, nutritional information, a product category, description, name, etc. for use and/or display by the CMPA. At 826b, operators can create, upload, and/or change (e.g., via a web app) an operator product table for use by a VMS for warehouse scheduling and/or other functions. An operator can select a master product ID from a pick list for each product in the operator product table (826c). This, in turn, associates the products in the operator table with the products in the master product table. At 826d, the operator table, in turn, provides product data such as price, current quantity, coil(s), par level, etc. to a planogram table. The planogram table can provide the product data to the remote tracking device at 826e, and the master product table can provide product images, nutritional information, product category, description, name, etc. for display and/or use by the CMPA (826f).

Identifying Machines within Specific Locations

Figure 9:
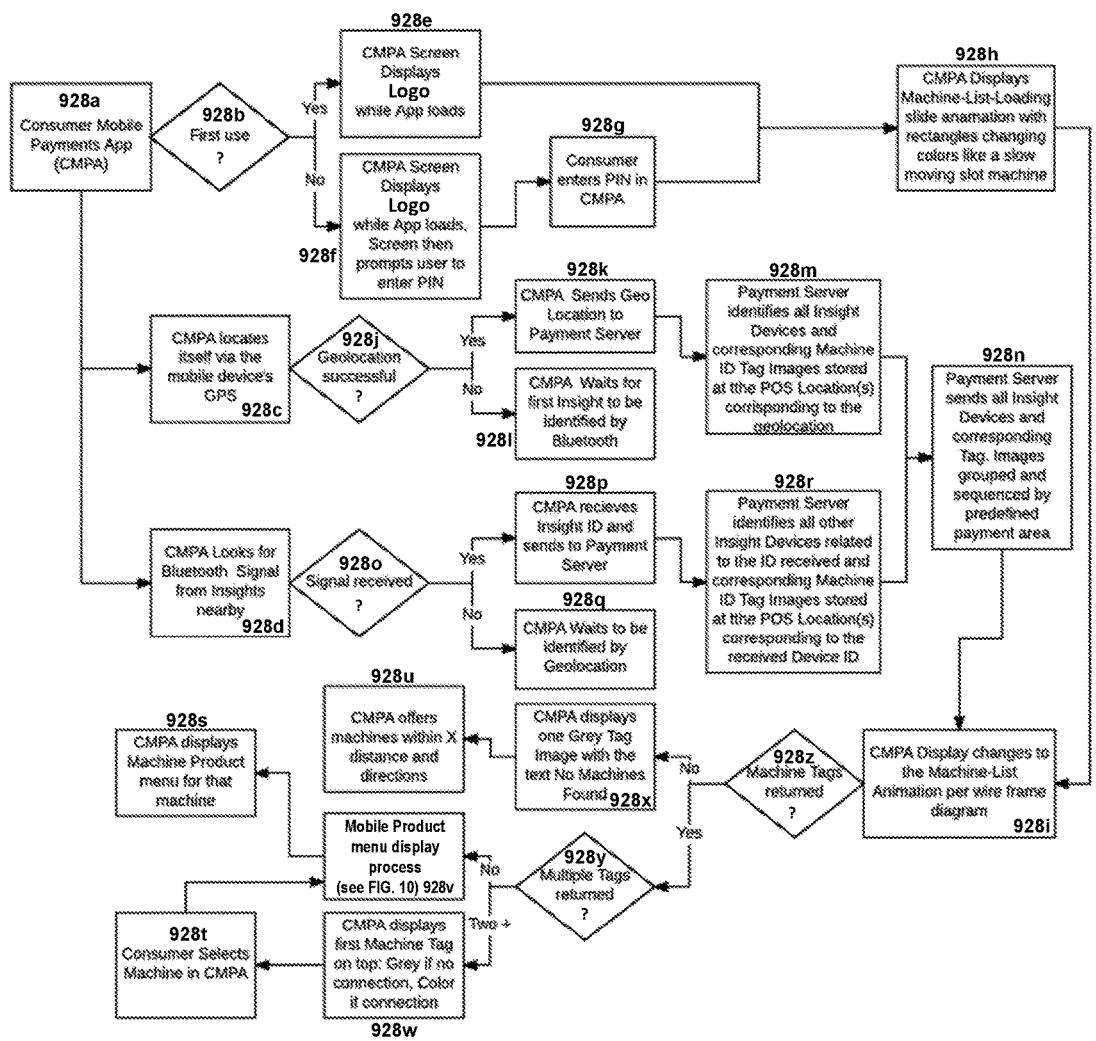
FIG. 9 is a flow diagram showing a machine identification and selection process, according to an embodiment.

Some embodiments described herein implement a method for handling significant challenges created by the nature of the vending business coupled with inherent limitations of communications technologies such as cellular, WiFi™, and Bluetooth®. Vending machines are often located in buildings. Geolocation through either GPS or cell tower triangulation is unable to differentiate between floors of a building and is of marginal value for a large building with a single street address associated with the GPS or tower triangulation. Most Bluetooth schemas reports all devices within range, regardless of distance or direction. All of this typically makes accurate positioning and differentiating multiple vending machines at a single location impossible without additional information. FIG. 9 shows a process 900 by which additional stored data ("on-file" site information) relating to building layout and the sequence of vending machines within a vend bank can be used to correctly locate and clearly identify a single machine from other machines nearby. As shown in FIG. 9, a CMPA is detected and/or initiates a transaction (e.g., by the app being opened on a mobile device) 928a. If it is determined at 928b that this is the first use of the CMPA by a particular user, the CMPA screen displays a logo while the app loads (928e). If it is determined at 928b that this is the not first use of the CMPA by a particular user, the CMPA screen displays a logo while the app loads and then prompts the user to enter their PIN (928f), and the user enters their PIN at 928g via the CMPA.

Once the app has loaded (and the user has entered their PIN, if applicable), the CMPA displays machine list loading animation (e.g., slide animation with rectangles that change color, similar to a slow-moving slot machine) 928h.

The CMPA attempts to locate itself, at 928c, for example using a GPS of the mobile device. If the geolocation is successful at 928j, the CMPA sends its geolocation to the remote tracking device at 928k. If the geolocation is not successful at 928j, the CMPA waits for a first processor of a vend machine to be identified (e.g., via Bluetooth) 928l. Concurrently with the geolocation, the CMPA looks for a Bluetooth signal from vend machines nearby (i.e., from the Insight devices, or first processors, thereof) at 928d. If a Bluetooth signal is received at 928o, the CMPA receives an identifier of the first processor (Insight ID) and sends it to the remote tracking device at 928p. If a Bluetooth signal is not received at 928o, the CMPA waits to be identified by geolocation 928q.

If the CMPA sends its geolocation to the remote tracking device at 928k, the remote tracking device identifies all first processors and corresponding machine identifier ("ID") tag images stored at the POS location(s) corresponding to the geolocation (928m). In some such implementations, the remote tracking device uses on-file site information, in addition to the geolocation, to identify all local vend machines. If the CMPA receives the identifier of the first processor and sends it to the remote tracking device at 928p, the remote tracking device identifies all other first processors related to the identifier received, as well as corresponding machine ID tag images stored at the POS location(s) corresponding to the received device identifier (928r). After steps 928m and/or 928r have completed, the remote tracking device sends a listing of all first processors and corresponding machine ID tag images, grouped and sequenced by a predefined payment area (928n).

Once steps 928h and 928n have completed, the CMPA display changes to the machine list animation per wire frame diagram (928i). If no machine Id tags are returned at 928z, the CMPA displays a grey tag image (928x) with the text "No Machines Found" and, optionally, displays a listing of known vend machines within a predetermined distance of the user's location and directions to the known vend machines (928u). If one or more machine ID tags are returned at 928z, a determination is made as to whether multiple machine tags were returned (928y). If multiple machine ID tags were returned, the CMPA displays a first machine ID tag "on top" of the CMPA user display. The graphical representation of the first machine ID tag can be grey if there is no connection, and colored if there is a connection (928w). The user of the CMPA can then select a machine, at 928t, via the CMPA, and then the mobile product menu display process commences (928v), as described in greater detail below with reference to FIG. 10. If multiple machine ID tags were not returned (i.e., only one machine ID tag) at 928y, the mobile product menu display process commences (928v). In either case, the CMPA displays, at 928s, a machine product menu for the selected vend machine.

Interactive Product Menu

Some embodiments described herein implement a method for using VMS and other data to create a menu that is more intuitive and interactive than simply displaying machine planograms. The remote tracking device processes planogram data to create a menu of products that remove duplicate and sold out products while providing the ability to direct the consumer to a filter by product category or to be directed to a different location where the desired product is available. This process is described in FIG. 10.

Figure 10:
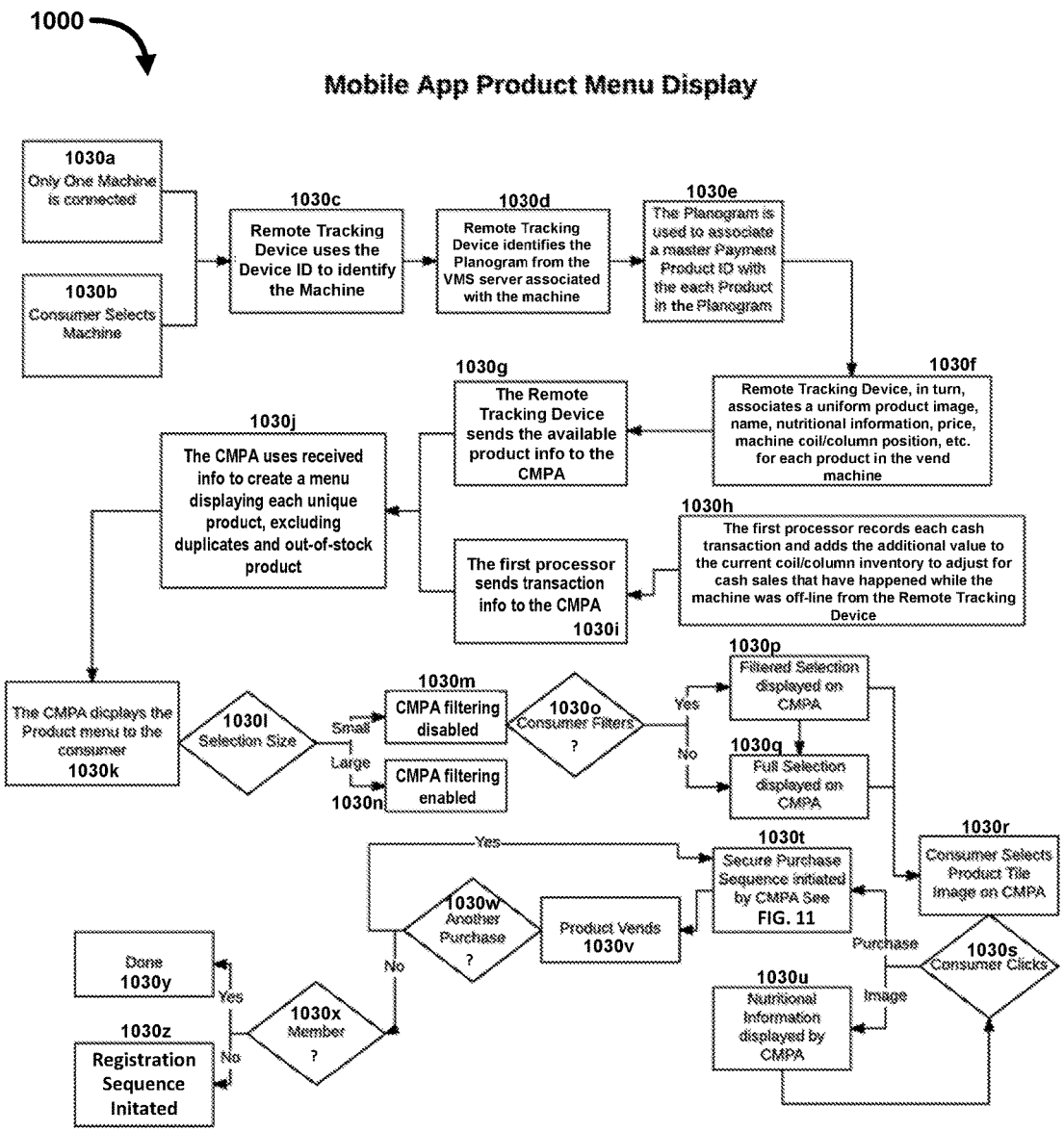
FIG. 10 is a flow diagram showing the generation and display of a product menu via a mobile software application ("app"), according to an embodiment.

As shown in FIG. 10, a "mobile app product menu display" process 1000 begins when either only one machine is connected to the CMPA (1030a) or when a consumer selects a machine via the CMPA (1030b). The remote tracking device uses the machine ID tag (device ID) to identify the vend machine (1030c), and identifies the planogram from the VMS server associated with the vend machine (1030d). The planogram is used to associate a master payment product ID with each product in the planogram (1030e). The remote tracking device, in turn, associates a uniform product image, name, nutritional information, price, and/or machine coil/column position for each product in the vend machine (1030f). The remote tracking device sends the available product information to the CMPA (1030g). Separately, the first processor (Insight device) of the vend machine has been recording each cash transaction and adding the additional value to the coil/column inventory to adjust for cash sales that have happened while the vend machine was off-line from the remote tracking device (1030h). The first processor sends this transaction information to the CMPA (1030i). At 1030j, the CMPA uses the received available product information and the received transaction information to generate a menu displaying each unique product, excluding duplicates and out-of-stock product, and displays the product menu consumer/CMPA user (1030k). If a selection size of "small" has been selected (1030l), CMPA filtering is disabled (1030m), such that the largest selection of products possible 1030q is concurrently viewed via the CMPA (with the smallest icon size). However, if the user subsequently applies filtering (1030o), then a filtered selection of products will be displayed via the CMPA (1030p). If a selection size of "large" has been selected (1030n), CMPA filtering is enabled. At 1030r, the consumer/user selects a product tile image via the CMPA, and clicks on it (1030s). If the user has clicked on the image of the product, e.g., to view more information about the product, then nutritional information is displayed to the user via the CMPA (1030u). It the user has clicked on a "purchase" button, a secure purchase sequence is initiated by the CMPA (1030t), as described in greater detail with reference to FIG. 11 below, and the selected product is vended (1030v). If the user indicates via the CMPA that he/she would like to make another purchase (1030w), the process returns to step 1030t, where another secure purchase sequence is initiated, as described above and with reference to FIG. 11 below. Once the session/transaction is complete (i.e., the user does not make another vending purchase via the CMPA (at 1030w)), a determination is made as to whether the user is already a registered member (1030x). If he/she is a registered member, then the touchless vend process ends (1030y). If he/she is not a registered member, then a registration sequence is initiated (1030z).

In some embodiments, a single coil holds multiple products that are not of a uniform type. In such embodiments, the menu of products generated by the remote tracking device and displayed to a user via the CMPA includes only "next-to-dispense" products for the selected vend machine. The "next-to-dispense" products can be identified, for example, by a product map of the remote tracking device and/or one or more sensors of the vend machine (e.g., a camera, a barcode reader, an optical sensor, a scale, etc.).

Creating and Managing Touchless Vending Transactions

Figure 11:
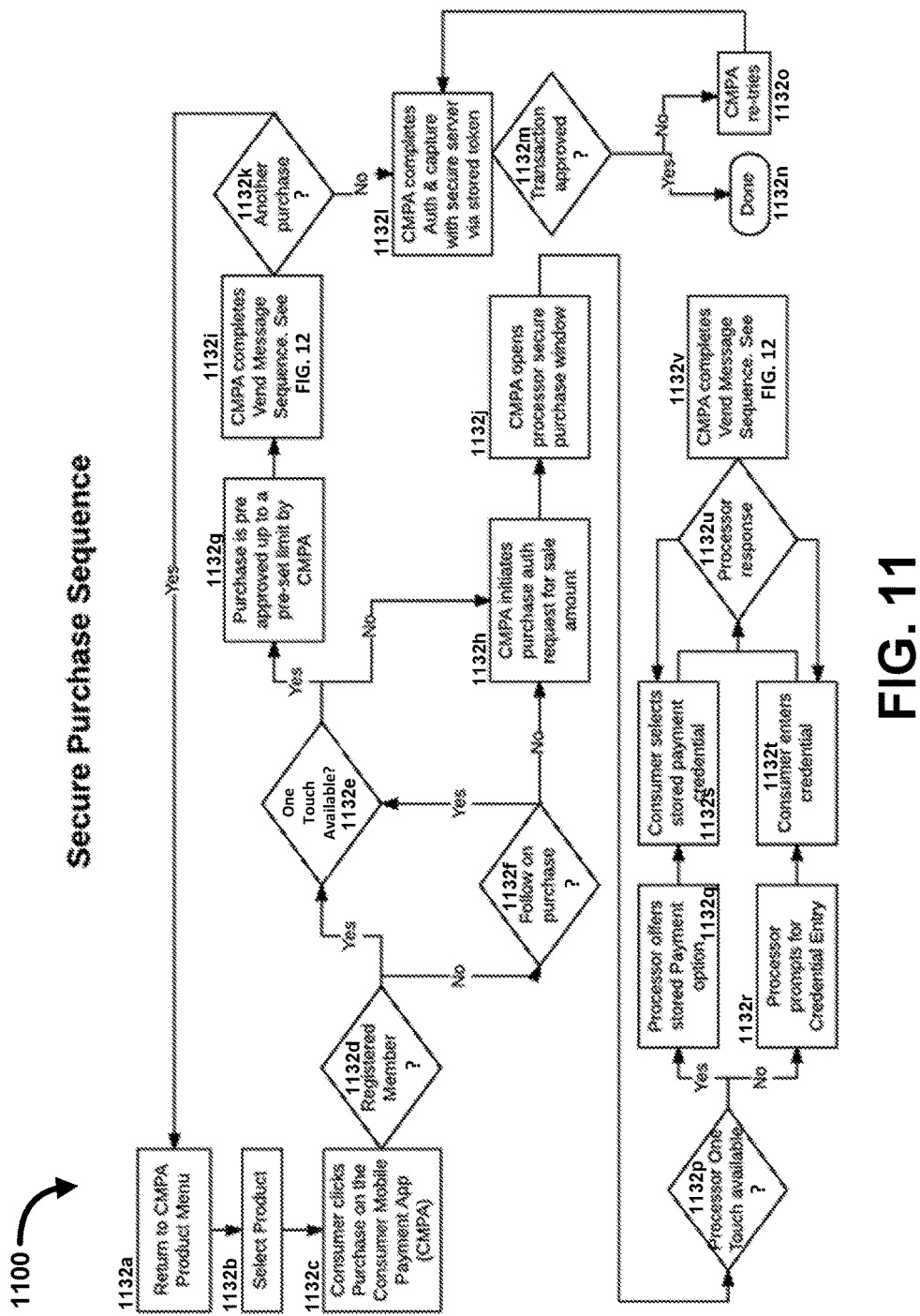
FIG. 11 is a flow diagram showing a secure purchase sequence, according to an embodiment.
Figure 12:
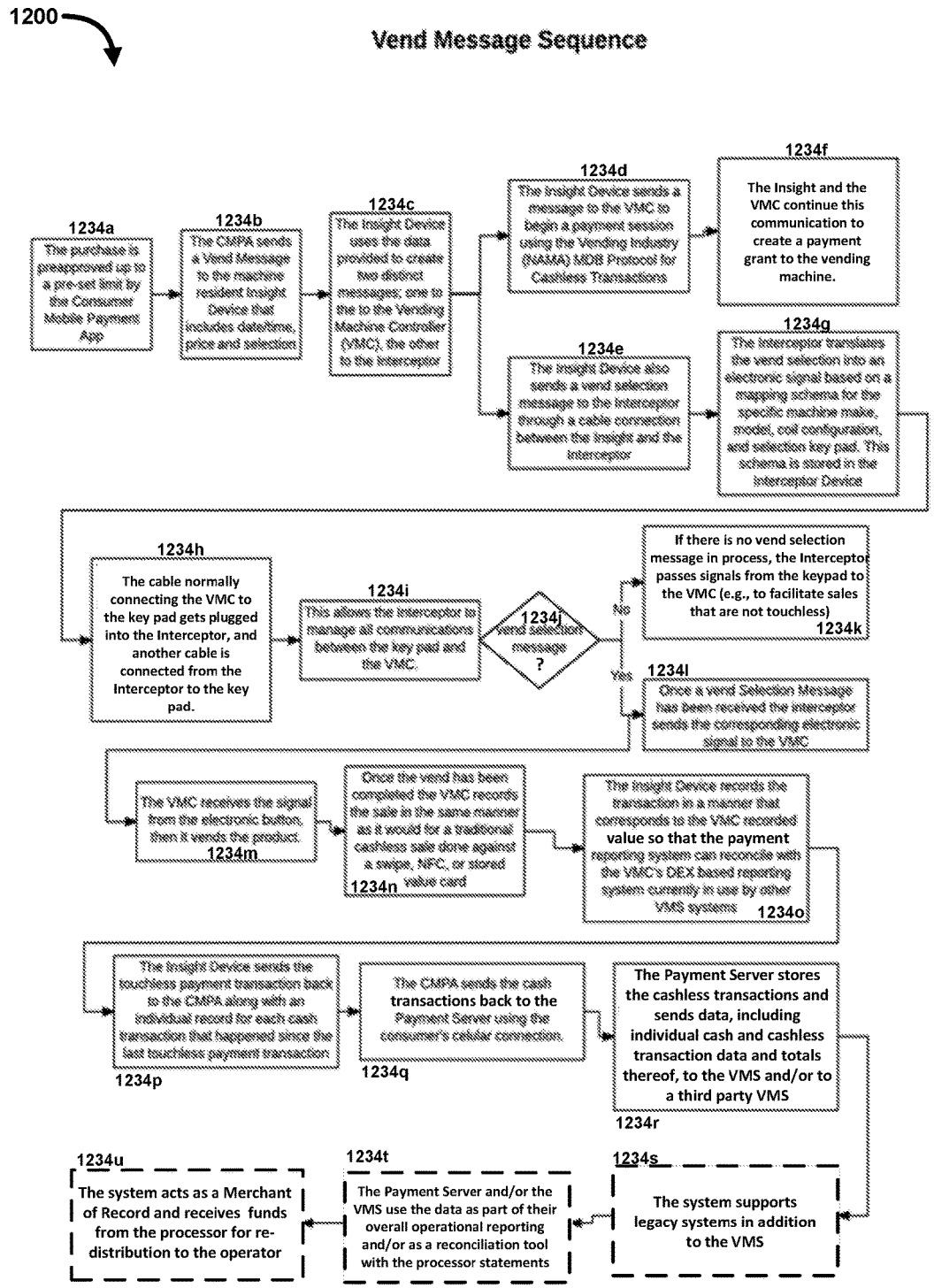
FIG. 12 is a flow diagram showing a vend message sequence, according to an embodiment.

FIGS. 11 and 12 describe how some embodiments described herein can create and manage individual touchless cashless vending transactions in real time making use of the consumer's mobile device and network connection.

As shown in FIG. 11, a secure purchase process 1100 begins at the product menu of the CMPA (1132*a*), where the CMPA user selects a product (1132*b*) and clicks purchase in the CMPA (1132*c*). If the user is a registered member (at 1132*d*), a determination is made as to whether an app feature by which the user can make a purchase by tapping a single button or via another single motion, such as a swipe across a touchscreen (also referred to herein as "One Touch") is available to that user (1132*e*), as may be established, for example, by a predetermined number of successful prior transactions using the system. If the user is not a registered member (at 1132*d*), a determination is made at 1132*f* as to whether the purchase is a follow-on purchase (i.e., of a previous purchase), and if so, the determination is also made as to whether One Touch is available to that user (1132*e*).

If the user is not registered and the purchase is not a follow-on purchase, or if One Touch is not available, then the CMPA initiates a purchase authorization request (1132*h*) for the sale amount by opening a processor secure purchase window (1132*j*) and determining whether One Touch is available (1132*p*). If One Touch is available, the processor offers a stored payment option (1132*q*), and the user may select the stored payment credential (1132*s*). If One Touch is not available, the processor prompts the user to enter his/her payment credential(s) (1132*r*), and the user enters the credential (1132*t*). After step 1132*s* or 1132*t* has completed, the processor responds (1132*u*), e.g., with a payment acknowledgment, thereby completing the vend message sequence (1132*v*)—see, e.g., FIG. 12.

If One Touch is available at 1132*e*, the user's requested purchase is pre-approved (1132*g*) up to a predetermined limit by the CMPA, and the CMPA completes the vend message sequence (1132*i*—see, e.g., FIG. 12).

If the user does not indicate another purchase via the CMPA during that session, at 1132*k*, the CMPA completes an authorization and capture process with a secure server via a stored token (1132*l*). If the transaction is approved at 1132*m*, the vend sequence is completed (1132*n*). If the transaction is not approved at 1132*m*, the CMPA re-tries (1132*o*) the authorization and capture process by returning to step 1132*l*.

If, at 1132*k*, the user does indicate another purchase via the CMPA during that session, the process returns to the CMPA product menu at 1132*a* and proceeds as outlined above and as shown in FIG. 11.

Turning now to FIG. 12, a vend message sequence 1200 is shown. At 1234*a*, a user purchase is preapproved up to a pre-set limit by the CMPA. The CMPA sends a vend message to the first processor of the vend machine (1234*b*) that includes date/time, price and product selection. The first processor uses the data provided to create two distinct messages: one to the VMC and the other to the second processor (1234*c*).

1. The first processor sends a message (1234*d*) to the VMC to begin a payment session using the vending industry (NAMA) MDB protocol for cashless transactions. The first processor and the VMC continue this communication to create a payment grant (also referred to herein as a "grant of value") to the vend machine (1234*f*). In some embodiments, the VMC is configured not to receive or process a message to vend a specific product without a grant of payment.

2. The first processor also sends a vend selection message (1234*e*) to the second processor through a cable connection between the first processor and the second processor. The second processor translates the vend selection into an electronic signal (1234*g*) based on a mapping schema for the make, model, coil configuration and key pad of the specific vend machine selected. This mapping schema can be stored in the second processor.

The cable normally connecting the VMC to the key pad is plugged into the second processor, which is disposed between the VMC and the vend machine keypad, and a further cable is connected from the second processor to the key pad (1234*h*). This facilitates the management, by the second processor, of all communications between the key pad and the VMC (1234*i*).

If no vend selection message is detected at 1234*j*, the second processor passes signals from the key pad to the VMC (1234*k*, e.g., to facilitate sales that are not touchless). If a vend selection message is detected at 1234*j*, the second processor sends the corresponding electronic signal to the VMC (1234*l*). The VMC receives the signal from the electronic button and vends the product (1234*m*). Once the vend event has been completed, the VMC records the sale in a manner similar to that of a traditional cashless sale done using a credit card swipe, NFC, or stored value card (1234*n*). The first processor records the transaction in a manner that corresponds to the VMC recorded value so that the payment reporting system can reconcile the VMC's DEX-based reporting system currently in use by other VMS systems (1234*o*). The first processor sends the touchless payment transaction back to the CMPA along with an individual record for each cash transaction that has occurred since the last touchless payment transaction (1234*p*). The CMPA sends the cash transactions back to the remote tracking device, e.g., using the user's cellular connection (1234*q*). The remote tracking device stores the cashless transactions and sends data, including cash and cashless transaction data and totals thereof, to the VMS and/or to a third-party VMS (1234*r*). Optionally, the system can support legacy systems in addition to the VMS (1234*s*). The remote tracking device and/or the VMS can use their collected data as part of their overall reporting and/or as a reconciliation tool with the processor statements (1234*t*). The system can acts as a merchant of record and receive funds from the processor for re-distribution to the operator (1234*u*).

Removing Machine Resident Devices and Gateway from PCI Scope

Figure 13:
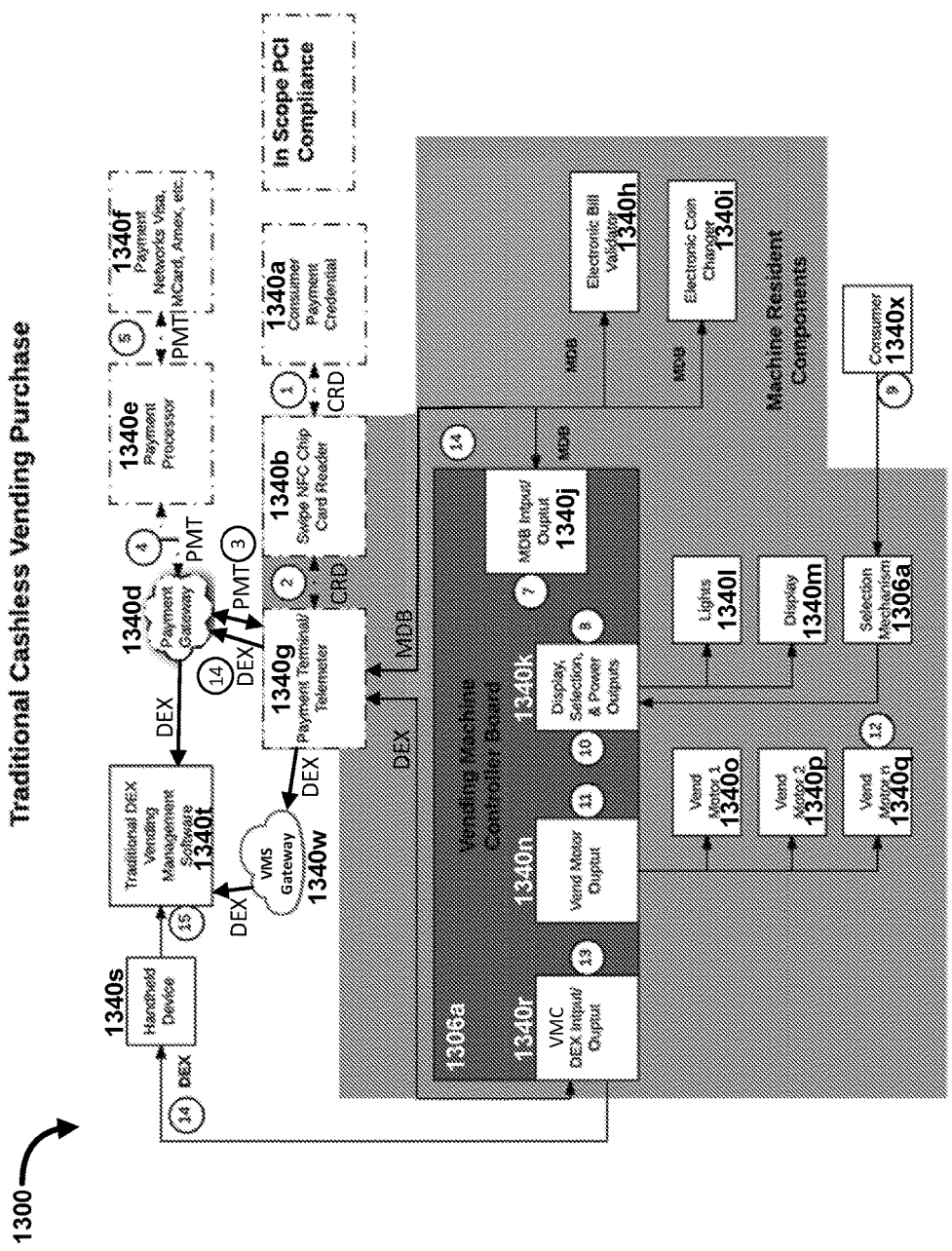
FIG. 13 is a flow diagram showing a traditional cashless vending purchase process.

Large open system debit and credit payment networks like Visa®, MasterCard®, American Express® and Discover® all have extensive compliance regulations for Personal Cardholder Information, often referred to as PCI. These requirements place a heavy burden in time and expense. FIG. 13 shows the components of a known Swipe/NFC Cashless Vending System that fall under PCI. By contrast, FIG. 14 shows how some embodiments described herein can use tokenization of virtual transactions to take these components out of scope of PCI.

As shown in FIG. 13, a secure consumer payment credential 1340*a* is received by a vend system 1300 as part of a traditional cashless vending purchase, by a swipe, NFC, or chip card reader (1340*b*) (thereby passing the secure credential, labelled "CRD" in FIG. 13), and a payment terminal/telemeter 1340*g* of the vend system communicates with a payment gateway 1340*d* (e.g., via a network) to send payment transaction information (labelled "PMT" in FIG. 13) such as that specified by ISO 8583, Visa data standards or other open payment system specifications, and, optionally, DEX data. Alternatively or in addition, the payment terminal 1340*g* can send the DEX data directly to the VMS 1340*t*. Payment information (e.g., including the secure credential from the user) is transmitted via the payment gateway 1340*d* to a payment processor 1340*e* in communication with one or more payment networks 1340f (e.g., Visa®, MasterCard®, American Express®, Discover®, etc.). Payment information can be received at a payment terminal/telemeter 1340g of the vend machine where the payment credential was received, or via one or more electronic bill validators (1340h) and/or electronic coin changers (1340i), and an MDB session/communication with the VMC, via an MDB input/output 1340j, is initiated. Display, selection and power outputs 1340k of the vend machine are activated (e.g., lights 1340l, display 1340m, selection mechanism 1306a), and in response to a product selection received at the vend machine by consumer 1340x, a vend motor output 1340n is triggered at one or more vend motors (e.g., a quantity "n" of vend motors can include vend motor 1 (1340o), vend motor 2 (1340p), etc. up to vend motor n (1340q), with the vend motor being triggered depending upon the product selected) to actuate the associated motor. Once the vend event is complete (i.e., the selected product has been vended/dispensed to the consumer 1340x), it is recorded in the VMC 1340r, and a DEX communication can occur, via the DEX input/output of VMC 1340r, in which a DEX file is requested. The DEX file request can be received at the VMC from the payment terminal 1340g and/or from a handheld device 1340s that is in communication with the DEX VMS 1340t. In response to the DEX file request, a DEX file is sent from the VMC 1340r to the payment terminal 1340g and/or to the handheld device 1340s. When the DEX file is sent to the payment terminal 1340g, the payment terminal 1340g either sends the DEX file to the payment gateway 1340d (which, in turn, sends the DEX file to the DEX VMS 1340t) or sends the DEX file, via separate and distinct transmission, to the DEX VMS 1340t via a VMS gateway 1340w. When the DEX file is sent from the VMC 1340r to the handheld device 1340s, the handheld device 1340s can forward the DEX file to the DEX VMS 1340t.

Figure 14:
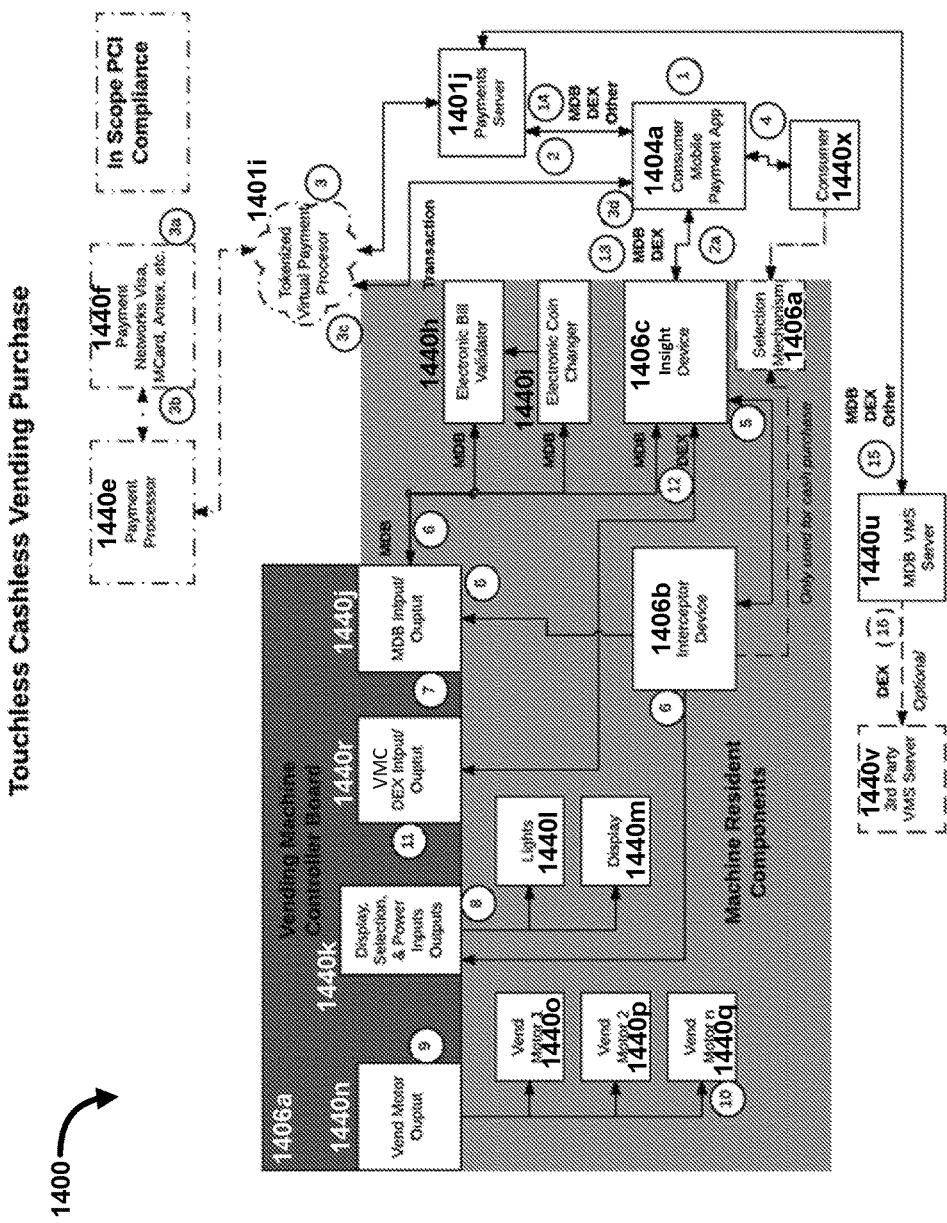
FIG. 14 is a flow diagram showing a cashless vending purchase process according to an embodiment.

In contrast with FIG. 13, a vend system 1400 for cashless vending purchases facilitated by the present disclosure, is shown in FIG. 14. As shown in FIG. 14, the cashless vending process can be initiated by a CMPA 1404a, whereby communications are established between the CMPA and a first processor (Insight device) 1406c of a vend machine and a payments server 1401j, using MDX or another protocol. Transaction information can be sent from the CMPA 1404a to a tokenized virtual payment processor 1401i, which is in communication with a payment processor 1440e, which in turn is in communication with one or more payment networks 1440f. A consumer/user "X" makes a product selection via the CMPA 1404a, and the product selection information is sent via the CMPA 1404a to the first processor 1406c for relaying to the second processor 1406b (interceptor device). As shown, traditional cash purchases are also permitted by the system 1400, since selection mechanism 1406a can also communicate with the second processor 1406b. As such, an electronic bill validator 1440h and an electronic coin changer 1440i, in addition to the first processor 1406c, can have MDB communications with an MDB input/output 1440j of the VMC board 1406a. Once a product selection is received at the MDB input/output 1440j, the display (1440m), selection lights (1440l), and power inputs and outputs 1440k of the vend machine are activated, and a vend motor output 1440n is triggered (e.g., vend motor 1 (1440o), vend motor 2 (1440p), or vend motor n (1440q), depending upon the product selected) to actuate the associated motor. Once the vend event is complete (i.e., the selected product has been vended/dispensed to the consumer X), a DEX communication can occur, via the DEX input/output 1440r, between the VMS 1440u and the first processor 1406c, in response to a request for a DEX file received at the VMC (via a DEX input/output thereof) 1440r from first processor 1406c. The requested DEX file is sent from VMC 1440r to first processor 1406c, which forwards the DEX file to the CMPA 1404a. The first processor 1406c can also send transaction information to CMPA 1404a. The CMPA 1404a sends the DEX file to the payments server 1401j (e.g., in addition to MDB transaction information), and the payments server 1401j can send the DEX file and/or MDB transaction information to an MDB VMS server 1440u. Optionally, the MDB VMS server 1140 sends DEX reporting data to a third party VMS server 1440v.

Registering Frequent Users

Figure 15:
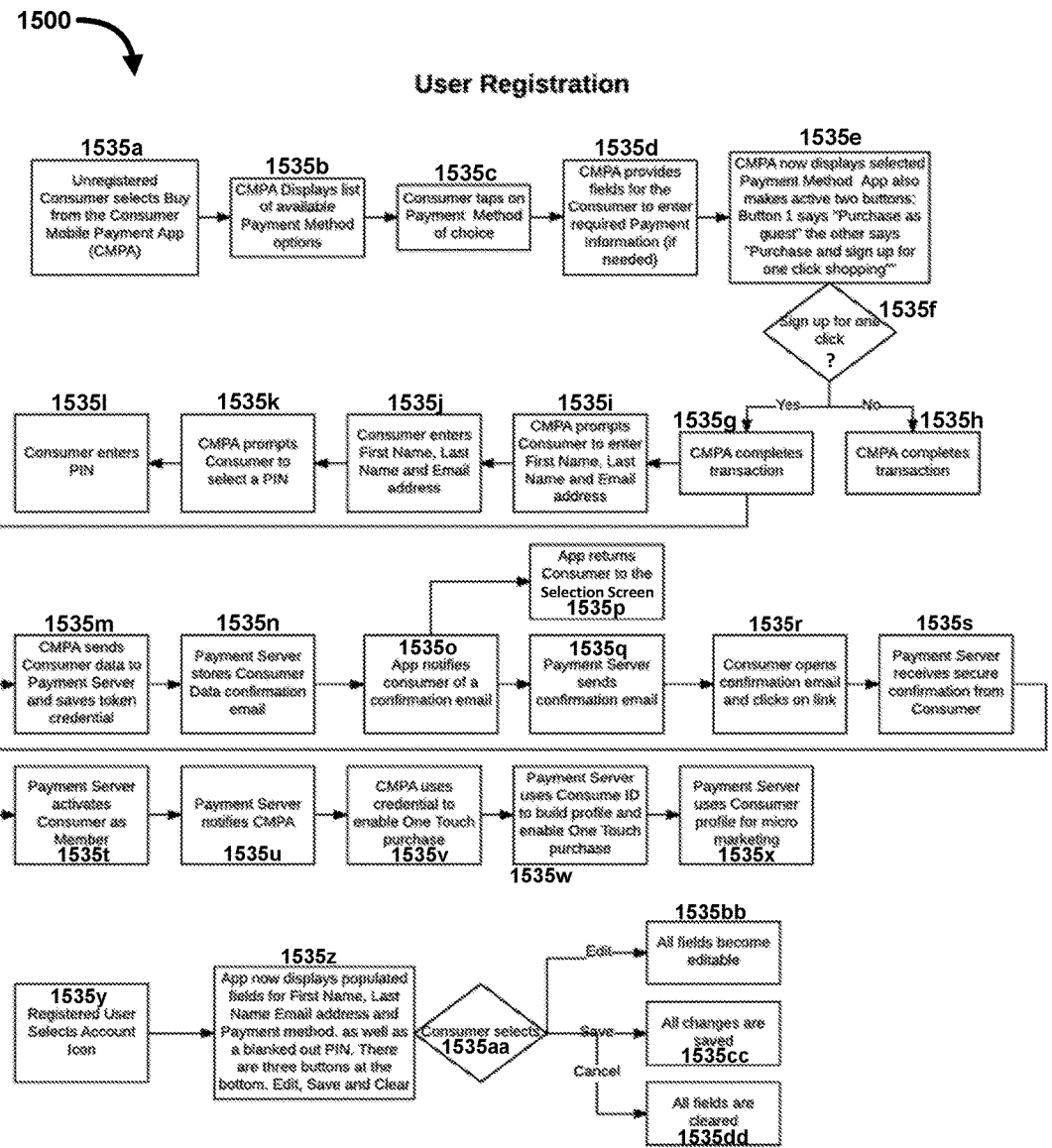
FIG. 15 is a flow diagram showing a user registration process, according to an embodiment.

Some embodiments described herein enables the gathering of consumer information to provide more comprehensive service to the consumer. Traditional payment networks, Visa, MasterCard, American Express, Discover, and their card issuers do not typically share cardholder names and addresses as part of the purchase transaction. Consumer registration on the CMPA overcomes this shortcoming and allows the touchless vend systems of the present disclosure to tie the consumer to the sale. This, in turn, enables a micro-marketing relationship between the consumer and the system's operator and product partners. FIG. 15 describes the user registration process.

As shown in FIG. 15, a user registration process 1500 begins when an unregistered user makes a purchase via the CMPA (1535a). The CMPA displays a list of available payment method options (1535b), and the consumer selects (e.g., by tapping on) one of the payment method options (1535c). The CMPA can provide fields (via the user interface) for the user to enter payment information, if needed (1535d). The CMPA then displays the selected payment method, and generates a "Purchase As Guest" button and a "Purchase and sign up for One-Click Shopping" button (1535e). At 1535f, the user indicates, via the CMPA, whether he/she wishes to register for On-Click by tapping on the appropriate button in the CMPA. If the user indicates "no," then the CMPA completes the transaction without registering the user (1535h). If the user indicates "yes," then the CMPA completes the transaction (1535g) and proceeds to prompt the user to enter their name and email address information (1535i). The user, in turn, enters the requested information (1535j). The CMPA prompts the user to select a PIN (1535k) and the user enters a PIN (1535l). At 1535m, the CMPA sends the user's information to the remote tracking device and saves a token credential (1535m). The remote tracking device also stores a consumer data confirmation email (1535n) and the CMPA notifies the user of a confirmation email (1535o). The CMPA then returns the user to the selection screen (1535p) and the remote tracking device sends the confirmation email (1535q). When the user opens the confirmation email and clicks on a link therein (1535r), the remote tracking device receives secure confirmation from the user (1535s) and activates the user as a registered member (1535t). The remote tracking device then notifies CMPA (1535u). The CMPA can use the user's credential to enable One Touch purchases (1535v), and the remote tracking device can use the user's ID to generate a profile and to enable One Touch purchases (1535w). The remote tracking device can also use the user profile for micro marketing (1535x). In some alternative embodiments, a user's unique mobile device ID can be used as a surrogate for the user name, e.g., when the user wishes to remain anonymous. In such cases, use patterns of the mobile device can be tracked. An example of a use pattern is the information that a consumer tends to purchase a specific brand of chips when he/she purchases a specific beverage. Such usage patterns can be established by transaction tracking even if the user is not known.

Subsequent to the initial registration process described above, when a registered user selects the "Account" icon in the CMPA (1535y), the CMPA displays populated fields for name, email address, and payment method, as well as a partially or fully obscured PIN number (1535z). There can be buttons at the bottom of the Account view, e.g., for "Edit," "Save," and "Clear." At 1535aa, when the user selects "Edit," all fields can become editable (1535bb). At 1535aa, when the user selects "Save," all fields can become editable (1535cc). At 1535aa, when the user selects "Cancel," all fields can be cleared (1535dd).

MDB and DEX Translation

Figure 16:
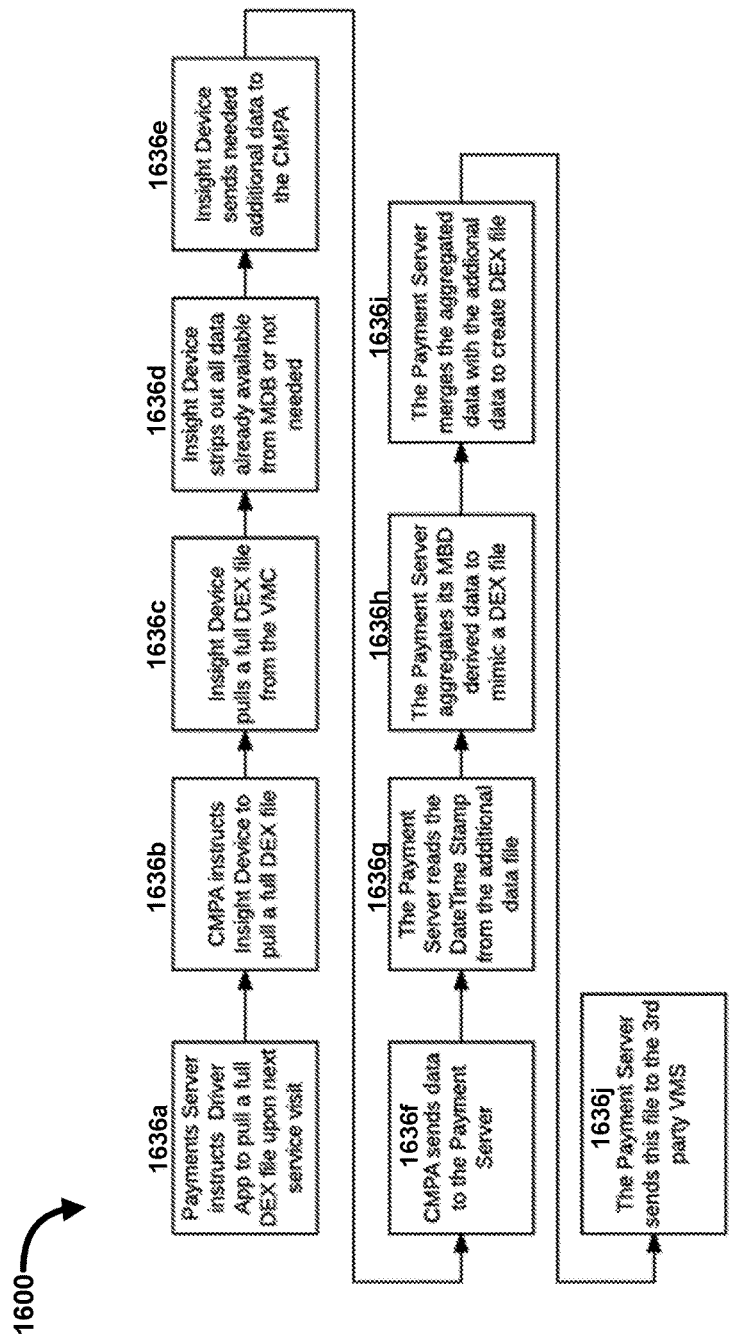
FIG. 16 is a flow diagram showing the generation of a DEX file, according to an embodiment.

As already described above there are significant differences between MDB and DEX-based data. Legacy VMS can't accept MDB data for two reasons. First, DEX-based VMS typically aggregates and reports sales as totals in the PA fields as specified in the NAMA DEX Protocol. Second, DEX-based VMS typically uses certain values like coins-to-box and bills-to-hopper that are not reported as part of the MDB transaction. FIG. 16 shows how some embodiments described herein adapt their reported output to accommodate DEX requirements in support of third party legacy VMS.

As shown in FIG. 16, a DEX file creation process 1600 begins when the remote tracking device instructs the driver app to pull a full DEX file (e.g., upon a next service visit to a vend machine) 1636a. The CMPA instructs the first processor to pull a full DEX file (1636b). The first processor pulls a full DEX file from the VMC (1636c) and strips out all data that is either already available from MDB, or that is not needed (1636d). The first processor sends the needed additional data to the CMPA (1636e), and the CMPA sends data to the remote tracking device (1636f). The remote tracking device reads the date/time stamp from the additional data file (1636g), and aggregates its MBD-derived data to mimic a DEX file (1636h). The remote tracking device merges the aggregated data with the additional data to create a new DEX file (1636i), and sends this new DEX file to the third party VMS (1636j).

Reconciling Under a Merchant of Record Relationship

A variety of relationships can exist among the various stakeholders in the payment transaction schema. One such relationship is known as "merchant of record." The relationship known as merchant of record places a third party between the retail merchant, in this case the route operator, and the merchant processor. In this scenario, the merchant processor pays the merchant of record for all settled electronic payment transactions net of processor fees and chargebacks. The merchant of record in turn pays the route operator the amount of the merchant processor's disbursement less any additional fees charged by the merchant of record.

Some embodiments described herein enable serving as merchant of record (or another predetermined relationship type) to solve several key financing problems many operators face. Route operations is a capital-intensive but low margin business. Technology is making a very significant impact on operator profits. Operators who put in real-time VMS can see net margins increasing from the industry standard 2.5% to upwards of 20% per year. At the same time, these VMS systems are capital intensive. Operators generally don't have the capital, capacity, or capability to buy hardware to connect machines, install them, or determine which upgrades are required to enable it, or implement it into their operations. This capital requirement is difficult to finance because it's highly labor intensive. Acting as the merchant of record enables the use of the operator's cash flow to collateralize the financing.

Some embodiments described herein solve two major hurdles to implementing a merchant of record schema in the vending industry: accounting for the receipts and disbursement of funds; and managing default risk.

Figure 17:
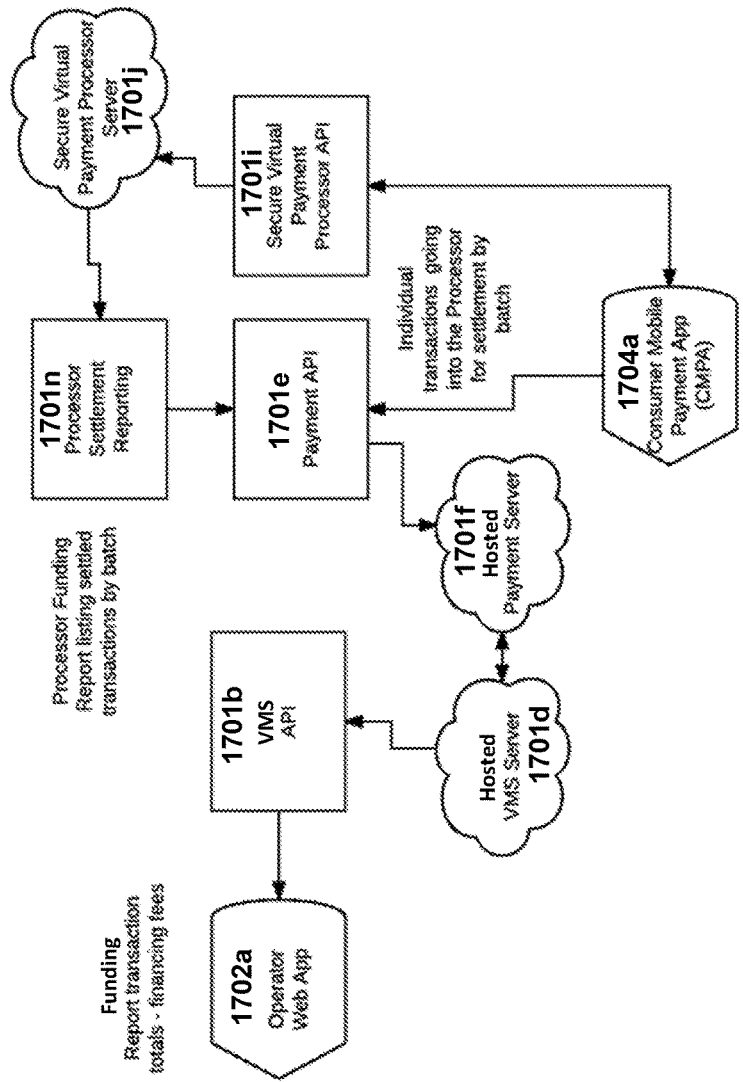
FIG. 17 is a flow diagram showing a touchless vending transaction management process, according to an embodiment.

FIG. 17 shows how touchless vending systems of the present disclosure are uniquely suited to manage this accounting process. As shown in FIG. 17, a system 1700 for reconciling as merchant of record includes a CMPA 1704a in communication with a payment API 1701e (whereby individual transactions can be sent to the processor for batch settlement) and a secure virtual payment processor API 1701i. The secure virtual payment processor API 1701i is communicably coupled to a secure virtual payment processor server 1701j, which is in communication with a processor settlement reporting server 1701n. The processor settlement reporting server 1701n can generate processor funding reports listing settled transactions by batch and send them to the payment API 1701e. The payment API 1701e can send transaction information and/or reports to a hosted remote tracking device 1701f, which is communicably coupled to a hosted VMS server 1701d. The VMS server 1701d can, in turn, provide transaction information and/or reports to a VMS API 1701b, which communicates with an operator web app 1702a that maintains records of funding report transaction totals and financing fees.

The CMPA manages each electronic payment transaction as it goes into the merchant processor, and records each transaction as it is approved and settled. This gives the touchless vending system a perfect record to match against the funding report that comes from the merchant processor at the time the batch is closed and payment is made to the merchant of record. This same process can be used to generate the funding report that goes to the operator at the time payment is made for settled transactions. In this way, the touchless vending system always stays in balance.

The touchless vending system, according to some embodiments, can also manage the risk to a financing partner. The operator relies upon the merchant of record to process electronic payment transactions, which serve as collateral for the financing. In the instance of touchless transactions, the proprietary nature of the technology prevents the operator from switching merchant processors in violation of the agreement. Unlike the generic world of known swipe- and NFC-based systems that perform touchless payments, the embodiments described herein firmly locks the operator to the merchant of record and processor.

The touchless payment system brings back each cash transaction along with each cashless transaction. This can be accomplished in one of at least two ways. For vend machines in which a majority of the transactions are cashless, or where immediate delivery of cash transactions is not a requirement, the first processor can store a record of each cash transaction as it happens, and then send all cash transactions that have occurred since the last cashless transaction along with the cashless transaction. For vend machines in which a significant number of transactions are cash and/or where timely delivery of cash sales is a requirement, a persistent communication can be maintained by the first processor. This could include, for example, use of cellular, WiFi, Ethernet, LAN to WAN, mesh networking, and/or the like. This, in turn, provides a level of visibility into the financial health of the operator that would not be available under other payment schemas. Finally, touchless payments will not work without the touchless payment system knowing exactly where each piece of equipment is at all times. This, in turn, secures the equipment as well as the revenue stream.

The touchless payment system could also be used to lock in the processor relationship to manage reconciliation and risk in an instance where there is no merchant of record or other payment schemas/processor relationships, or where the merchant processor settles directly with the route operator.

Cash Payment Vending

Figure 18:
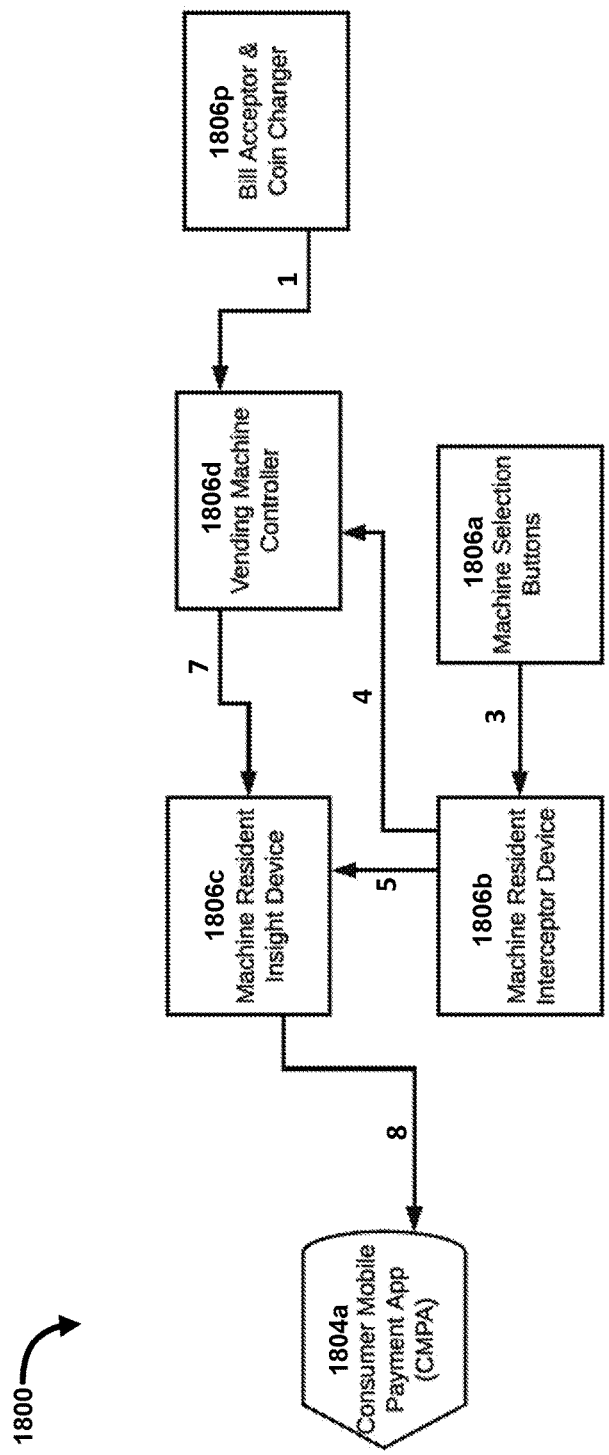
FIG. 18 is a flow diagram showing a cash payment vend process, according to an embodiment.

As discussed above, systems and methods described herein, while designed for touchless vending transactions and vend system monitoring, can also accommodate and/or be compatible with traditional cash payment vending operations. FIG. 18 is a flow diagram showing a cash payment vend process 1800, according to an embodiment. Cash payment can be accepted, at 1806$p$, via a bill acceptor and/or coin changer disposed on the vend machine. The bill acceptor and/or coin changer grants money (arrow "1") to the VMC 1806$d$ (e.g., using the MDB protocol, via an MDB session). Once the payment grant (or "grant of value") has been received at the VMC 1806$d$, the VMC 1806$d$ is "listening" for (i.e., is ready to receive) a signal from the selection buttons 1806$a$ of the vend machine. When a user makes a product selection by pressing buttons of the machine selection buttons 1806$a$, an associated product selection signal is sent (arrow "3") from the machine selection buttons 1806$a$ to the second processor (interceptor device) 1806$b$ disposed within (or "resident" in) the vend machine. The second processor 1806$b$ re-transmits the product selection signal to the VMC 1806$d$ (arrow "4"). The second processor 1806$b$ also translates the product selection signal to the selection and sends it (arrow "5") to the first processor (Insight device) 1806$c$. The VMC 1806$d$ activates the appropriate vend motors (associated with dispensing the product selected by the user) and verifies that the product has been vended/dispensed. The VMC 1806$d$ sends a "vend complete" message (arrow "7") to the first processor 1806$c$ as part of the MDB session. The first processor 1806$c$ sends a "successful vend" message (arrow "8") to the CMPA 1804$a$, along with the user selection. The VMS (not shown) then uses this data to generate an individual date/time-specific record for the cash purchase transaction, tied to the product vended as part of the transaction.

Figure 19:
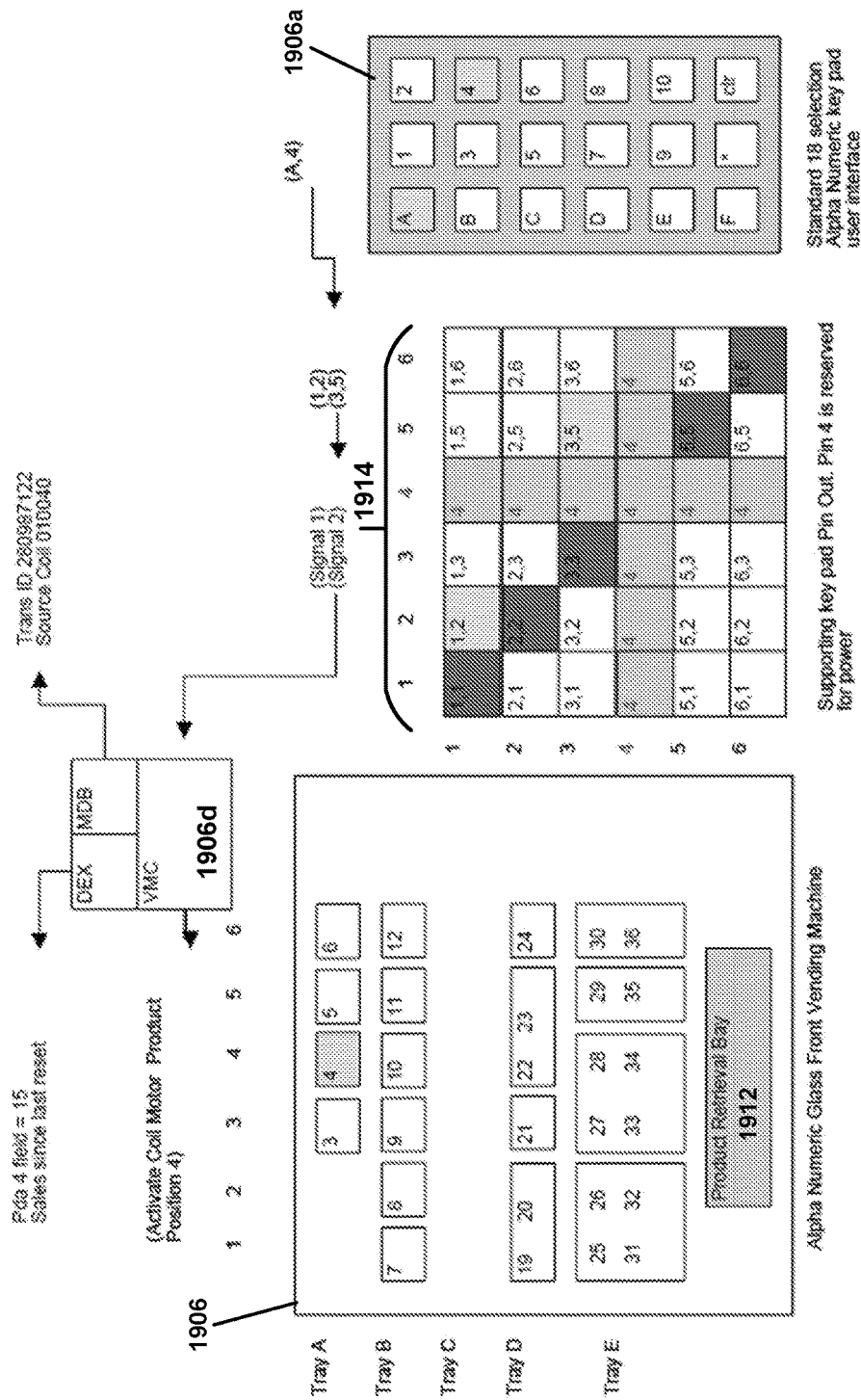
FIG. 19 shows a vending machine key pad (right), corresponding pin-out matrix (center), and product arrangement (left), when used in a vending operation, showing differences between MDB and DEX reporting, according to an embodiment.

FIG. 19 shows a vending machine key pad 1906$a$ (right), corresponding pin-out matrix 1914 (center), and product arrangement (left), when used in a vending operation of a vend machine 1906, showing differences between MDB and DEX reporting, according to an embodiment. In this example the consumer manually presses the first button, in this case A. That button closes the connections between pins 1 and 2, which sends signal 1 to the VMC 1906$d$. The consumer then manually presses button 4, which closes the connection between pins 3 and 5, which sends signal 2 to the VMC 1906$d$. The VMC 1906$d$ then translates these signals as a command to turn the vend motor at position 4 in the vending machine 1906, which corresponds to the product in tray A, column 4. The product in tray A at column 4 would then be dispensed into the product retrieval tray 1912. As shown in FIG. 19, MDB reporting of this transaction includes a transaction ID (280987122) and a source coil identifier (010040). By contrast, DEX reporting of this transaction includes merely an incrementing of the value for "sales since last reset."

Figure 20:
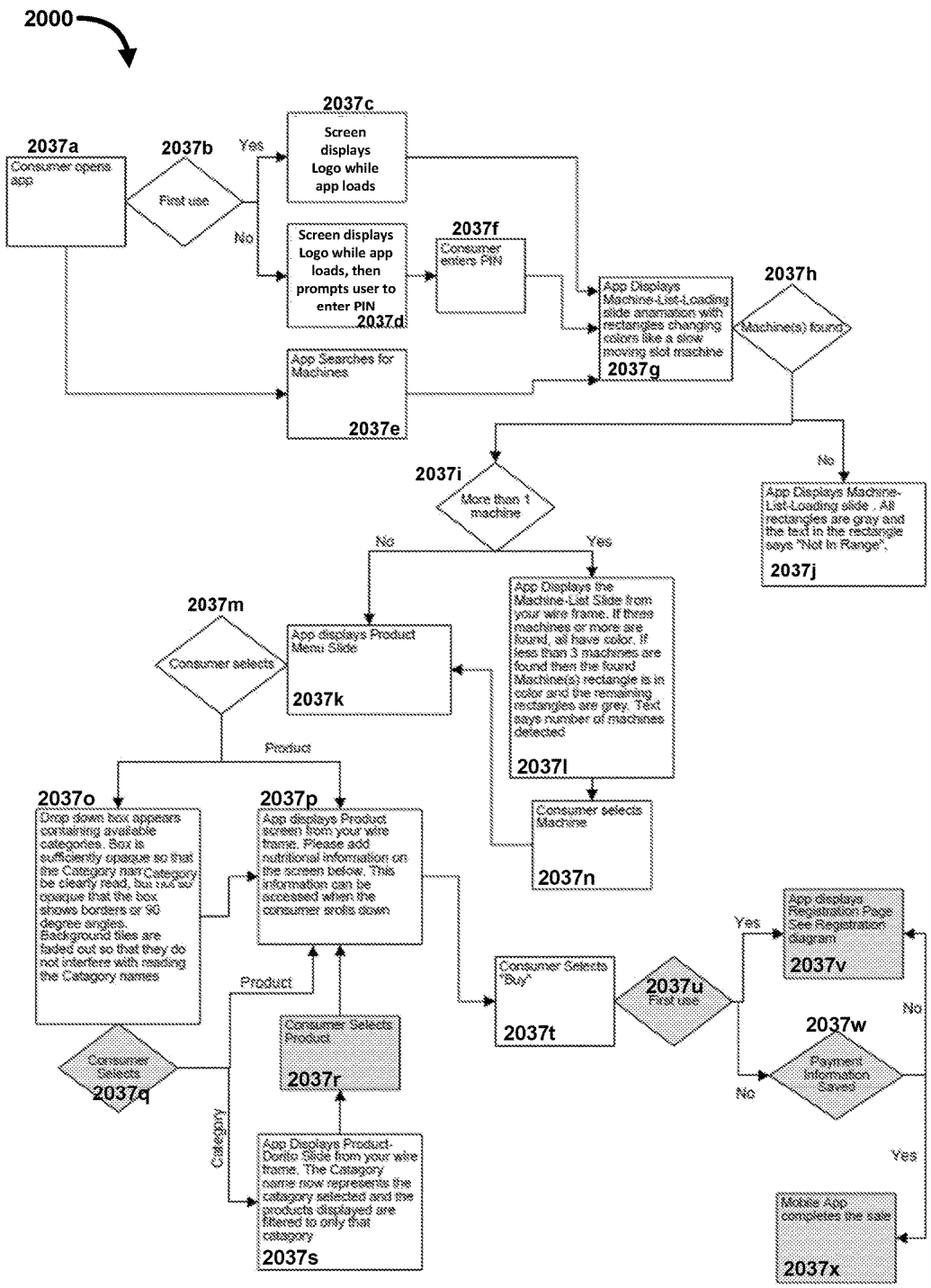
FIG. 20 is a flow diagram showing a mobile app vend purchase process, according to an embodiment.

FIG. 20 is a flow diagram showing a mobile app vend purchase process 2000, according to an embodiment. As shown in FIG. 20, a user opens the CMPA at 2037$a$, and the CMPA searches for vend machines (2037$e$). Substantially concurrently, a determination is made as to whether this is the user's first time using the CMPA (2037$b$). If it is the user's first time using the CMPA, then the CMPA displays a logo while the app loads (2037$c$). If it is not the user's first time using the CMPA, then the CMPA displays a logo while the app loads and, optionally, prompts the user to enter their PIN (2037$d$), in which case the user enters his/her PIN (2037$f$). The CMPA then displays machine list loading animation (e.g., slide animation with rectangles that change color, similar to a slow-moving slot machine) 2037$g$. If no vend machines are found at 2037$h$, the CMPA displays (2037$j$) a machine list loading slide in which all rectangles are gray, and the text in the uppermost rectangle states "Not in Range." If one or more vend machines are found at 2037$h$, then a determination is made at 2037$i$ as to whether there is more than one machine within range. If there is more than one vend machine within range, then the CMPA displays the machine list slide. In some embodiments (2037$l$), if three or more vend machines are found to be within range, a representative graphic for each will be rendered in color, and if fewer than three vend machines are found to be within range, then a representative graphic for each found vend machine will be rendered in color, while the remaining will be rendered in gray. A number of detected vend machines can be displayed via the CMPA. The user can select a vend machine from among those shown to be within range (2037$n$), and the CMPA displays a product menu slide graphic 2037$k$. If only one vend machine is found at 2037$i$ to be within range, then the process also proceeds to displaying the product menu slide graphic at 2037$k$. The user makes a product selection at 2037$m$, of either "category" or "product." If the user selects "category," then a drop-down box appears in the CMPA, showing available categories (2037$o$). The drop-down box can be sufficiently opaque so that the category names can be clearly read, but not so opaque that the box shows borders or 90-degree angles. Background tiles can be faded out so that they do not interfere with the visibility and readability of the category names. The user then selects a category or a product from the drop-down list (2037$q$). If the user selects "category," the CMPA displays a product slide (e.g., Doritos). The category name now represents the category selected and the products displayed are filtered to only those products belonging to the chosen category (2037$s$). The user can then select a product (2037$r$). If, at 2037$m$, 2037$q$, or 2037$r$ the consumer selects a product, the CMPA displays (at 2037$p$) a product screen displays nutritional information (e.g., viewable by the user as he/she scrolls down). From the product screen, the user may select "buy" (2037$t$), at which time a determination is made as to whether the user is a first-time user or not (2037$u$). If this is the first time the user is making a vend purchase via the CMPA, the CMPA displays a user registration page (2037$v$—see, e.g., FIG. 15). If this is not the first time the user is making a vend purchase via the CMPA, a determination is made as to whether payment information has been saved for this user (2037$w$). If no payment information has been saved for this user, the CMPA displays the user registration page. If payment information has been saved for this user, then the CMPA proceeds to complete the sale (2037$x$).

Figure 21:
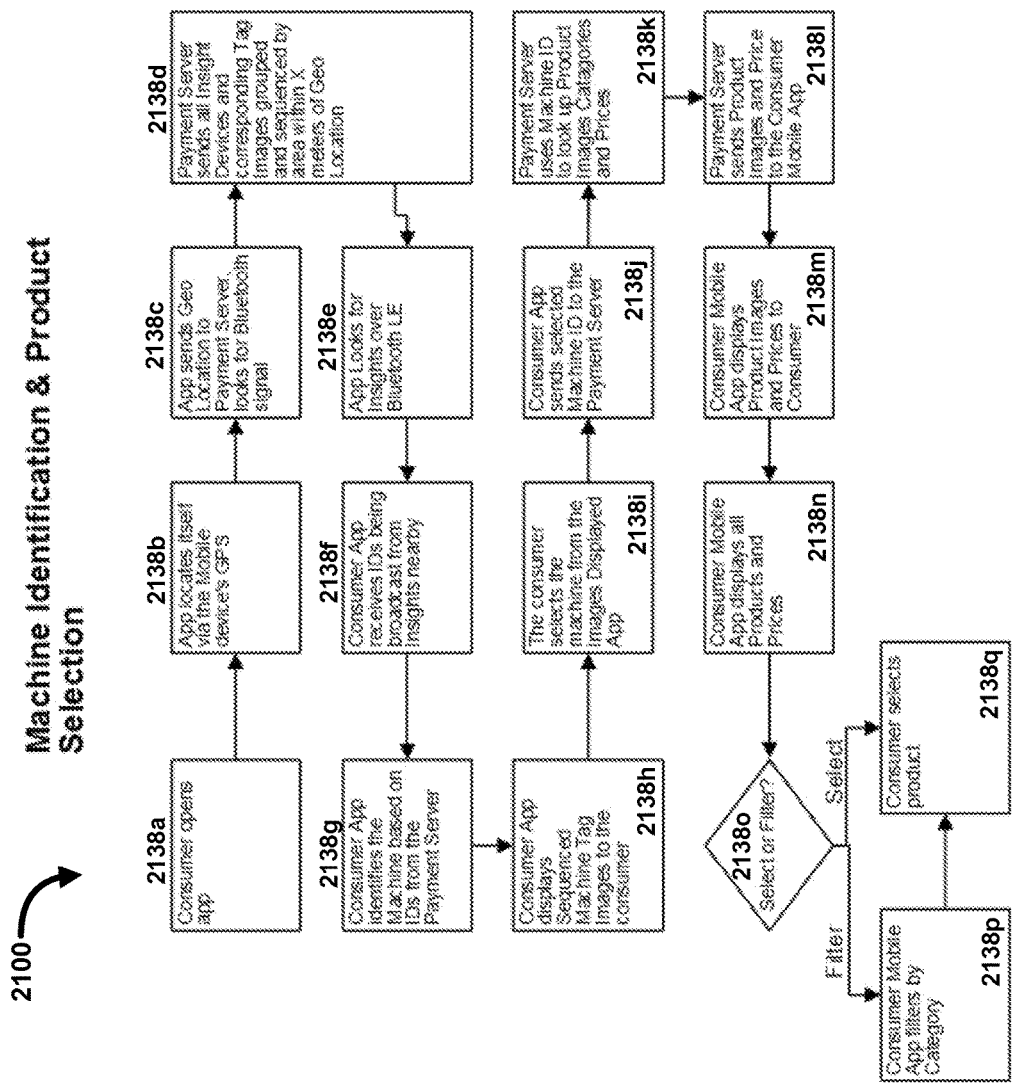
FIG. 21 is a flow diagram showing a mobile machine identification and product selection process, according to an embodiment.

FIG. 21 is a flow diagram showing a mobile machine identification and product selection process 2100, according to an embodiment. As shown in FIG. 21, a user opens the CMPA at 2138$a$, and the CMPA locates itself, e.g., via the GPS of the mobile device on which it is running (2138$b$). The CMPA sends its geolocation to a remote tracking device at 2138c, and waits to detect a Bluetooth signal. The remote tracking device sends a listing to the CMPA of all first processors (Insight devices) and corresponding vend machine ID tag images, grouped and sequenced by area/region within a predetermined distance (e.g., 5, 10, 25, 100 or 500 meters) of the CMPA geolocation (2138d). The CMPA scans for first processors of the vending machines, e.g., over Bluetooth LE (2138e). The CMPA receives one or more IDs being broadcast from nearby first processors of vend machines (2138f). The CMPA identifies the one or more vend machines based on the IDs received from the remote tracking device (2138g). The CMPA displays sequenced vend machine ID tag images to the user (2138h). In some embodiments, the user selects the desired/relevant vend machine from the images displayed in the CMPA (2138i). The CMPA sends the selected vend machine ID to the remote tracking device (2138j), and the remote tracking device uses the selected vend machine ID to look up product images, categories, prices, nutritional information, etc. (2138k). The remote tracking device sends the product images, categories, prices, nutritional information, etc. to the CMPA (2138l) and the CMPA displays the product images to the user (2138m), as well as the products and associated prices available in the selected vend machine (2138n). At 2138o, the user may select a product or filter the product results for the selected vend machine. If the user elects to filter, the CMPA filters the product information, e.g., by category (2138p). If the user makes a product selection, he/she does so via the CMPA (2138q).

In some embodiments, the CMPA can cache the menu for the last few vend machines, and the first processor internally calculates their current inventory levels by deducting any cash vends that happened since the last cashless sale. This can be done, for example, to speed up the loading of the product menu for a machine.

Figure 22:
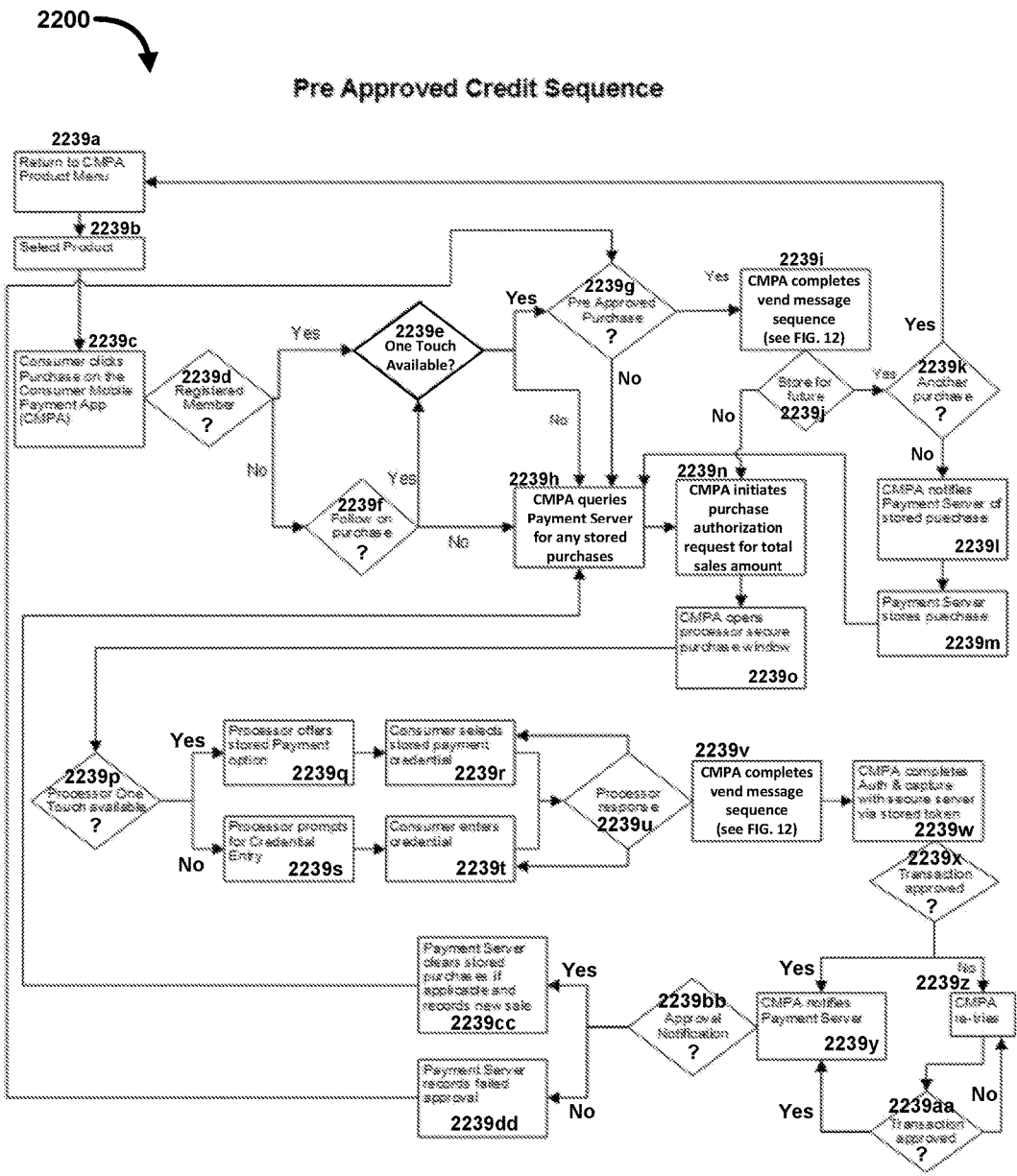
FIG. 22 is a flow diagram showing a mobile app vend purchase process using pre-approved credit, according to an embodiment.

FIG. 22 is a flow diagram showing a mobile app vend purchase process 2200, using pre-approved credit, according to an embodiment. As shown in FIG. 22, a pre-approved credit sequence begins at the CMPA product menu (2239a), and a product selection is made (2239b). The user clicks "Purchase" on the CMPA (2239c), and a determination is made as to whether the user is a registered member or not (2239d). If the user is a registered member, or if the user is not a registered member but the purchase is a "follow-on" purchase (2239f), a determination is made as to whether One Touch is available (2239e). If One Touch is available, and the purchase is pre-approved (2239g), the CMPA completes a vend message sequence (2239i—see, e.g., FIG. 12). A determination is then made as to whether the vend transaction data is to be stored for future use (e.g., for reconciliation at a later time, once multiple transactions have accrued) at 2239j. If the transaction data is to be stored for future use, the process 2200 can process with another purchase (2239k), in which case the process returns to step 2239a and proceeds as described above, or the CMPA notifies the remote tracking device of a stored purchase (2239l) and the remote tracking device stores the purchase (2239m), making it available to queries submitted at 2239h. If the transaction data is not to be stored for future use, the CMPA initiates a purchase authorization request for the total sales amount (2239n). In other words, the transaction isn't held for future reconciliation—it is immediately processed.

If One Touch is not available to a registered user, or if the user is not a registered member and the purchase is not a "follow-on" purchase (2239f), or if One Touch is available but the purchase is not a pre-approved purchase, the CMPA queries the remote tracking device for any stored purchases (2239h). The CMPA then initiates a purchase authorization request for the total sales amount (2239n).

Whether a vend transaction occurs using pre-approved credit or not, once the CMPA initiates the purchase authorization request for the total sales amount (2239n), the CMPA opens a processor secure purchase window (2239o) and determines whether One Touch is available (2239p). If One Touch is available, the processor offers a stored payment option (2239q), and the user may selects the stored payment credential (2239r). If One Touch is not available, the processor prompts the user to enter his/her payment credential(s) (2239s), and the user enters the credential (2239t). After step 2239r or 2239t has completed, the processor responds (2239u), e.g., with a payment acknowledgment, thereby completing the vend message sequence (2239v)—see, e.g., FIG. 12. The CMPA then completes an authorization and capture process with a secure server via a stored token (2239w). If the transaction is approved at 2239x, the CMPA notifies the remote tracking device (2239y). If the transaction is not approved at 2239x, the CMPA re-tries (2239z), and if the transaction is approved at 2239aa, the CMPA notifies the remote tracking device (2239y). If the transaction is not approved at 2239aa, the CMPA continues to re-try at 2239z (e.g., until a timeout based on elapsed time or number of iterations).

When the CMPA notifies the remote tracking device of a transaction (or transaction attempt) at 2239y, the notification includes an indication of whether the transaction was approved or not (2239bb). If the transaction was approved, the remote tracking device clears stored purchases and, if applicable, records a new sale (2239cc), making it available for queries at 2239h. If the transaction was not approved, the remote tracking device records the failed approval (2239dd), and the process may proceed back to step 2239g, to check whether the purchase has since become pre-approved.

Transaction Aggregation and Microloans

Known credit card transactions for vending machines have involved the passing of transaction data that is tokenized/encrypted from end-to-end (i.e., from the point of swipe/read head or NFC detection, all the way to the back-end processor), such that only the bank knows who the customer is, and there was a cost associated with each transaction sent to the bank.

Figure 23:
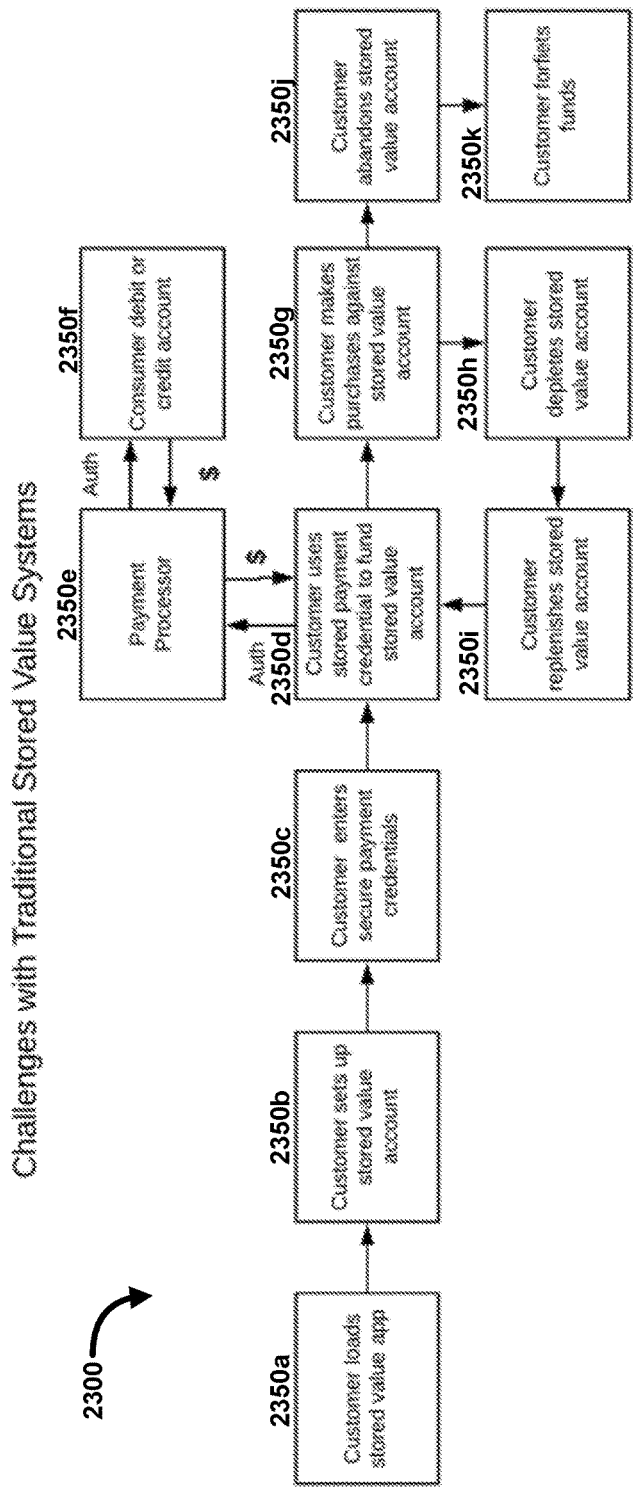
FIG. 23 is a flow diagram showing challenges with traditional stored value systems.

FIG. 23 is a flow diagram showing challenges with traditional stored value systems. In the example of FIG. 23, the stored value process 2300 begins when a customer loads a stored value app (2350a), sets up a stored value account 2350b, and enters secure payment details 2350c. The customer then uses the stored payment credential to fund the stored value account (2350d) by sending an authorization to a payment processor 2350e. The payment processor 2350e then sends an authorization request to a server associated with the customer's consumer debit or credit account 2350f, and receives a grant of money. The payment processor 2350e transmits the grant of money back to the stored value app, and the customer can subsequently make purchases against the stored value account (2350g). The customer can then either abandon the stored value account (2350j), in which case the customer forfeits his/her funds (2350k), or the customer uses/depletes the stored value account (2350h) and elects to replenish the stored value account (2350i), in which case the process beginning at 2350d (customer uses stored payment credential to fund stored value account) repeats. Such stored value systems, therefore, involve the generation of a closed system stored value account that can be funded from an open system account such as a checking account, a savings account, or a debit or credit card account.

Once the funds are transferred into the stored value account, it cannot be conveniently transferred back to its original account, and can only be spent at select merchants that accept the particular stored value account. The funds are therefore confined to a highly limited set of products and/or services. Closing or abandoning such an account with funds remaining therein often results in the forfeiture of the remaining funds. As a result, stored value accounts have had low consumer acceptance.

Figure 24:
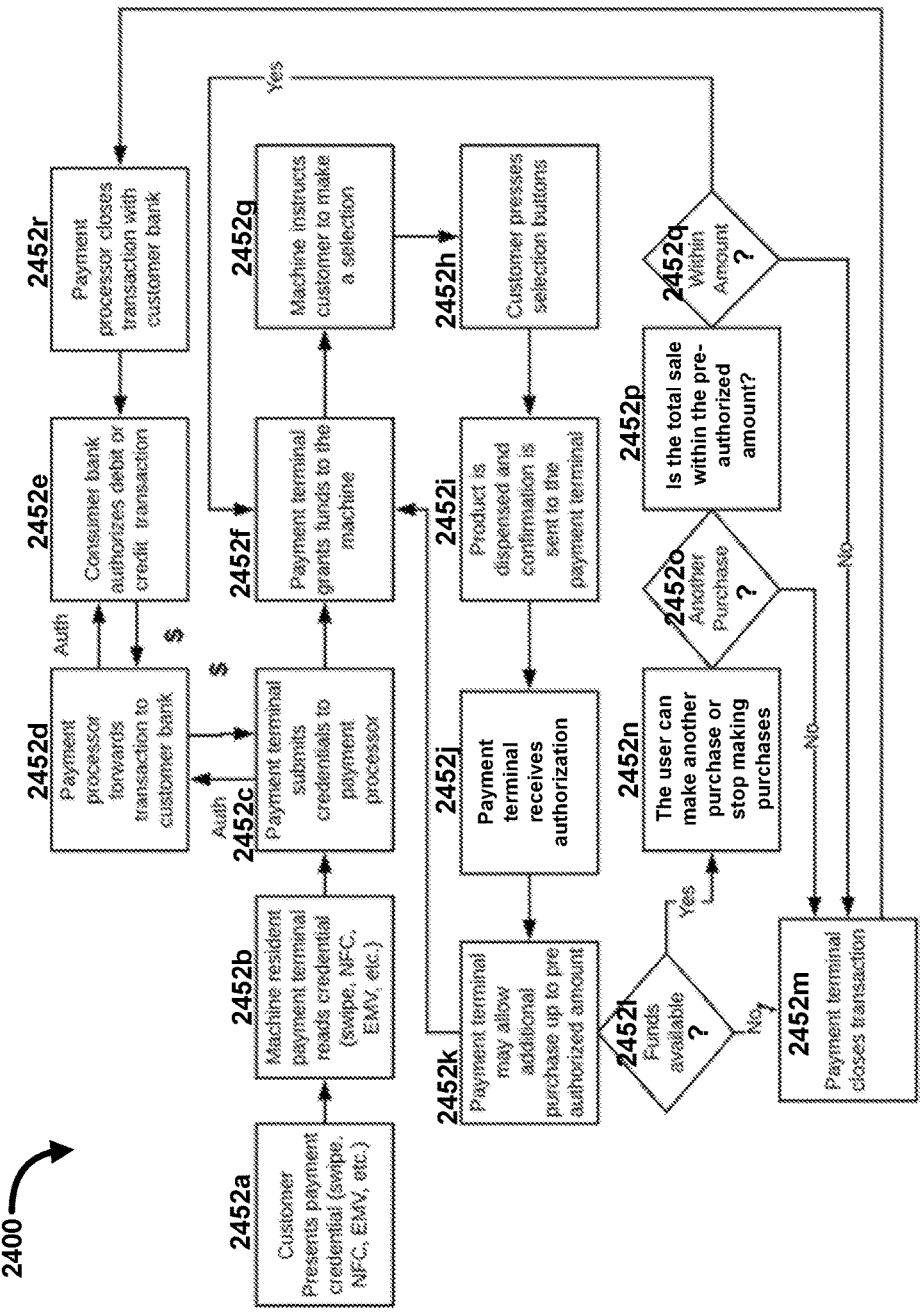
FIG. 24 is a flow diagram showing challenges with traditional debit and credit card systems.

FIG. 24 is a flow diagram showing challenges with traditional debit and credit card systems. In the example of FIG. 24, the traditional debit/credit card process 2400 begins when a customer presents a payment credential at the vending machines (2452a), e.g., by swiping a physical card or via NFC, EMV, etc. A payment terminal of the vending machine reads the credential (2452b), and submits the credentials to a payment processor (2452c) which forwards the transaction to a payment network (Visa®, MasterCard®, etc.) which, in turn, delivers the transaction to the entity managing the customer's account (e.g., the customer's bank) (2452d) for authorization. The consumer bank authorizes the debit or credit transaction (2452e) and returns a grant of money to the payment processor 2452d, which transmits the grant of money to the payment terminal (2452c), which grants funds to the vending machine (2452f). The vending machine then instructs the customer to make a selection (2452g). The customer presses selection buttons on the vending machine (2452h). In response, product is dispensed (2452i) and confirmation is sent to the payment terminal, which receives the authorization (2452j). The payment terminal can allow additional purchases to occur, up to a pre-authorized amount (2452k), resulting in subsequent grants of funds to the machine (2452f). If it is determined, at 2542l, that no additional funds are available, the payment terminal closes the transaction (2452m). If it is determined, at 2542l, that additional funds are available, the customer can elect to either make another purchase or stop making purchases (2452n). If the customer elects (at 2452o) not to make any additional purchases, the payment terminal closes the transaction (2452m). If the customer elects (at 2452o) to make an additional purchase, a determination is first made as to whether the total sale is within the pre-authorized amount (2452p). If the total sale is not within the pre-authorized amount (at 2452q), the payment terminal closes the transaction (2452m). If the total sale is within the pre-authorized amount (at 2452q), the process loops back to step 2452f, when the payment terminal grants additional funds to the vending machine. Since each vending machine has its own unique payment terminal, a single authorization cannot be used to grant value for purchases at other machines. Also, because of strict payment industry regulations, a transaction typically cannot be held open for multiple days. Also, due to strict confidentiality regulations, only the payment processor can have the ability to uniquely identify a customer, and as a results, no other stakeholder can offer micro-loans. Using a customer's unique payment credential for any purpose other than generating an individual payment transaction if typically prohibited by the issuer. Current processor regulations often specify that authorizations are done for a higher amount and then adjusted downward, thereby creating complex issues with regard to temporary transactions showing up on customer statements.

By contrast, systems of the present disclosure, e.g., in view of the remote tracking device capability, can compile transaction data about registered users such that the system can make a determination that a given user has historically made several vending transactions that were successful. When the system makes such a determination (i.e., the system "trusts" the user based on an established pattern of behavior of that user), it can selectively elect to aggregate transactions associates with a user (e.g., over a single session, over a predetermined number of transactions, or over a predetermined duration of minutes, hours, days, or months, etc.), thereby extending a "microloan" to that user that is reconciled (i.e., the payments are charged back to a payment source of the user and/or sent to the bank in a single/batch transaction) at a later time.

Figure 25:
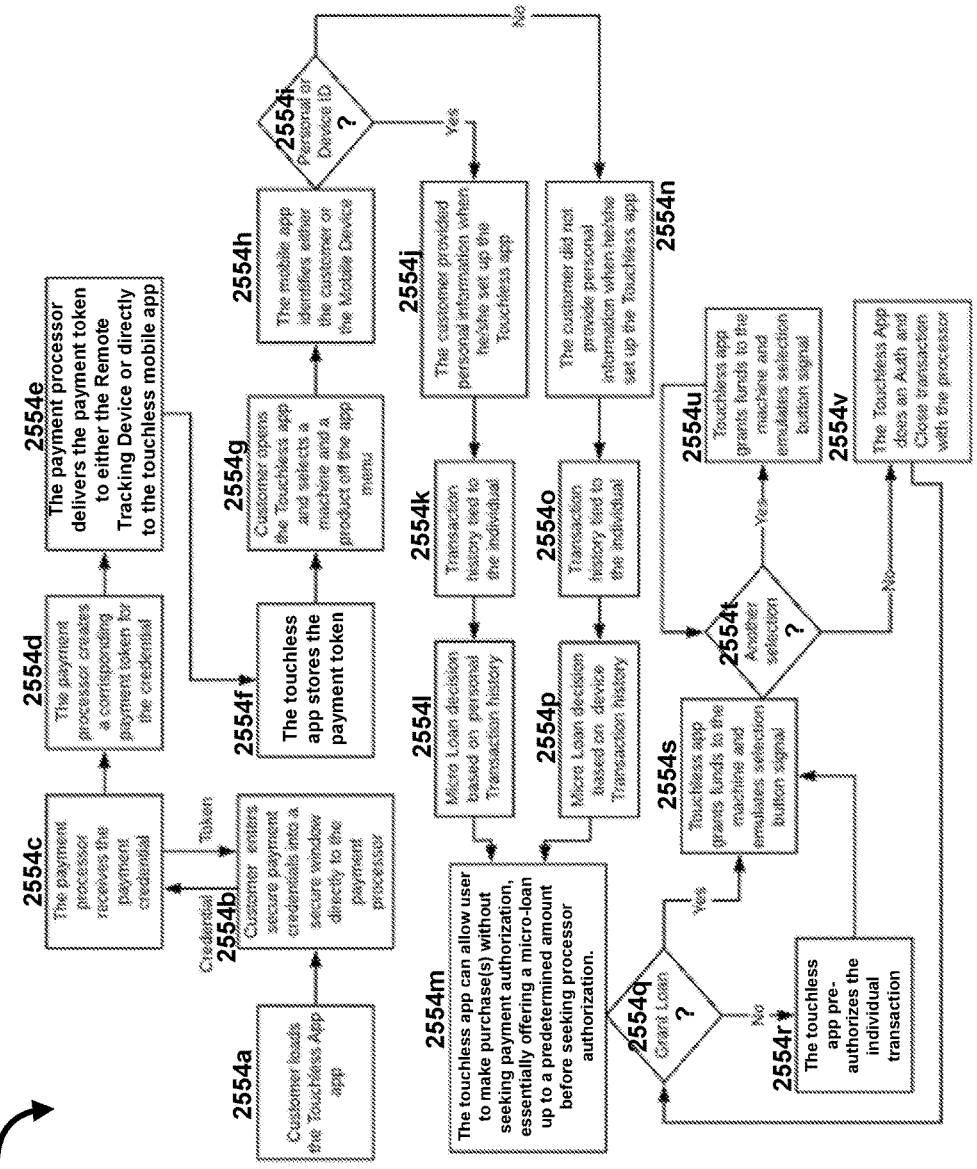
FIG. 25 is a flow diagram showing advantages of touchless payment systems, according to an embodiment.

FIG. 25 is a flow diagram showing advantages of touchless payment systems, according to an embodiment. As shown in FIG. 25, the touchless payment method 2500 begins when a customer loads the touchless app (2554a). The customer enters his/her secure payment credentials into a secure window directly to the payment processor (2554b), and the credential is passes to the payment processor, which receives it (2554c). The payment processor then generates a corresponding payment token for the received credential (2554d), and delivers the payment token (2554e) to the remote tracking device (payment server) or directly to the touchless mobile app (e.g., CMPA). The touchless app stores the payment token (2554f). The customer opens the touchless app and selects a machine and a product from the app menu (2554g). The mobile app identifies the customer and/or the mobile device (2554h), and a determination is made as to whether the ID is at least one of a personal ID or a device ID (2554i). If the mobile app has identified at least one of a personal ID or a device ID at 2554i, an inference is made that the customer provided personal information when he/she set up the touchless app (2554j), in which case the transaction history is tied to the individual (2554k) and a micro-loan decision can be made based on the personal transaction history (2554l). If the mobile app has not identified at least one of a personal ID or a device ID at 2554i, an inference is made that the customer did not provide personal information when he/she set up the touchless app (2554n), the transaction history is tied to the individual (2554o), and a micro-loan decision can be made on device transaction history (2554p). Whether the micro-loan decision was made based on personal transaction history at 2554l or based on device transaction history at 2554p, the touchless app can allow the customer to make one or more purchases without seeking payment authorization, in essence offering a micro-loan up to a predetermined amount before seeking processor authorization (2554m). A determination is then made, at 2554q, as to whether to grant the micro-loan. If a decision is made at 2554q to grant the micro-loan, the touchless app grants funds to the machine and emulates a selection button signal (2554s). If a decision is made at 2554q not to grant the micro-loan, the touchless app pre-authorizes the individual transaction (2554r) and proceeds to step 2554s. If the customer would like to make another selection (2554t), the touchless app grants funds to the vend machine and emulates a selection button signal (2554u), looping back to the "Another selection" decision point. If the customer does not wish to make another selection (2554t), the touchless app performs an authorization and close transaction with the processor (2554v) and loops back to another decision as to whether to grant a loan (2554q), as discussed above.

Touchless vending mobile payment systems set forth herein, such as the system of FIG. 25, can track purchase transaction history, for example using a customer profile provided by the customer during app setup, or by a unique identifier provided by the host mobile device. The remote tracking device and/or the CMPA can use algorithms to manage risk associated with offering micro-loans. Given the ability to perform vending transactions using the CMPA, the system can make loan decisions (e.g., approve or deny the loan) at the mobile device. The remote, CMPA-based vending systems and methods can also facilitate the aggregation of transactions without the need for a large pre-authorization or the risk of loaning value without a consumer history. Since the micro-loan can be made before any communication with the payment processor, there are no obstacles to aggregating transactions over multiple days, across different machines or difference machine operators, different machine types, or different types of products and/or services.

Figure 26A:
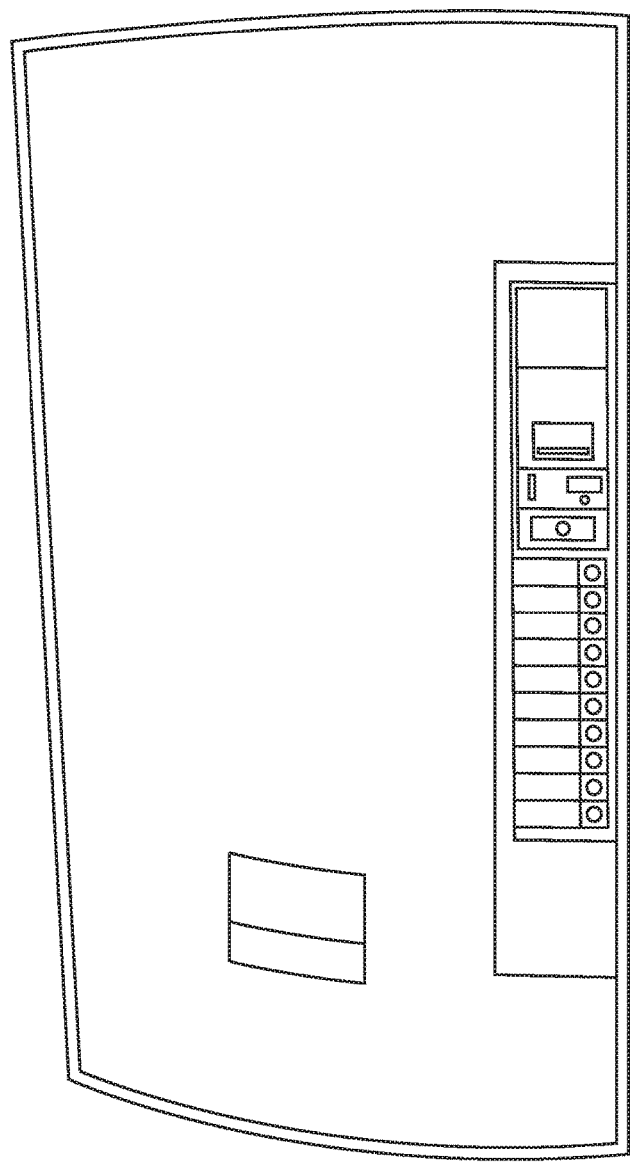
FIG. 26A is a photograph of an example closed-front vending machine with individual selection buttons.
Figure 26B:
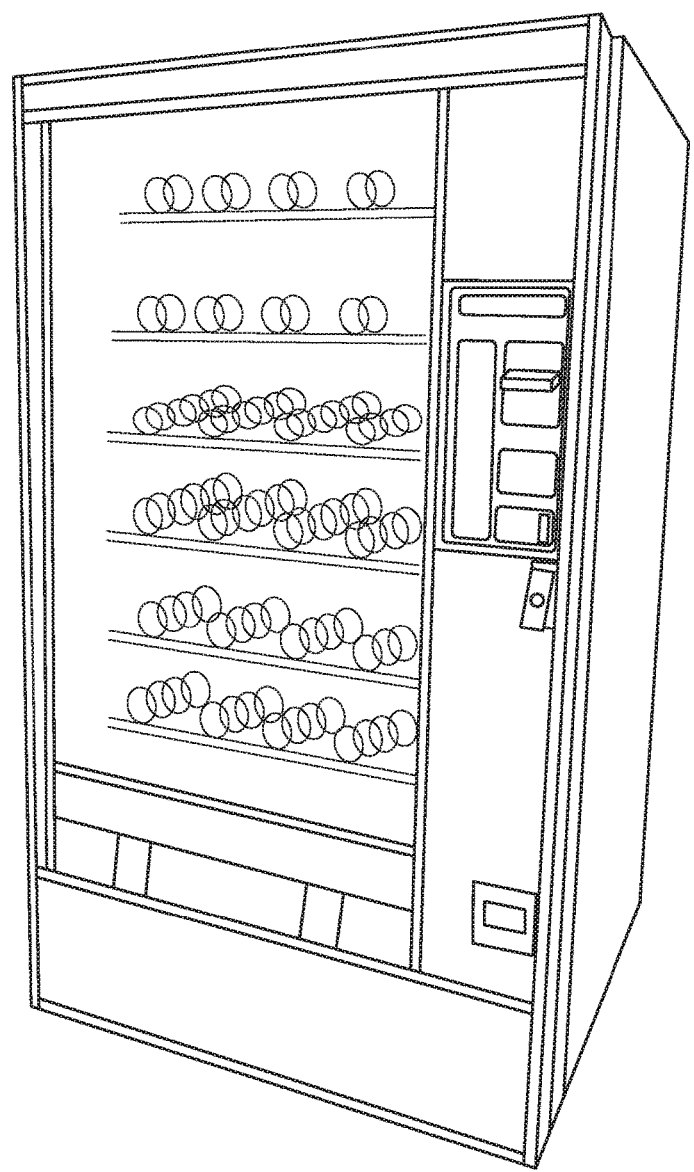
FIG. 26B is a photograph of an example glass-front vending machine with individual selection buttons in a keypad/selection pad configuration.
Figure 26C:
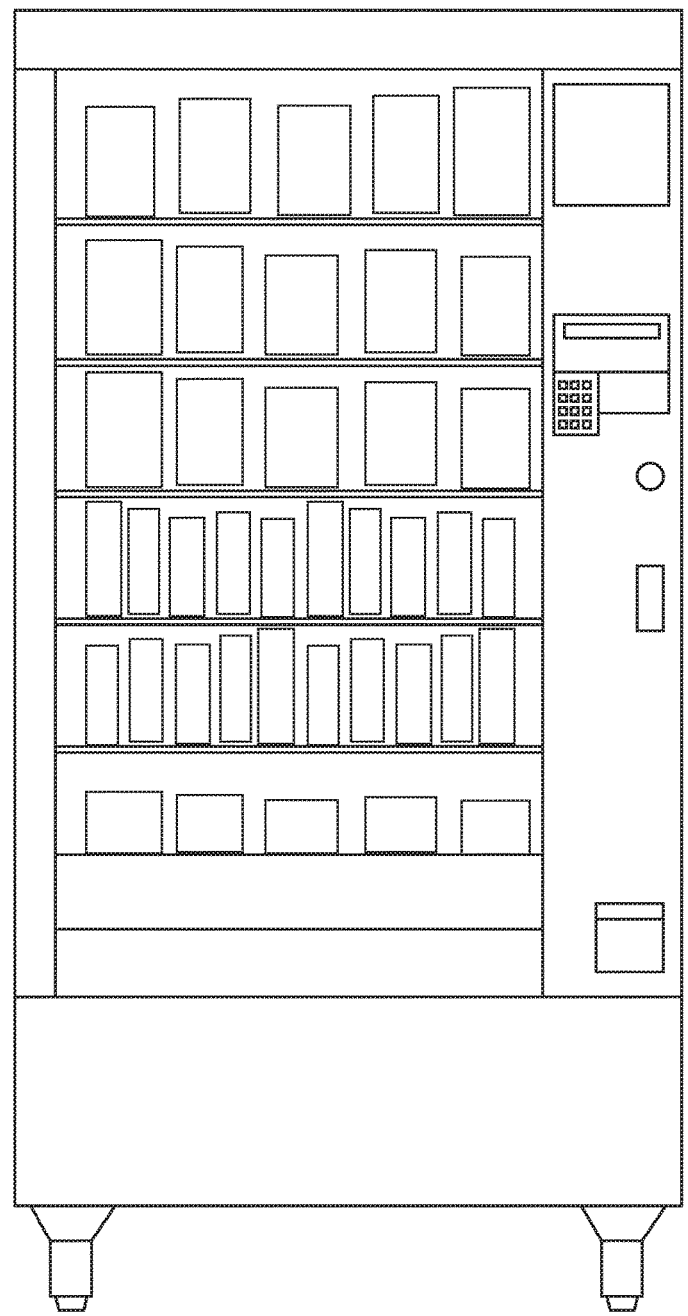
FIG. 26C is a photograph of an example glass-front vending machine with individual selection buttons in a keypad/selection pad configuration.
Figure 26D:
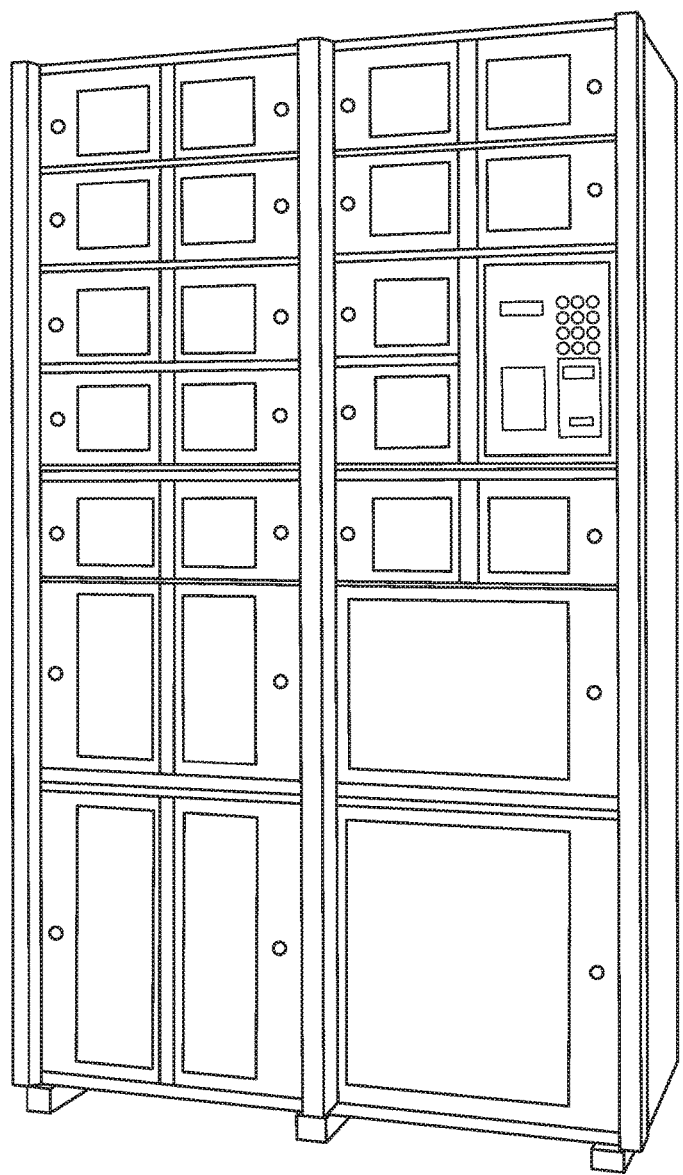
FIG. 26D is a photograph of an example door/bin-type vending machine with a pin-pad configuration.

Vending machines exist for a wide variety of products, including currency, cigarettes, birth control and condoms, food, beverages, candy, gum, newspapers, photographs, stamps, tickets, automobiles, bait, books, blow-molded figurines, controlled substances, etc. FIG. 26A is a photograph of an example closed-front vending machine with individual selection buttons, in which systems and methods of the present disclosure can be implemented. Common vending machine types are "coil type" and "carousel type." FIG. 26B in an image of an example glass-front vending machine with individual selection buttons in a keypad/selection pad configuration, compatible with the systems and methods set forth herein, according to some implementations. The vending machine of FIG. 26B is unfilled (i.e., is unstocked, or contains no products for dispensing), such that the spiral coil mechanisms for holding and dispensing product are visible. FIG. 26C is a photograph of a further example glass-front vending machine (Automatic Machine model 123, "AP123"), also compatible with the systems and methods set forth herein, fully stocked with products and including individual selection buttons in a keypad/selection pad configuration. FIG. 26D is a photograph of an example door/bin-type vending machine with a pin-pad configuration, in which systems and methods of the present disclosure can be implemented.

Figure 27B:
Figure 27A:
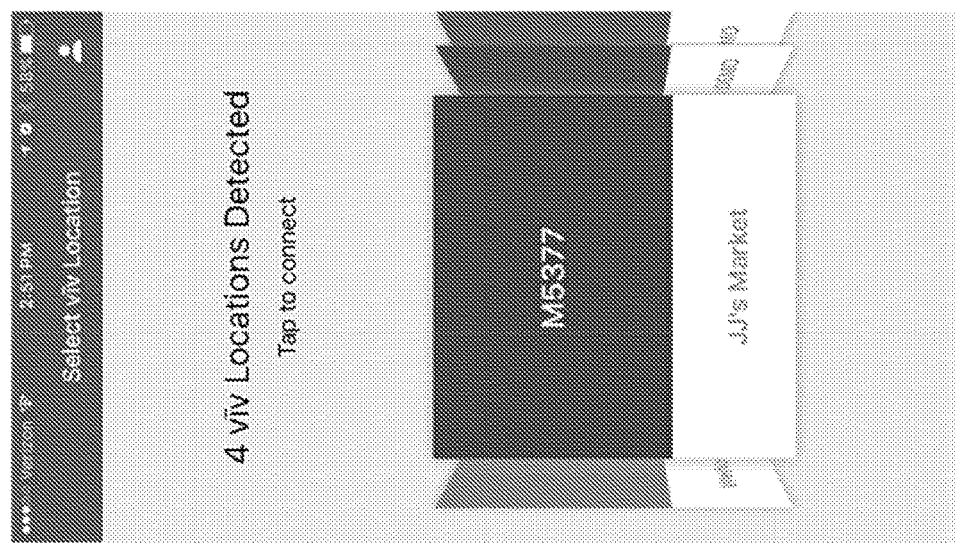
Figure 27D:
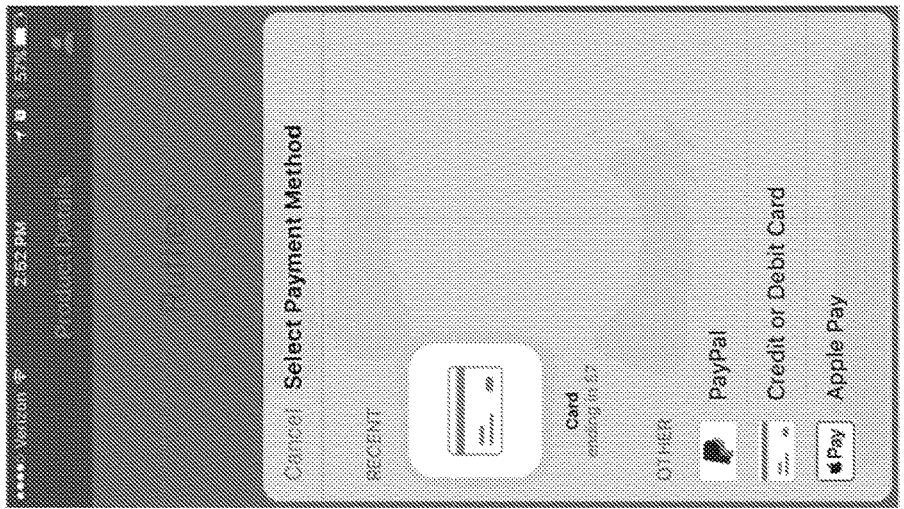
Figure 27C:
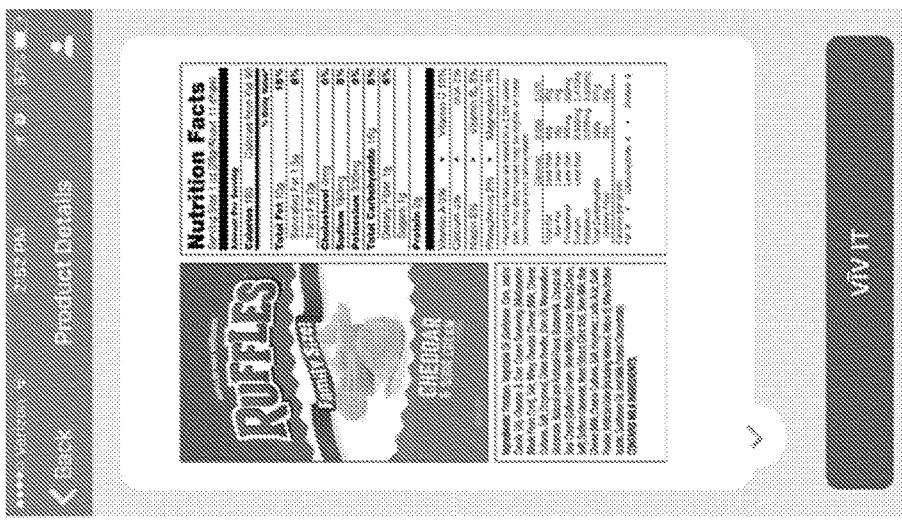
Figure 27E:
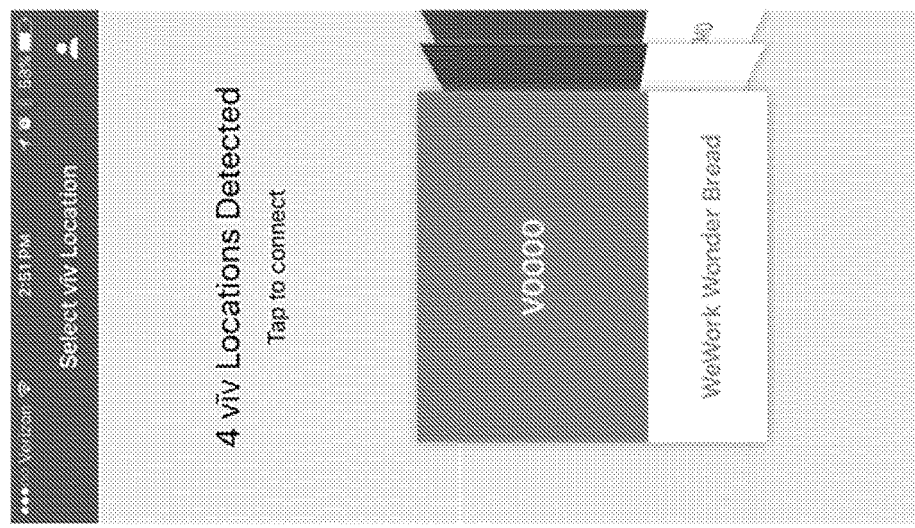

FIGS. 27A-E show an example sequence of user interface screens, viewable to a user via the CMPA mobile app, according to an embodiment. FIG. 27A includes graphical representations of multiple available vend machines that have been detected within a predetermined radius of the CMPA user. Each vend machine has a vend machine ID tag number associated with it, as well as a vendor name, each of which is displayed within the associated graphic representation of the vend machine. FIG. 27B is a menu view (e.g. generated from a planogram) of a product listing available for a selected vend machine (e.g., for a specified/user-selected vend machine from the plurality of vend machines of FIG. 27A). Returning to FIG. 24A, the center rectangle ("icon," "tile" or "sticker"), labelled "M5377," is a first machine in a vend bank. By swiping right and left, the user can scroll through other stickers in sequential positions. Tapping on any one of the plurality of stickers brings up a product menu, for example as shown in FIG. 27B. In the product menu, each product in the menu view of the CMPA user interface includes a graphic image of the product, a product name, and a price. As discussed above, if there are multiple instances of a single product type in a selected vend machine, only one product icon (tile) will appear. Users can swipe up or down to view more products and/or can filter by product category (e.g., candy, drinks, chips, etc.) or search for a particular product by name. Tapping on a product icon brings up the associated product detail page, as shown in FIG. 27C. FIG. 27C is a detail view of a selected product (e.g., generated/rendered in response to a user's selection of a product, or request for product information). The product details shown include a graphic image of the product that is larger than in the menu view, a listing of the ingredients, and the nutritional information associated with the selected product. By tapping on the purchase button (labelled "VIV IT" in FIG. 27C), the user can purchase the selected vending product, which will direct the user (e.g., upon making a first payment) to a payment page, as shown in FIG. 27D. FIG. 27D shows a secure payment selection interface/window of the CMPA, including multiple available payment methods as well as a "recent" payment method used. In some embodiments, the system does not directly access the user's account information, and instead, the payment processing is handled by a processing "partner" (i.e., a disparate entity). As such, the system doesn't "see" the user's credentials, making the system exempt from most of PCI. When the user makes a second purchase, a reusable token of the processor can be used, and a screen may be displayed to advise the user that the transaction is being processed. After the product is vended/dispensed, a "Thank You, Please Take Your Product" message may be displayed via the CMPA. FIG. 27E is a further view of the graphical representations of multiple available vend machines that have been detected within a predetermined radius of the CMPA user, showing the animation feature. If a user swipes across the screen from right to left, the panels will shift from right to left, sequentially making the details for each vend machine of the plurality of vend machines visible to the user via the CMPA user interface.

Example Implementation #1—Vend Machine Modification

FIG. 28A is a photograph of a portion of a VMC circuit board from an API2X vend machine before modification, according to an example implementation. As shown, cabling for the selection switches of the AP12X vending machine attaches at location J7 on the VMC circuit board. As discussed herein, during modification of the AP12X vending machine, an interceptor is added, and is configured to be disposed between the VMC and the selection switches. FIG. 28B is a photograph of an interceptor circuit board, including the relocated connector from the VMC of FIG. 28A, and having attached thereto a first end of an additional cable for connecting to J7 on the VMC circuit board. FIG. 28C is a photograph of the VMC of FIG. 28A after modification, showing a second end of the additional cable attached thereto, at location J7.

FIG. 28D is a cable diagram showing connector pin outs, hardware and mapping for an interceptor-to-VMC connection, according to an example implementation. As shown in FIG. 28D, an interceptor connector "J1" can include a 26-pin connector (including an SL Series 26-pin housing/modular connector, a Molex® female crimp housing 22-55-2261 and a Molex® female pin 16-02-0069 crimp terminal), and a VMC connector "J2" can include a 13-pin connector (e.g., an SL™ Series 13-pin housing/modular connector, a Molex® female housing connector 0050579410 and a Molex® female pin 16-02-0069 crimp terminal). Connections between the interceptor connector and the VMC connector can be made using wires (e.g., 12-inch long, 24 American wire gauge (AWG) wire).

FIG. 29A is a photograph showing components of an installation kit, including an interceptor (second processor), cabling, a cellular antenna, a first processor (Insight), Velcro mounting strips for the first processor, and a shipping box. The cabling includes a cable for connecting the interceptor to a VMC of the to-be-modified vend machine, as discussed above with reference to FIGS. 28A-28C, a cable for connecting the first processor to the VMC, and a cable for connecting the interceptor to the first processor. FIG. 29B includes photographs of a front side and back side of an interceptor 2906b, according to an example implementation.

Example Implementation #2—Vend Machine Modification

Figure 30A:
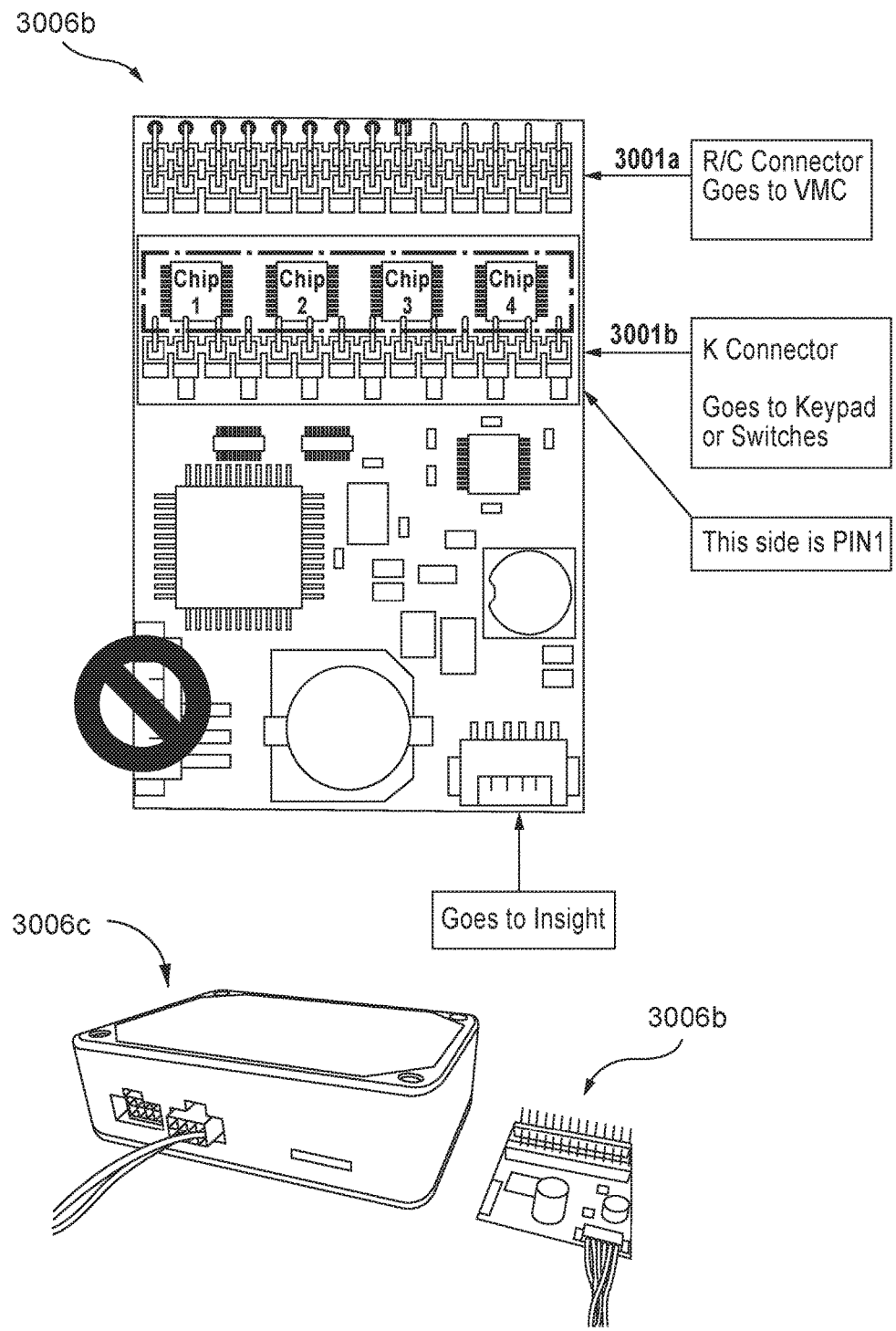
Figure 30B:
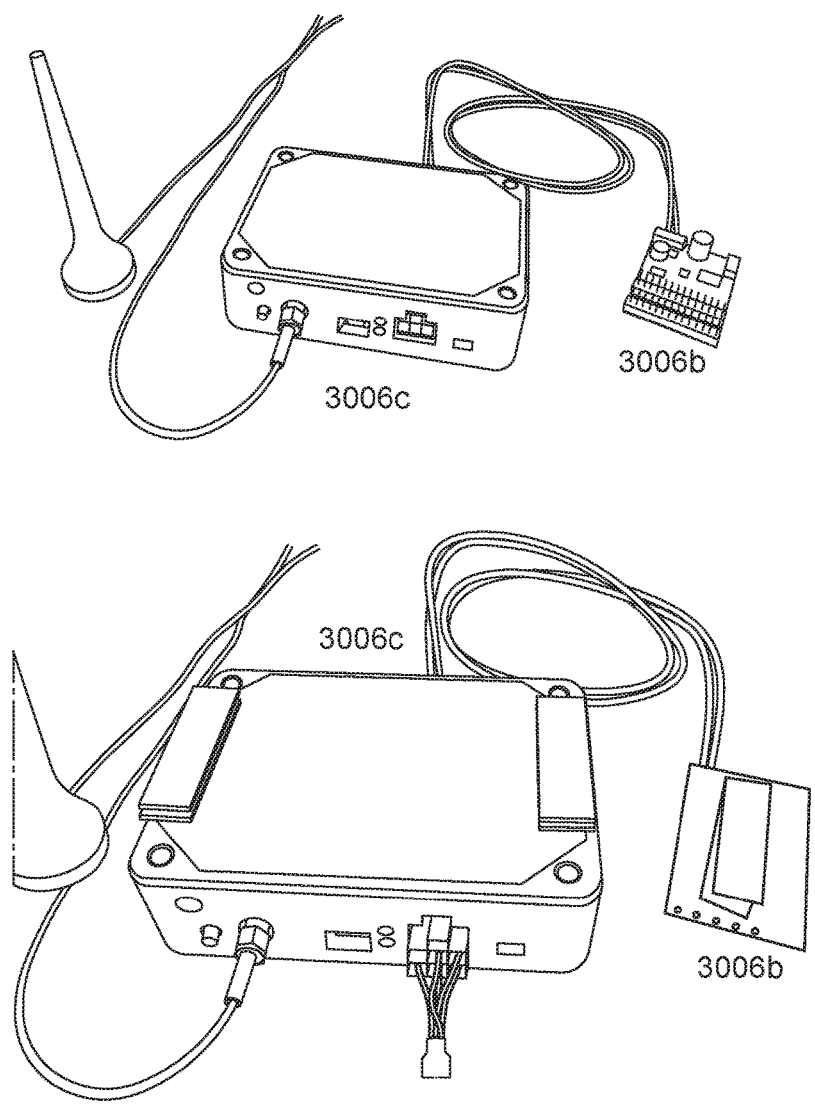
Figure 30C:
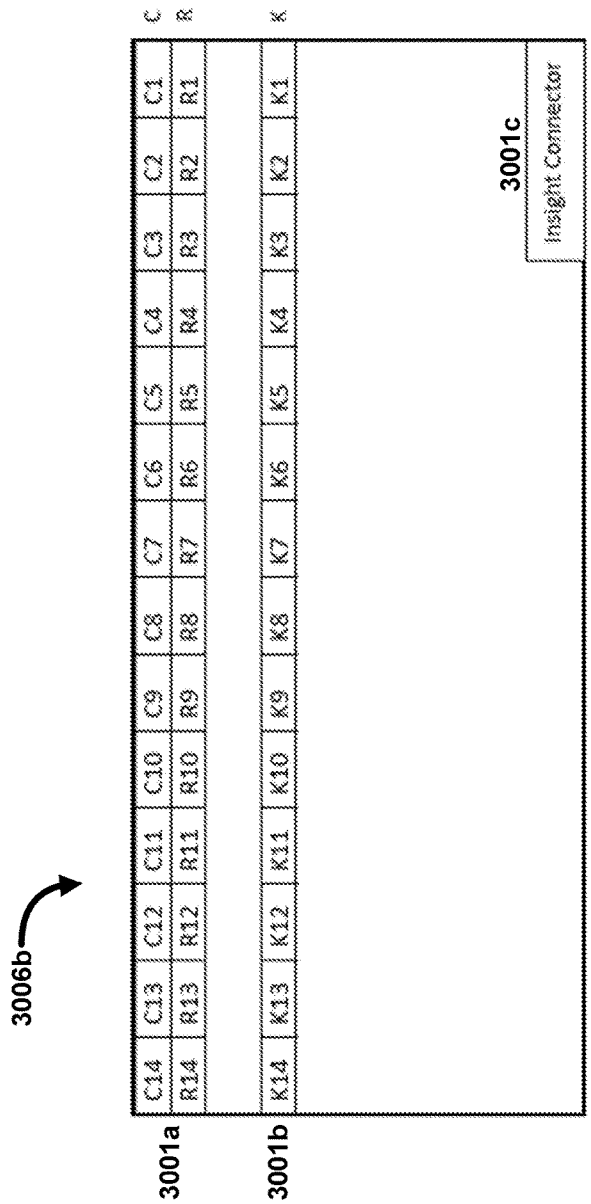

FIGS. 30A-30G illustrate an example mapping and modification of a vend machine, according to an implementation of an example embodiment. As shown in the upper image of FIG. 30A, an interceptor (second processor) 3006b includes a row/column ("R/C") connector 3001a for receiving a cable connection to a VMC of a vend machine, a K-type connector 3001b for receiving a cable connection to a keypad and/or a plurality of switches of the vend machine, and a connector 3001c for receiving a cable connection to a first processor (insight device) 3006c. The lower image of FIG. 30A shows an interceptor 3006b connected via a cable to the first processor (insight device) 3006c. The images of FIG. 30B show a vend machine modification kit (including the interceptor (second processor) 3006b, the first processor (insight device) 3006c, an antenna, and all cabling) that is fully assembled (but not installed in a vend machine—shown for illustrative purposes).

As discussed herein, the interceptor (second processor) 3006b is configured to be disposed between a keypad/selection buttons of a vend machine and the VMC of the vend machine. During operation, the (second processor) 3006b can (1) scan the vend machine selection keypad for a button press and transmit a selection signal based on the button press to the VMC, and (2) receive selection signals from the first processor (insight device) 3006c. A vend machine keypad can include an array of selection buttons arranged, for example, in rows "R" and columns "C," such that they are addressable by corresponding row-associated wires and column-associated wires (e.g., a single wire can be used to for each column of the vend machine keypad, to reference button selections associated with that column, and a single wire can be used to for each row of the vend machine keypad, to reference button selections associated with that row). As shown in the schematic view of the interceptor (second processor) 3006b, shown in FIG. 30C, the interceptor (second processor) 3006b includes a keypad connector 3001b (labelled "K" in FIG. 30C) for connecting the interceptor (second processor) 3006b to the keypad of the vend machine, and a VMC connector 3001a (labelled "C" for column, and "R" for row in FIG. 30C, The VMC connector 3001a is also referred to herein as an "R/C connector") for connecting the interceptor (second processor) 3006b to the VMC of the vend machine. The interceptor (second processor) 3006b also includes a plurality of switch multiplexing ("MUX") chips 3001c (e.g., 4, as shown in FIG. 30A). The MUX chips 3001c function to close/short open circuit connections between pairs of terminals (e.g., a terminal of the K connector 3001b and a terminal of the VMC connector 3001a) associated with a selection, to accomplish and/or emulate a button press. In the example of FIGS. 30A-30G, a first chip (Chip 1) is associated with terminals R1 through R7 of the VMC connector 3001a, a second chip (Chip 2) is associated with terminals R8 through R14 of the VMC connector 3001a, a third chip (Chip 3) is associated with terminals C1 through C7 of the VMC connector 3001a, and a fourth chip (Chip 4) is associated with terminals C8 through C14 of the VMC connector 3001a. In some embodiments, two of the MUX chips 3001c are used to accomplish and/or emulate a single button press.

Figure 30D:
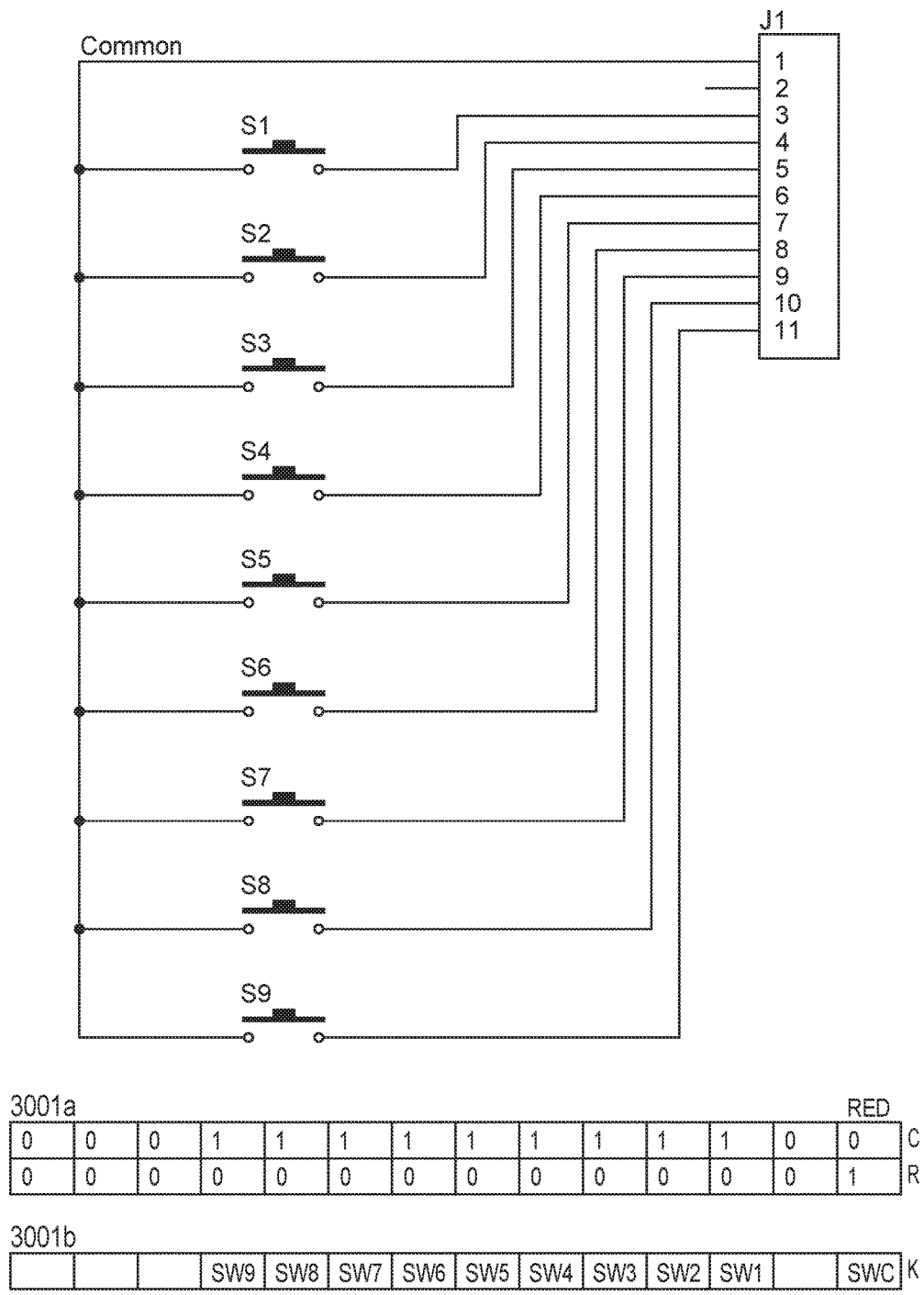

In some embodiments, one available terminal connection is associated with each row of a vend machine keypad and one available terminal connection is associated with each column of the vend machine keypad. In an example implementation, a Royal 660 9-selection drink vending machine includes 9 selection buttons, with 9 signal terminals/pins and 1 common terminal/pin. The vending machine's keypad cable can plug directly into the K connector of the interceptor (second processor) 3006b, with the common connection positioned at position K1 (labelled "SWC" in FIG. 30D). As also shown in FIG. 30D, switch 1 ("SW1") connects to position K3, switch 2 ("SW2") connects to position K4, switch 3 ("SW3") connects to position K5, switch 4 ("SW4") connects to position K6, switch 5 ("SW5") connects to position K7, switch 6 ("SW6") connects to position K8, switch 7 ("SW7") connects to position K9, switch 8 ("SW8") connects to position K10, and switch 9 ("SW9") connects to position K11. A value of "0" in FIG. 30D indicates that no wire is connected thereto, and a value of "1" in FIG. 30D indicates that a wire is connected thereto. In some embodiments, a wire connected to pin 1 of the R/C connector 3001a is a different color (e.g., red) from the remaining wires connected thereto.

Position R1 of the R/C connector 3001a in FIG. 30D contains a value of "1," indicating that a wire (the common, "SWC" of the K connector) is connectable (via an associated switch) thereto and showing that the interceptor (second processor) 3006b scans the R set of switches first. In some embodiments, there is a value of "1" in a given position (e.g., position 1, position 2, etc.) of either the rows "R" or the columns "C" of the VMC connector 3001a, but not both. Since position R1 is connectable to the common terminal of the keypad connector 3001b ("K"), Chip 1 will be used. As discussed above, Chip 3 is associated with terminals C1 through C7, and Chip 4 is associated with terminals C8 through C14. As such, in the given configuration, when switch 1 (SW1) needs to be selected/"pressed," terminals R1 and C4 are connected/shorted, using switches of Chip 1 and Chip 3.

Figure 30E:
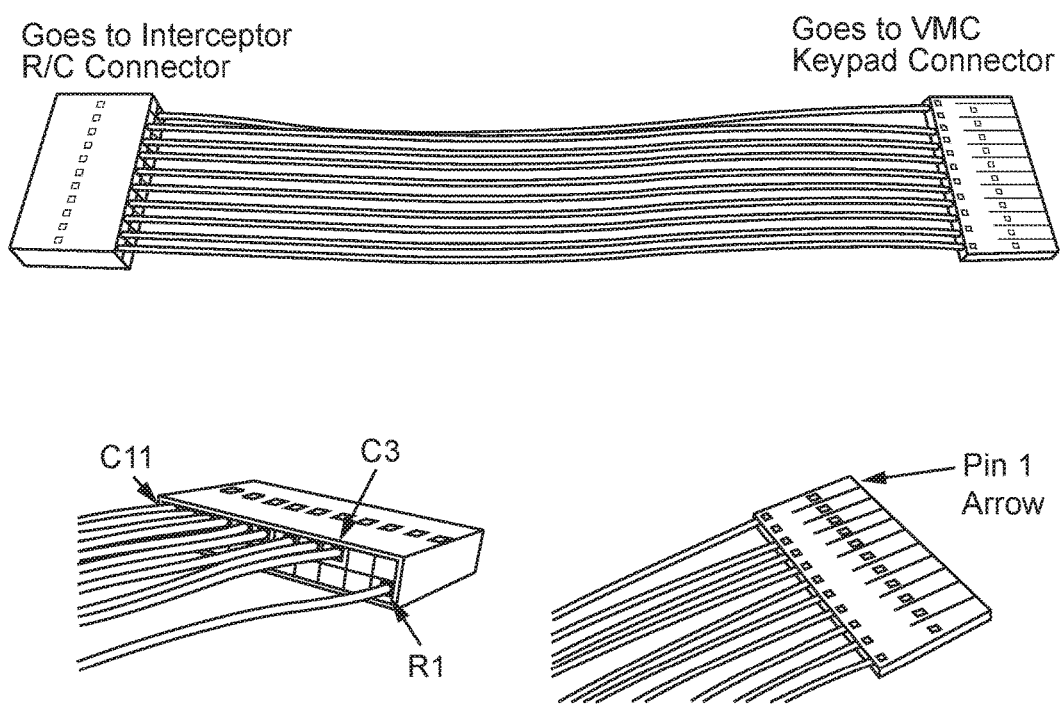

FIG. 30E shows cabling that is configured to connect, at a first end, to the interceptor R/C connector (VMC connector 3001a), and to connect, at a second end, to the keypad connector 3001b ("K"). The positioning of terminals C3, C11, R1 (pin 1) are also shown in FIG. 30E.

Figure 30F:
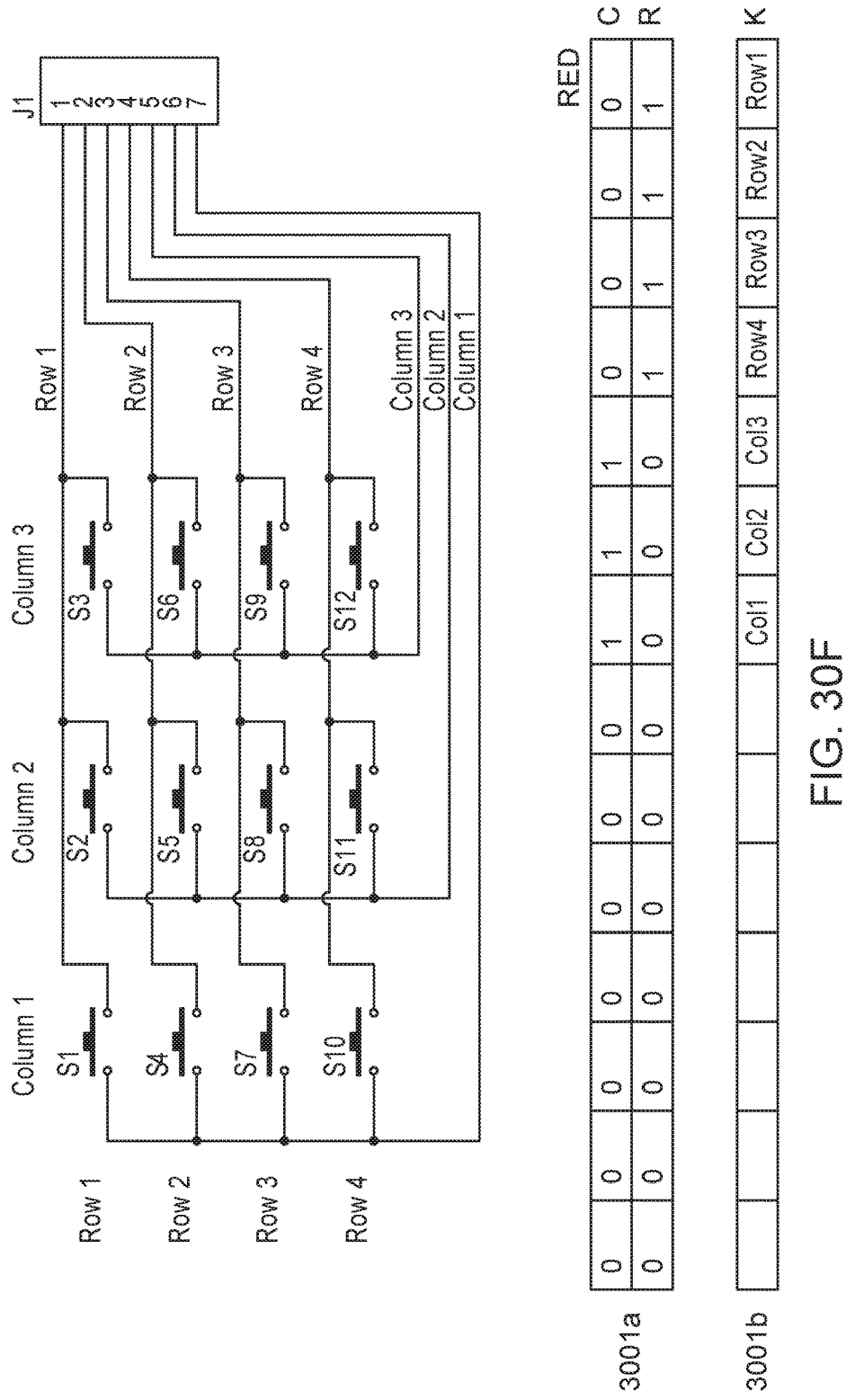
Figure 30G:
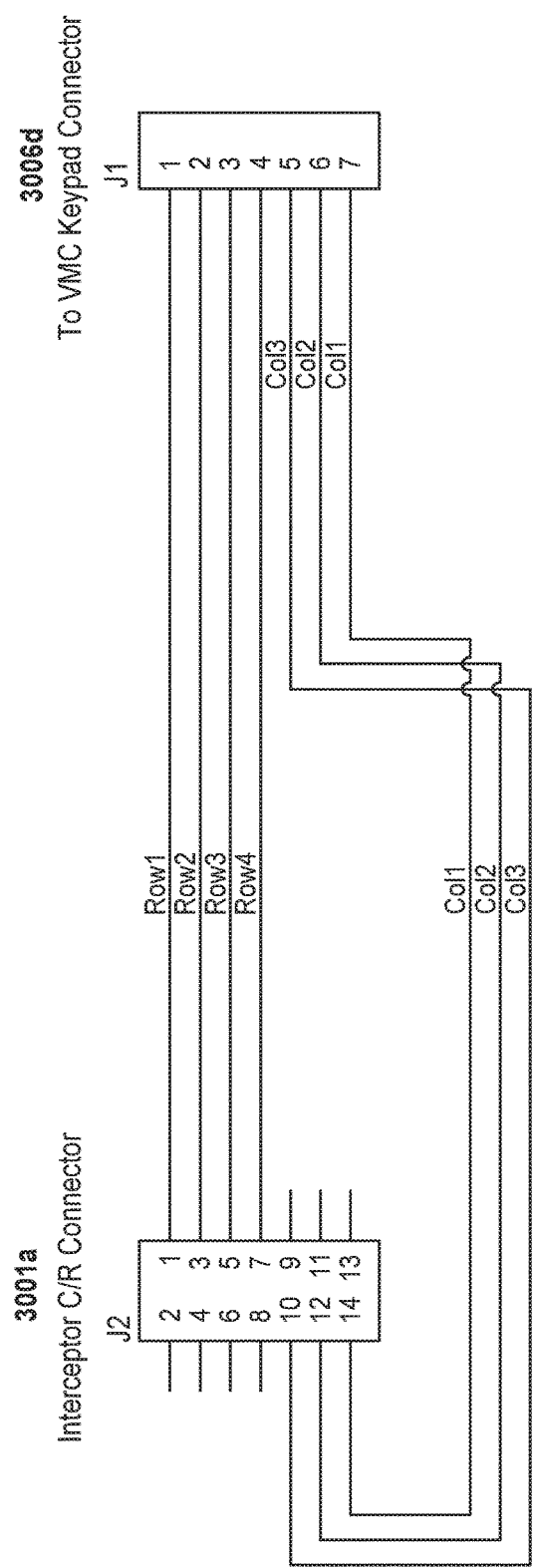

In a further example implementation, a schematic wiring diagram of a snack machine keypad, shown in FIG. 30F, includes a matrix of 3 columns and 4 rows of selection buttons. The connections from the keypad to the interceptor are shown in the bottom portion of FIG. 30F. Rows 1 through 4 are associated with positions 1-4 of the keypad connector 3001b ("K"), and columns 1 through 3 are associated with positions 7, 6 and 5 of the keypad connector 3001b ("K"). The corresponding connections between the R/C connector 3001a and the VMC of the vend machine (i.e., when connecting the interceptor (second processor) 3006b to the VMC) are shown in FIG. 30G.

Non-Vending Applications

Although shown and described herein primarily to relate to vending machines (i.e., electromechanical machines that are designed to vend/dispense products to a user in response to a product selection, for the user to retrieve from a product retrieval bay of the vend machine), many other applications of the systems and methods set forth herein are contemplated by the present disclosure and/or would be apparent to one skilled in the relevant disciplines. For example, a user-operated service machine (rather than a vending machine) can transmit action instructions for causing a service to be performed (rather than a signal representing a product selection for causing the vending of a product), using systems and/or methods set forth herein. Indeed, any electromechanical machine that has traditionally been partially automated and partially controlled by manual input by a user (e.g., via a button), can benefit from the embodiments herein. Examples of such applications include coin-operated washers and dryers, manual or automatic car wash bays, drive-through restaurants, public transportation ticketing kiosks, automated teller machines (ATMs, e.g., to avoid malicious skimming of magnetic strip cards), parking meters, assembly line part/tools or disposable supplies dispensing, laboratory reagent dispensing, hospital medication (or any other controlled substance) dispensing, military munitions dispensing, and/or the like.

A Platform for More Comprehensive VMS and Payments Service

Some embodiments of the present disclosure offer several other functions to the operator and consumer.
- Intercepting communications between the VMC and other machine components like the door switch and various displays
- Interrupting the consumer purchase to offer incentives
- The ability to use the system to bundle transactions to increase average transaction size and thus lower the impact of the high cents per transaction cost in processing fees
- The ability to highlight and/or position products with the CMPA menu, e.g., for virtual merchandising
- Facilitating direct, real-time interactions between stakeholders (e.g., product suppliers) and the consumer, in a manner similar to Google Ads or embedded games as part of the purchasing experience Although not described in detail, it should be understood that the above-described compute devices each include a processor and a memory (also referred to a non-transitory computer readable medium) coupled to the processor. Such compute devices include, for example, (1) mobile devices such as the consumer smart phone, (2) servers such as a hosted VMS Server, the hosted remote tracking device (payment server), etc., (3) the vending machines, and (4) certain components within the vending machine such as the machine-resident second processor (interceptor device) and the machine-resident first processor (Insight device). Such compute devices can implement the methods described above relevant to that compute device. These methods can be implemented as computer code or instructions stored in the memory of the given compute device, implemented in the processor of the given compute device, or executed in the processor based on instructions stored in the memory of the given compute device.

As used herein, a "message" that is sent/transmitted from one component to another can refer to the delivery of data or to the delivery of an electrical current, e.g., via the closing of a switch to complete an electrical circuit.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components, and/or features of the different embodiments described.

The invention claimed is:

1. A system, comprising:
a first processor disposed within a vend machine; and
a second processor disposed within the vend machine and communicably coupled with the first processor,
the first processor configured to receive a signal representing a product selection from a mobile device, the product selection associated with a product in the vend machine,
the first processor configured to transmit a payment authorization to a controller of the vend machine, and to transmit the signal representing the product selection to the second processor,
the second processor configured to: (1) receive the signal representing the product selection from the first processor; (2) convert the signal representing the product selection into an electronic signal based on a make, a model, and version information of the vend machine; (3) send the electronic signal to the controller to cause vending of the product; and (4) prevent a manual selection button press signal from reaching the controller while the first processor is receiving the signal representing the product selection from the mobile device, the second processor electrically connected to the controller and to a product selection keypad of the vend machine.

2. The system of claim 1, wherein the signal representing the product selection specifies at least one of a coil, a column, a row, a carousel position, a compartment, or an x-y coordinate of the vend machine.

3. The system of claim 1, wherein the second processor is configured to convert the signal representing the product selection into the electronic signal further based on a locally-stored map of signal data for each button of a plurality of buttons of the vend machine.

4. The system of claim 1, wherein the second processor is configured to send the electronic signal to the controller of the vend machine to cause vending of the product in response to the receiving the signal representing the product selection from the first processor, and without receiving a signal representing a user selection from a button of the vend machine.

5. The system of claim 1, wherein the second processor is configured to convert the signal representing the product selection into the electronic signal further based on a controller board configuration of the vend machine.

6. The system of claim 1, wherein the version information includes at least one of a firmware version and a software version.

7. The system of claim 1, wherein the second processor includes a plurality of switch multiplexing (MUX) chips configured to emulate a button press.

8. The system of claim 1, wherein the second processor is further configured to scan the product selection keypad for a button press and transmit a selection signal to the controller.

9. A system, comprising:
a first processor disposed within a user-operated service machine; and
a second processor disposed within the user-operated service machine and communicably coupled with the first processor,
the first processor configured to receive a signal representing a user selection from a mobile device, the user selection associated with a service of the user-operated service machine,
the first processor configured to transmit a payment authorization to a controller of the user-operated service machine, and to transmit an action instruction, based on the user selection, to the second processor,
the second processor configured to: (1) receive the action instruction from the first processor; (2) convert the action instruction into an electronic signal based on a make, a model, a firmware version, and version information of the user-operated service machine; (3) send the electronic signal to the controller of the user-operated service machine to cause the service to be performed; and (4) prevent a manual selection button press signal from reaching the controller while the first processor is receiving the signal representing the product selection from the mobile device,
the second processor electrically connected to the controller and to a selection keypad of the user-operated service machine.

10. The system of claim 9, wherein the second processor is configured to send the electronic signal to the controller of the user-operated service machine to cause the service to be performed in response to the receiving the action instruction from the first processor, and without receiving a signal representing a selection from an interface of the user-operated service machine.

11. The system of claim 9, wherein the second processor is configured to convert the action instruction into the electronic signal further based on a controller board configuration of the user-operated service machine.

12. The system of claim 9, wherein the version information includes at least one of a firmware version and a software version.

13. The system of claim 9, wherein the second processor includes a plurality of switch multiplexing (MUX) chips configured to emulate a button press.

14. The system of claim 9, wherein the second processor is further configured to scan the selection keypad for a button press and transmit a selection signal to the controller.

15. A system, comprising:
a first processor disposed within a vend machine and communicably coupled to a controller of the vend machine; and
a second processor disposed within the vend machine and communicably coupled to: (1) the first processor, (2) the controller, and (3) a product selection keypad of the vend machine,
the first processor configured to:
receive a product selection signal from a mobile device, the product selection signal associated with a product in the vend machine;
send a payment authorization to the controller in response to receiving the product selection signal;
receive, after sending the payment authorization, a signal indicating that a first vend position, associated with the product selection signal, is empty;
generate, in response to receiving the signal indicating that the first vend position associated with the product selection signal is empty, a modified product selection signal associated with a second vend position different from the first vend position; and
send the modified product selection signal to the second processor,
the second processor configured to: (1) receive the modified product selection signal from the first processor; (2) convert the modified product selection signal into an electronic signal based on a make, a model, and version information of the vend machine; and (3) send the electronic signal to the controller to cause vending of the product from the second vend position.

* * * * *